US012776126B2

(12) United States Patent
Kokubun et al.

(10) Patent No.: US 12,776,126 B2
(45) Date of Patent: Oct. 27, 2026

(54) IMAGING SUPPORT DEVICE, IMAGING APPARATUS, IMAGING SUPPORT METHOD, AND PROGRAM

(71) Applicant: FUJIFILM Corporation, Tokyo (JP)

(72) Inventors: Hideaki Kokubun, Saitama (JP); Kenkichi Hayashi, Saitama (JP); Akihiro Uchida, Saitama (JP); Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 561 days.

(21) Appl. No.: 18/145,016

(22) Filed: Dec. 22, 2022

(65) Prior Publication Data

US 2023/0131047 A1 Apr. 27, 2023

Related U.S. Application Data

(63) Continuation of application No. PCT/JP2021/021756, filed on Jun. 8, 2021.

(30) Foreign Application Priority Data

Jun. 30, 2020 (JP) ................................ 2020-113524

(51) Int. Cl.
*G06V 10/764* (2022.01)
*G06F 3/14* (2006.01)
*G06V 10/74* (2022.01)

(52) U.S. Cl.
CPC .............. *G06V 10/764* (2022.01); *G06F 3/14* (2013.01); *G06V 10/761* (2022.01); *G06V 2201/07* (2022.01)

(58) Field of Classification Search
CPC ............... G06V 10/764; G06V 10/761; G06V 2201/07; G06V 20/10; G06V 10/774;
(Continued)

(56) References Cited

U.S. PATENT DOCUMENTS 9,002,101 B2 * 4/2015 Nakai .................. G06F 18/217 382/157
9,025,044 B2 * 5/2015 Fukuya ................. H04N 5/272 348/222.1
(Continued)

FOREIGN PATENT DOCUMENTS

JP 2005086238 3/2005
JP 2007006033 1/2007
(Continued)

OTHER PUBLICATIONS

"Office Action of China Counterpart Application", issued on Mar. 7, 2025, with English translation thereof, p. 1-p. 23.
(Continued)

*Primary Examiner* — Michael S Osinski
(74) *Attorney, Agent, or Firm* — JCIPRNET

(57) ABSTRACT

An imaging support device includes a processor, and a memory connected to or built in the processor, in which the processor acquires frequency information indicating a frequency of a feature of a subject included in a captured image obtained by imaging with an imaging apparatus, the feature being classified into a category based on the feature, and performs support processing of supporting the imaging with the imaging apparatus based on the frequency information.

27 Claims, 40 Drawing Sheets

(58) Field of Classification Search
CPC ......... G06V 40/161; G06F 3/14; G06F 3/147; G06F 18/217; G03B 15/00; G03B 17/18; H04N 23/60; H04N 23/61; H04N 23/635; H04N 23/611; H04N 5/272; G06T 2207/20081; G06T 7/11
See application file for complete search history.

(56) References Cited

U.S. PATENT DOCUMENTS

| | | | | |
|---|---|---|---|---|
| 9,471,836 | B1 * | 10/2016 | Kim | G06F 18/24323 |
| 10,929,718 | B2 * | 2/2021 | Tsunoda | G06F 18/2431 |
| 2007/0171296 | A1 | 7/2007 | Tsukiji et al. | |
| 2008/0181460 | A1 * | 7/2008 | Tamaru | H04N 23/635 348/E5.042 |
| 2009/0040324 | A1 | 2/2009 | Nonaka | |
| 2010/0103286 | A1 * | 4/2010 | Akiyama | G03B 7/28 348/333.02 |
| 2010/0157084 | A1 * | 6/2010 | Shimamura | H04N 23/635 348/222.1 |
| 2011/0058747 | A1 * | 3/2011 | Nakagomi | G06F 18/253 382/195 |
| 2011/0221922 | A1 | 9/2011 | Matsumoto et al. | |
| 2012/0114177 | A1 * | 5/2012 | Adachi | G06V 40/10 382/103 |
| 2012/0307101 | A1 * | 12/2012 | Fukuya | H04N 23/611 348/222.1 |
| 2012/0327252 | A1 | 12/2012 | Nichols et al. | |

FOREIGN PATENT DOCUMENTS

| | | |
|---|---|---|
| JP | 2008178042 | 7/2008 |
| JP | 2009003012 | 1/2009 |
| JP | 2009044602 | 2/2009 |
| JP | 2009252069 | 10/2009 |
| JP | 2011211695 | 10/2011 |
| JP | 2012099943 | 5/2012 |
| JP | 2014216658 | 11/2014 |

OTHER PUBLICATIONS

"International Search Report (Form PCT/ISA/210) of PCT/JP2021/021756", mailed on Aug. 24, 2021, with English translation thereof, pp. 1-6.
"Written Opinion of the International Searching Authority (Form PCT/ISA/237) of PPCT/JP2021/021756", mailed on Aug. 24, 2021, with English translation thereof, pp. 1-9.
"Notice of Reasons for Refusal of Japan Counterpart Application", issued on Jan. 30, 2024, with English translation thereof, p. 1-p. 9.
"Notice of Reasons for Refusal of Japan Counterpart Application", issued on Oct. 21, 2025, with English translation thereof, p. 1-p. 6.

* cited by examiner

FIG. 11

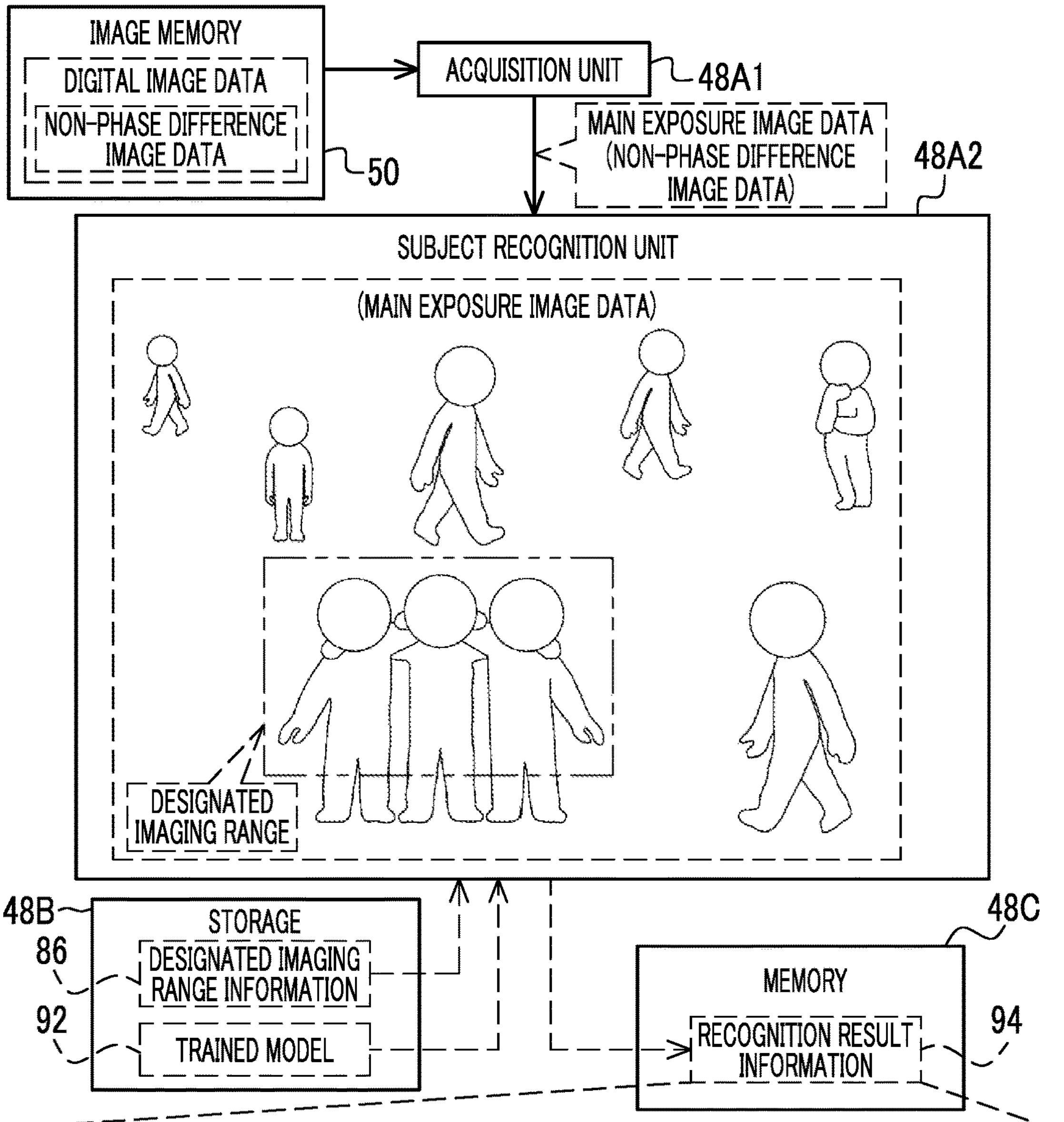

| SUBJECT NAME | SUBJECT FEATURE | | | | | RECOGNITION RANGE SPECIFICATION COORDINATES |
|---|---|---|---|---|---|---|
| PERSON A | SMILING FACE | FRONT | OPEN EYES | WITHIN DESIGNATED IMAGING RANGE | ······· | (X1, Y2), (X3, Y4) |
| PERSON B | CRYING FACE | NON-FRONT | CLOSED EYES | OUT OF DESIGNATED IMAGING RANGE | ······· | (X5, Y6), (X7, Y8) |
| PERSON C | STRAIGHT FACE | FRONT | OPEN EYES | WITHIN DESIGNATED IMAGING RANGE | ······· | (X9, Y10), (X11, Y12) |
| PERSON D | ANGRY FACE | NON-FRONT | OPEN EYES | OUT OF DESIGNATED IMAGING RANGE | ······· | (X13, Y14), (X15, Y16) |
| PERSON E | SMILING FACE | FRONT | CLOSED EYES | WITHIN DESIGNATED IMAGING RANGE | ······· | (X17, Y18), (X19, Y20) |
| ⋮ | | | | | | ⋮ |

FIG. 12

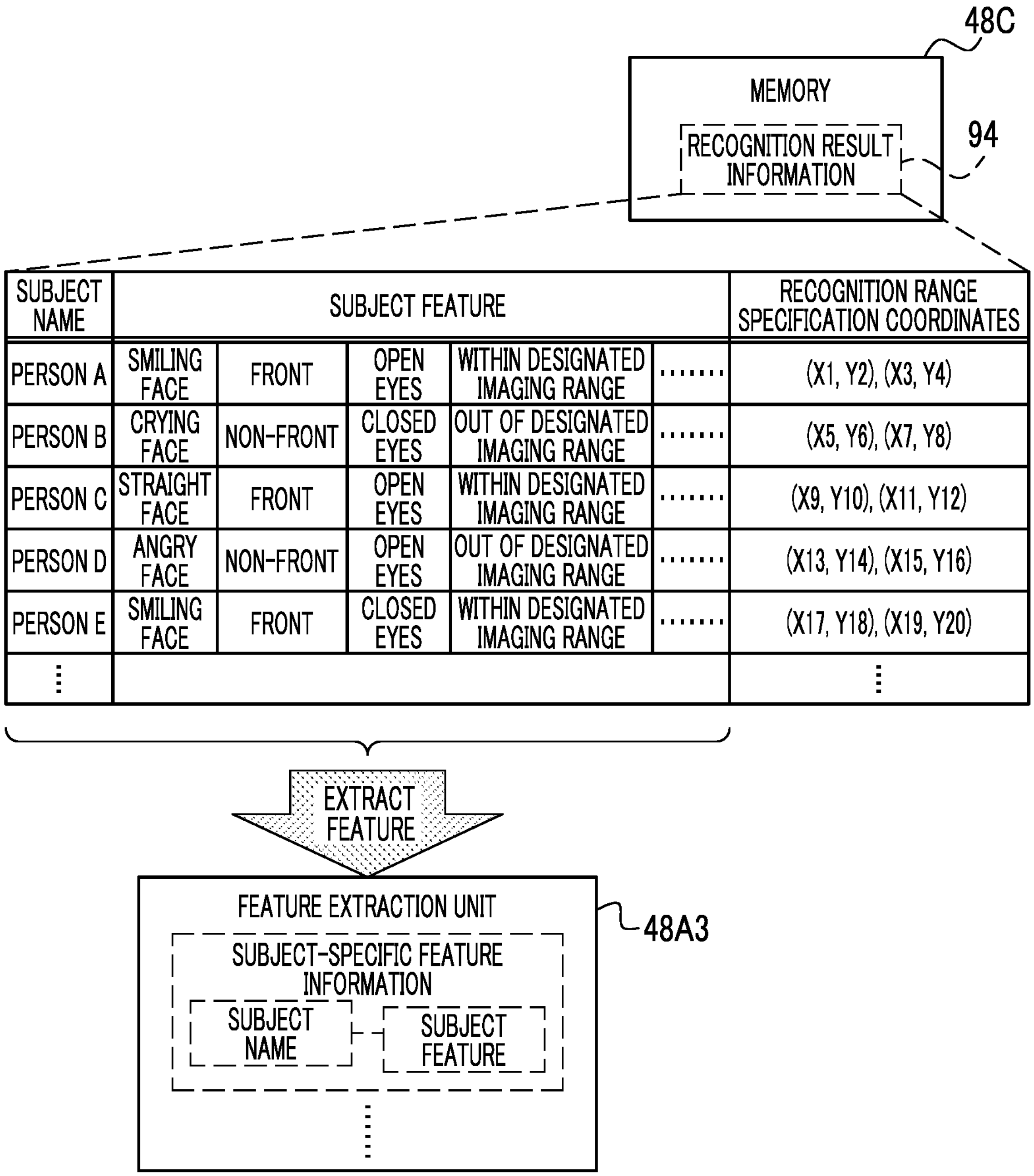

| SUBJECT NAME | SUBJECT FEATURE | | | | | RECOGNITION RANGE SPECIFICATION COORDINATES |
|---|---|---|---|---|---|---|
| PERSON A | SMILING FACE | FRONT | OPEN EYES | WITHIN DESIGNATED IMAGING RANGE | ....... | (X1, Y2), (X3, Y4) |
| PERSON B | CRYING FACE | NON-FRONT | CLOSED EYES | OUT OF DESIGNATED IMAGING RANGE | ....... | (X5, Y6), (X7, Y8) |
| PERSON C | STRAIGHT FACE | FRONT | OPEN EYES | WITHIN DESIGNATED IMAGING RANGE | ....... | (X9, Y10), (X11, Y12) |
| PERSON D | ANGRY FACE | NON-FRONT | OPEN EYES | OUT OF DESIGNATED IMAGING RANGE | ....... | (X13, Y14), (X15, Y16) |
| PERSON E | SMILING FACE | FRONT | CLOSED EYES | WITHIN DESIGNATED IMAGING RANGE | ....... | (X17, Y18), (X19, Y20) |
| ⋮ | | | | | | ⋮ |

IMAGING SUPPORT DEVICE, IMAGING APPARATUS, IMAGING SUPPORT METHOD, AND PROGRAM

CROSS-REFERENCE TO RELATED APPLICATIONS

This application is a continuation application of International Application No. PCT/JP2021/021756, filed Jun. 8, 2021, the disclosure of which is incorporated herein by reference in its entirety. Further, this application claims priority under 35 USC 119 from Japanese Patent Application No. 2020-113524 filed Jun. 30, 2020, the disclosure of which is incorporated by reference herein.

BACKGROUND

1. Technical Field of the Invention

The technology of the present disclosure relates to an imaging support device, an imaging apparatus, an imaging support method, and a program.

2. Related Art

JP2007-006033A discloses a target decision device that selects a face to be processed from among a plurality of faces included in an image. The target decision device disclosed in JP2007-006033A includes a face detection unit that detects the face from the image, a face information recording unit that records the face detected in the past by the face detection unit and a detection history related to the detection in association with each other, and a face selection unit that selects the face to be processed from the faces included in the image based on the detection history.

JP2009-252069A discloses an image processing device comprising a face recognition dictionary, an image acquisition unit, a face region detection unit, a feature extraction unit, a discrimination unit, a face recognition dictionary correction unit, and a classification unit. In the face recognition dictionary, a face feature for discriminating whether or not persons are the same person is registered for each person. The image acquisition unit acquires an image including a person. The face region detection unit detects a face region from the image acquired by the image acquisition unit. The feature extraction unit extracts the face feature in the face region based on the face region detected by the face region detection unit. The discrimination unit discriminates whether or not the face feature of the same person is registered in the face recognition dictionary based on the face feature extracted by the feature extraction unit and the face feature registered in the face recognition dictionary. The face recognition dictionary correction unit corrects the registered face feature based on the extracted face feature in a case in which it is discriminated by the discrimination unit that the face feature of the same person is registered in the face recognition dictionary, and registers the extracted face feature as a face feature of a new person in a case in which it is discriminated by the discrimination unit that the face feature of the same person is not registered in the face recognition dictionary. The classification unit classifies the face of the person in the image acquired by the image acquisition unit as a known face in a case in which it is discriminated by the discrimination unit that the face feature of the same person is registered in the face recognition dictionary, and classifies the face of the person in the image acquired by the image acquisition unit as an unknown face in a case in which it is discriminated by the discrimination unit that the face feature of the same person is not registered in the face recognition dictionary.

JP2012-099943A discloses an image processing device comprising a storage unit that stores face image data, a face detection unit that detects a face from a video signal, a face recognition unit that determines whether or not the face detected by the face detection unit is included in the face image data stored in the storage unit, and an image processing unit. The image processing unit performs image processing of making regions of the face determined to be included in the face image data and the face determined not to be included have higher image quality than other regions, in a case in which the face determined to be included in the face image data stored in the storage unit by the face recognition unit and the face determined not to be included in the face image data are detected from the video signal.

JP2009-003012A discloses an imaging apparatus including an imaging lens which drives at least a part of a plurality of lenses arranged along an optical axis direction along the optical axis direction and of which a lens focal position can be changed, an image acquisition unit, a subject detection unit, a focus evaluation value calculation unit, a selection unit, and a recording unit. The image acquisition unit acquires a plurality of image data by continuously executing imaging while changing the lens focal position of the imaging lens. The subject detection unit detects a main subject region in accordance with a movement state of the subject between the plurality of image data acquired by the image acquisition unit. The focus evaluation value calculation unit calculates a focus evaluation value of the main subject region obtained by the subject detection unit for each of the plurality of image data. The selection unit selects at least one of the plurality of image data based on the focus evaluation value obtained by the focus evaluation value calculation unit. The recording unit records the image data selected by the selection unit in a recording medium.

SUMMARY

One embodiment according to the technology of the present disclosure provides an imaging support device, an imaging apparatus, an imaging support method, and a program capable of supporting imaging by an imaging apparatus in accordance with a frequency in which a feature of a subject is classified into a category.

A first aspect according to the technology of the present disclosure relates to an imaging support device comprising a processor, and a memory connected to or built in the processor, in which the processor acquires frequency information indicating a frequency of a feature of a subject specified from a captured image obtained by imaging with an imaging apparatus, the feature being classified into a category based on the feature, and performs support processing of supporting the imaging with the imaging apparatus based on the frequency information.

A second aspect according to the technology of the present disclosure relates to the imaging support device according to the first aspect, in which the category is categorized into a plurality of categories including at least one target category, the target category is a category determined based on the frequency information, and the support processing is processing including processing of supporting the imaging for a target category subject having the feature belonging to the target category.

A third aspect according to the technology of the present disclosure relates to the imaging support device according to the second aspect, in which the support processing is processing including display processing of performing display for recommending to image the target category subject.

A fourth aspect according to the technology of the present disclosure relates to the imaging support device according to the third aspect, in which the display processing is processing of displaying an image for display obtained by the imaging with the imaging apparatus on a display and displaying a target category subject image indicating the target category subject in the image for display in an aspect that is distinguishable from other image regions.

A fifth aspect according to the technology of the present disclosure relates to the imaging support device according to any one of the second to fourth aspects, in which the processor detects the target category subject based on an imaging result of the imaging apparatus, and acquires an image including an image corresponding to the target category subject on a condition that the target category subject is detected.

A sixth aspect according to the technology of the present disclosure relates to the imaging support device according to any one of the second to fifth aspects, in which the processor displays an object indicating a designated imaging range determined in accordance with a given instruction from an outside and an object indicating the target category subject in different display aspects.

A seventh aspect according to the technology of the present disclosure relates to the imaging support device according to any one of the second to sixth aspects, in which, in a case in which a degree of difference between a first imaging condition given from an outside and a second imaging condition given to the target category subject is equal to or larger than a predetermined degree of difference, the processor performs predetermined processing.

An eighth aspect according to the technology of the present disclosure relates to the imaging support device according to any one of the second to seventh aspects, in which the target category is a low-frequency category having a relatively low frequency among the plurality of categories.

A ninth aspect according to the technology of the present disclosure relates to the imaging support device according to any one of the second to eighth aspects, in which, in a case in which the target category subject is imaged by the imaging apparatus, the target category is a category into which the feature for the target category subject is classified, the category being determined in accordance with a state of the target category subject.

A tenth aspect according to the technology of the present disclosure relates to the imaging support device according to any one of the second to ninth aspects, in which, in a case in which a plurality of objects are imaged by the imaging apparatus, the target category is an object target category in which each of the plurality of objects themselves is able to be specified.

An eleventh aspect according to the technology of the present disclosure relates to the imaging support device according to any one of the first to tenth aspects, in which the category is created for at least one unit.

A twelfth aspect according to the technology of the present disclosure relates to the imaging support device according to the eleventh aspect, in which one of the units is a period.

A thirteenth aspect according to the technology of the present disclosure relates to the imaging support device according to the eleventh or twelfth aspect, in which one of the units is a position.

A fourteenth aspect according to the technology of the present disclosure relates to the imaging support device according to any one of the first to thirteenth aspects, in which the processor causes a classifier to classify the feature, and in a case in which a scene to be imaged by the imaging apparatus matches a specific scene, the classifier classifies the feature.

A fifteenth aspect according to the technology of the present disclosure relates to the imaging support device according to the fourteenth aspect, in which the specific scene is a scene imaged in the past.

A sixteenth aspect according to the technology of the present disclosure relates to the imaging support device according to any one of the first to fifteenth aspects, in which the support processing is processing including processing of displaying the frequency information.

A seventeenth aspect according to the technology of the present disclosure relates to the imaging support device according to the sixteenth aspect, in which the support processing is processing including processing of, in a case in which the frequency information is designated by a reception device in a state in which the frequency information is displayed, supporting the imaging related to the category corresponding to the designated frequency information.

An eighteenth aspect according to the technology of the present disclosure relates to an imaging support device comprising a processor, and a memory connected to or built in the processor, in which the processor acquires frequency information indicating a frequency of a captured image obtained by imaging with an imaging apparatus, the captured image being classified into a category based on a feature of a subject included in the captured image, and performs support processing of supporting the imaging with the imaging apparatus based on the frequency information.

A nineteenth aspect according to the technology of the present disclosure relates to an imaging apparatus comprising the imaging support device according to any one of the first to eighteenth aspects, and an image sensor, in which the processor supports the imaging with the image sensor by performing the support processing.

A twentieth aspect according to the technology of the present disclosure relates to an imaging support method comprising acquiring frequency information indicating a frequency of a feature of a subject specified from a captured image obtained by imaging with an imaging apparatus, the feature being classified into a category based on the feature, and performing support processing of supporting the imaging with the imaging apparatus based on the frequency information.

A twenty-first aspect according to the technology of the present disclosure relates to an imaging support method comprising acquiring frequency information indicating a frequency of a captured image obtained by imaging with an imaging apparatus, the captured image being classified into a category based on a feature of a subject specified from the captured image, and performing support processing of supporting the imaging with the imaging apparatus based on the frequency information.

A twenty-second aspect according to the technology of the present disclosure relates to a program causing a computer to execute a process comprising acquiring frequency information indicating a frequency of a feature of a subject specified from a captured image obtained by imaging with an imaging apparatus, the feature being classified into a category based on the feature, and performing support processing of supporting the imaging with the imaging apparatus based on the frequency information.

A twenty-third aspect according to the technology of the present disclosure relates to a program causing a computer to execute a process comprising acquiring frequency information indicating a frequency of a captured image obtained by imaging with an imaging apparatus, the captured image being classified into a category based on a feature of a subject specified from the captured image, and performing support processing of supporting the imaging with the imaging apparatus based on the frequency information.

BRIEF DESCRIPTION OF THE DRAWINGS

Exemplary embodiments of the technology of the disclosure will be described in detail based on the following figures, wherein:

FIG. 11 is a conceptual diagram showing an example of processing contents in a case in which the CPU is operated as a subject recognition unit and the control unit;

FIG. 12 is a conceptual diagram showing an example of processing contents in a case in which the CPU is operated as a feature extraction unit;

DETAILED DESCRIPTION

Figure 1:
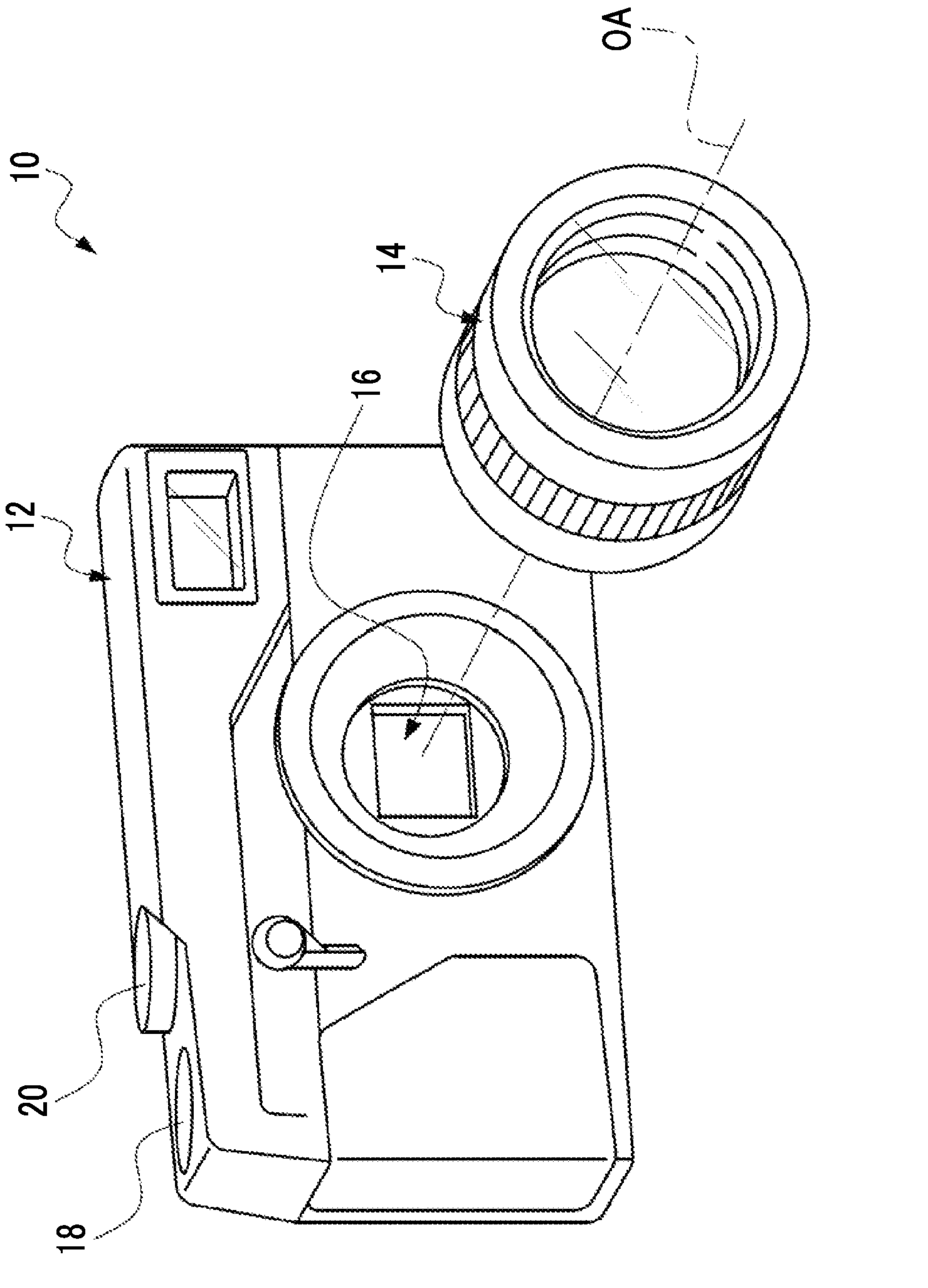
FIG. 1 is a perspective view showing an example of an appearance of an imaging apparatus.

In the following, an example of an embodiment of an imaging support device, an imaging apparatus, an imaging support method, and a program according to the technology of the present disclosure will be described with reference to accompanying drawings.

First, the terms used in the following description will be described.

CPU refers to an abbreviation of "Central Processing Unit". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". SSD refers to an abbreviation of "Solid State Drive". USB refers to an abbreviation of "Universal Serial Bus". HDD refers to an abbreviation of "Hard Disk Drive". EEPROM refers to an abbreviation of "Electrically Erasable and Programmable Read Only Memory". EL refers to an abbreviation of "Electro-Luminescence". I/F refers to an abbreviation of "Interface". UI refers to an abbreviation of "User Interface". TOF refers to an abbreviation of "Time of Flight". fps refers to an abbreviation of "frame per second". MF refers to an abbreviation of "Manual Focus". AF refers to an abbreviation of "Auto Focus". CMOS refers to an abbreviation of "Complementary Metal Oxide Semiconductor". CCD refers to an abbreviation of "Charge-Coupled Device". RTC refers to an abbreviation of "real time clock". GPS refers to an abbreviation of "global positioning system". LAN refers to an abbreviation of "local area network". WAN refers to an abbreviation of "wide area network". GNSS is an abbreviation of "global navigation satellite system". In the following, for convenience of description, a CPU is described as an example of a "processor" according to the technology of the present disclosure. However, the "processor" according to the technology of the present disclosure may be a combination of a plurality of processing devices, such as the CPU and a GPU. In a case in which the combination of the CPU and the GPU is applied as an example of the "processor" according to the technology of the present disclosure, the GPU is operated under the control of the CPU and is responsible for executing the image processing.

In the description of the present specification, "vertical" refers to the verticality in the sense of including an error generally allowed in the technical field to which the technology of the present disclosure belongs, that is the error to the extent that it does not contradict the purpose of the technology of the present disclosure, in addition to the exact verticality. In the description of the present specification, "match" refers to the match in the sense of including an error generally allowed in the technical field to which the technology of the present disclosure belongs, that is the error to the extent that it does not contradict the purpose of the technology of the present disclosure, in addition to the exact match.

As an example, as shown in FIG. 1, an imaging apparatus 10 is a digital camera having an interchangeable lens and omitting a reflex mirror. The imaging apparatus 10 comprises an imaging apparatus body 12 and an interchangeable lens 14 that is interchangeably mounted on the imaging apparatus body 12. It should be noted that, here, as an example of the imaging apparatus 10, the digital camera having the interchangeable lens and omitting the reflex mirror is described, but the technology of the present disclosure is not limited to this. A digital camera having a stationary lens may be used, a digital camera in which the reflex mirror is not omitted may be used, or a digital camera built in various electronic apparatuses, such as a smart device, a wearable terminal, a cell observation device, an ophthalmologic observation device, and a surgical microscope, may be used.

An image sensor 16 is provided in the imaging apparatus body 12. The image sensor 16 is a CMOS image sensor. The image sensor 16 images an imaging region including a subject group. In a case in which the interchangeable lens 14 is mounted on the imaging apparatus body 12, subject light indicating a subject is transmitted through the interchangeable lens 14 and imaged on the image sensor 16, so that image data indicating the image of the subject is generated by the image sensor 16.

It should be noted that, in the present embodiment, the CMOS image sensor is described as the image sensor 16, but the technology of the present disclosure is not limited to this. For example, the technology of the present disclosure is established even in a case in which the image sensor 16 is another type of image sensor, such as a CCD image sensor.

A release button 18 and a dial 20 are provided on an upper surface of the imaging apparatus body 12. The dial 20 is operated in a case of setting an operation mode of an imaging system, an operation mode of a playback system, and the like, and by operating the dial 20, the imaging apparatus 10 selectively sets an imaging mode and a playback mode as the operation modes.

The release button 18 functions as an imaging preparation instruction unit and an imaging instruction unit, and a push operation of two stages of an imaging preparation instruction state and an imaging instruction state can be detected. For example, the imaging preparation instruction state refers to a state in which the release button 18 is pushed to an intermediate position (half push position) from a standby position, and the imaging instruction state refers to a state in which the release button 18 is pushed to a final push position (full push position) beyond the intermediate position. It should be noted that, in the following, the "state in which the release button 18 is pushed to the half push position from the standby position" will be referred to as a "half push state", and the "state in which the release button 18 is pushed to the full push position from the standby position" will be referred to as a "full push state". Depending on the configuration of the imaging apparatus 10, the imaging preparation instruction state may be a state in which a finger of a user is in contact with the release button 18, and the imaging instruction state may be a state in which the finger of the user who performs operation proceeds from the state of being in contact with the release button 18 to a state of being separated from the release button 18.

Figure 2:
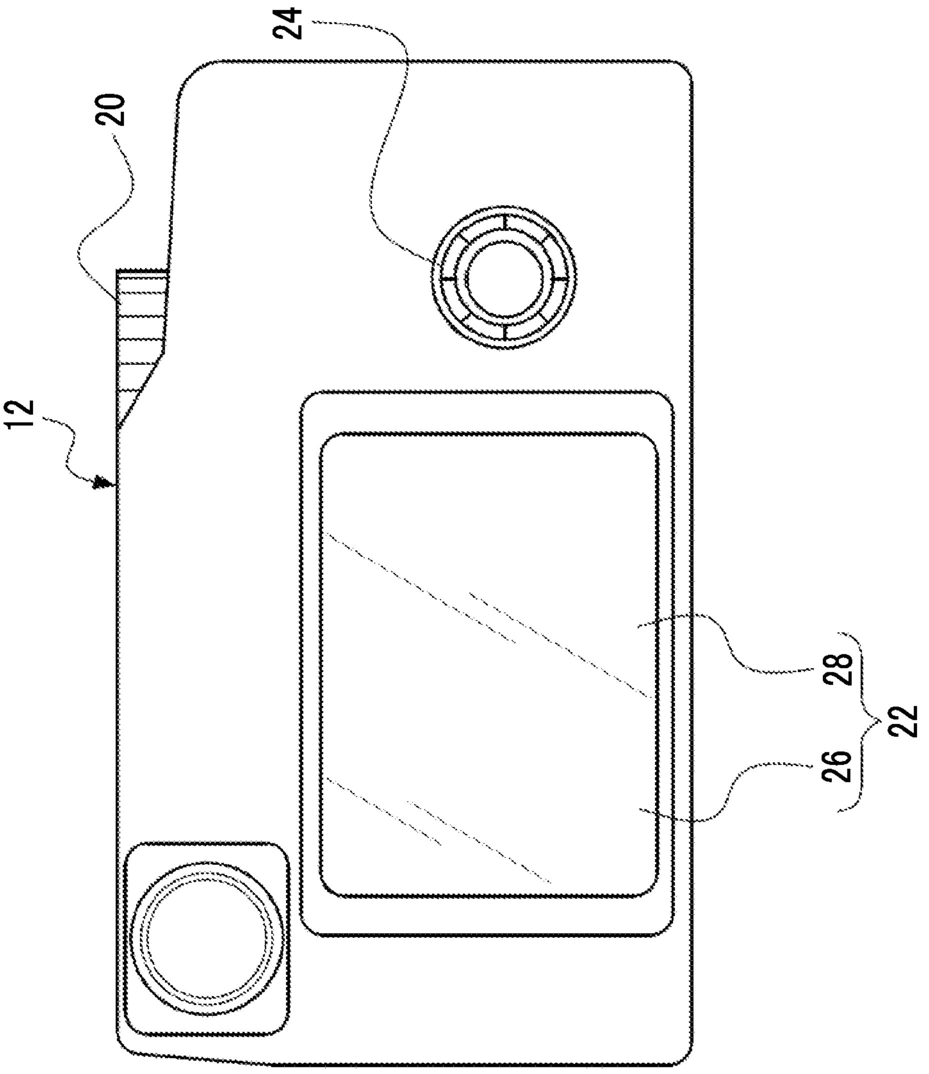
FIG. 2 is a rear view showing an example of an appearance of a rear side of the imaging apparatus shown in FIG. 1.

As an example, as shown in FIG. 2, a touch panel display 22 and an instruction key 24 are provided on a rear surface of the imaging apparatus body 12.

Figure 3:
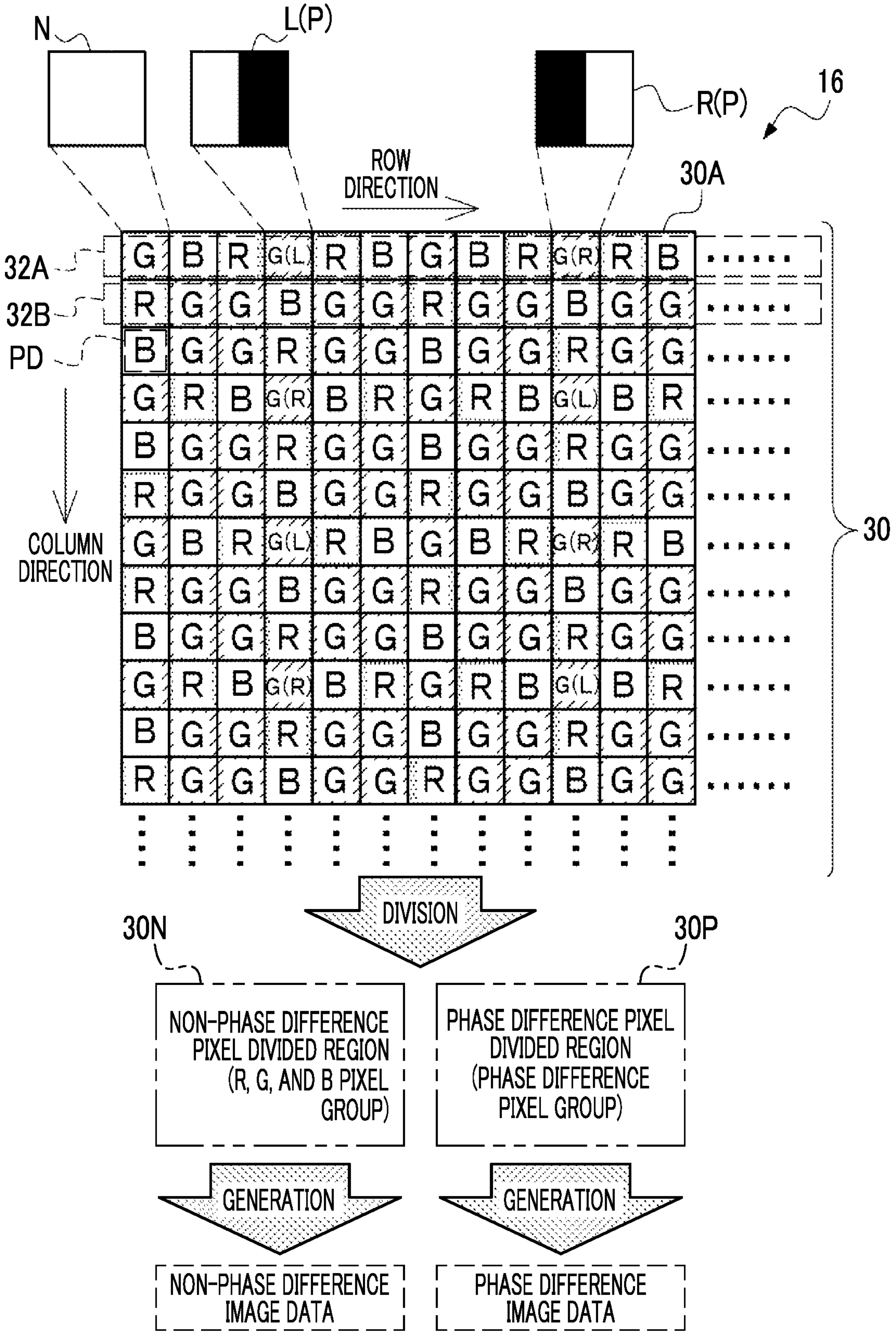
FIG. 3 is a schematic view showing an example of the disposition of pixels included in a photoelectric conversion element of the imaging apparatus.

The touch panel display 22 comprises a display 26 and a touch panel 28 (see also FIG. 3). Examples of the display 26 include an organic EL display. The display 26 may not be the organic EL display, but may be another type of display, such as a liquid crystal display or an inorganic EL display.

The display 26 displays an image and/or text information. The display 26 is used for imaging for the live view image, that is, for displaying the live view image obtained by performing the continuous imaging in a case in which the imaging apparatus 10 is in the imaging mode. The imaging for the live view image (hereinafter, also referred to as "imaging for the live view image") is performed in accordance with, for example, a frame rate of 60 fps. 60 fps is merely an example, and a frame rate smaller than 60 fps may be used or a frame rate exceeding 60 fps may be used.

Here, the "live view image" refers to a video for display based on the image data obtained by the imaging performed by the image sensor 16. The live view image is also generally referred to as a live preview image. It should be noted that the live view image is an example of an "image for display" according to the technology of the present disclosure.

The display 26 is also used for displaying the still picture obtained by performing the imaging for the still picture in a case in which the instruction for the imaging for the still picture is given to the imaging apparatus 10 via the release button 18. Further, the display 26 is used for displaying a playback image and displaying a menu screen and the like in a case in which the imaging apparatus 10 is in the playback mode.

The touch panel 28 is a transmissive touch panel, and is superimposed on a surface of a display region of the display 26. The touch panel 28 receives an instruction from the user by detecting a contact of an indicator, such as a finger or a stylus pen. It should be noted that, in the following, for convenience of description, a state in which the user turns on the soft key for starting the imaging via the touch panel 28 is included in the "full push state" described above.

In addition, in the present embodiment, examples of the touch panel display 22 include an out-cell type touch panel display in which the touch panel 28 is superimposed on the surface of the display region of the display 26, but this is merely an example. For example, the on-cell type or in-cell type touch panel display can be applied as the touch panel display 22.

The instruction key 24 receives various instructions. Here, the "various instructions" refers to various instructions, for example, an instruction for displaying a menu screen on which various menus can be selected, an instruction for selecting one or a plurality of menus, an instruction for confirming a selected content, an instruction for deleting the selected content, zooming in, zooming out, and frame advance. In addition, these instructions may be given by the touch panel 28.

As an example, as shown in FIG. 3, the image sensor 16 comprises a photoelectric conversion element 30. The photoelectric conversion element 30 has a light-receiving surface 30A. The photoelectric conversion element 30 is disposed in the imaging apparatus body 12 (see FIG. 1) such that the center of the light-receiving surface 30A and an optical axis OA (see FIG. 1) match each other. The photoelectric conversion element 30 has a plurality of photosensitive pixels disposed in a matrix, and the light-receiving surface 30A is formed by the plurality of photosensitive pixels. The photosensitive pixel is a pixel having a photodiode PD, photoelectrically converts the received light, and outputs an electric signal in accordance with a light-receiving amount. The type of the photosensitive pixel included in the photoelectric conversion element 30 is two types of a phase difference pixel P, which is so-called an image plane phase difference pixel, and a non-phase difference pixel N which is a pixel different from the phase difference pixel P.

A color filter is disposed on the photodiode PD. The color filters include a green (G) filter corresponding to a G wavelength range which most contributes to obtaining a brightness signal, a red (R) filter corresponding to an R wavelength range, and a blue (B) filter corresponding to a B wavelength range.

Generally, the non-phase difference pixel N is also referred to as a normal pixel. The photoelectric conversion element 30 has three types of photosensitive pixels of R pixel, G pixel, and B pixel, as the non-phase difference pixel N. The R pixel, the G pixel, the B pixel, and the phase difference pixel P are regularly disposed with a predetermined periodicity in a row direction (for example, a horizontal direction in a state in which a bottom surface of the imaging apparatus body 12 is in contact with a horizontal surface) and a column direction (for example, a vertical direction which is a direction vertical to the horizontal direction). The R pixel is a pixel corresponding to the photodiode PD in which the R filter is disposed, the G pixel and the phase difference pixel P are pixels corresponding to the photodiode PD in which the G filter is disposed, and the B pixel is a pixel corresponding to the photodiode PD in which the B filter is disposed.

A plurality of phase difference pixel lines 32A and a plurality of non-phase difference pixel lines 32B are arranged on the light-receiving surface 30A. The phase difference pixel line 32A is a horizontal line including the phase difference pixels P. Specifically, the phase difference pixel line 32A is the horizontal line in which the phase difference pixels P and the non-phase difference pixels N are mixed. The non-phase difference pixel line 32B is a horizontal line including only a plurality of non-phase difference pixels N.

On the light-receiving surface 30A, the phase difference pixel lines 32A and the non-phase difference pixel lines 32B for a predetermined number of lines are alternately disposed along the column direction. For example, the "predetermined number of lines" used herein refers to two lines. It should be noted that, here, the predetermined number of lines is described as two lines, but the technology of the present disclosure is not limited to this, and the predetermined number of lines may be three or more lines, dozen lines, a few tens of lines, a few hundred lines, and the like.

The phase difference pixel lines 32A are arranged in the column direction by skipping two lines from the first row to the last row. A part of the pixels of the phase difference pixel lines 32A is the phase difference pixel P. Specifically, the phase difference pixel line 32A is a horizontal line in which the phase difference pixels P and the non-phase difference pixels N are periodically arranged. The phase difference pixels P are roughly divided into a first phase difference pixel L and a second phase difference pixel R. In the phase difference pixel lines 32A, the first phase difference pixels L and the second phase difference pixels R are alternately disposed at intervals of several pixels in a line direction as the G pixels.

The first phase difference pixels L and the second phase difference pixels R are disposed to be alternately present in the column direction. In the example shown in FIG. 3, in the fourth column, the first phase difference pixel L, the second phase difference pixel R, the first phase difference pixel L, and the second phase difference pixel R are disposed in this order along the column direction from the first row. That is, the first phase difference pixels L and the second phase difference pixels R are alternately disposed along the column direction from the first row. In addition, in the example shown in FIG. 3, in the tenth column, the second phase difference pixel R, the first phase difference pixel L, the second phase difference pixel R, and the first phase difference pixel L are disposed in this order along the column direction from the first row. That is, the second phase difference pixels R and the first phase difference pixels L are alternately disposed along the column direction from the first row.

The photoelectric conversion element 30 is divided into two regions. That is, the photoelectric conversion element 30 includes a non-phase difference pixel divided region 30N and a phase difference pixel divided region 30P. The phase difference pixel divided region 30P is a phase difference pixel group composed of a plurality of phase difference pixels P, and receives the subject light to generate phase difference image data as the electric signal in accordance with the light-receiving amount. The phase difference image data is used, for example, for distance measurement. The non-phase difference pixel divided region 30N is a non-phase difference pixel group composed of the plurality of non-phase difference pixels N, and receives the subject light to generate non-phase difference image data as the electric signal in accordance with the light-receiving amount. The non-phase difference image data is displayed on the display 26 (see FIG. 2) as, for example, a visible light image.

Figure 4:
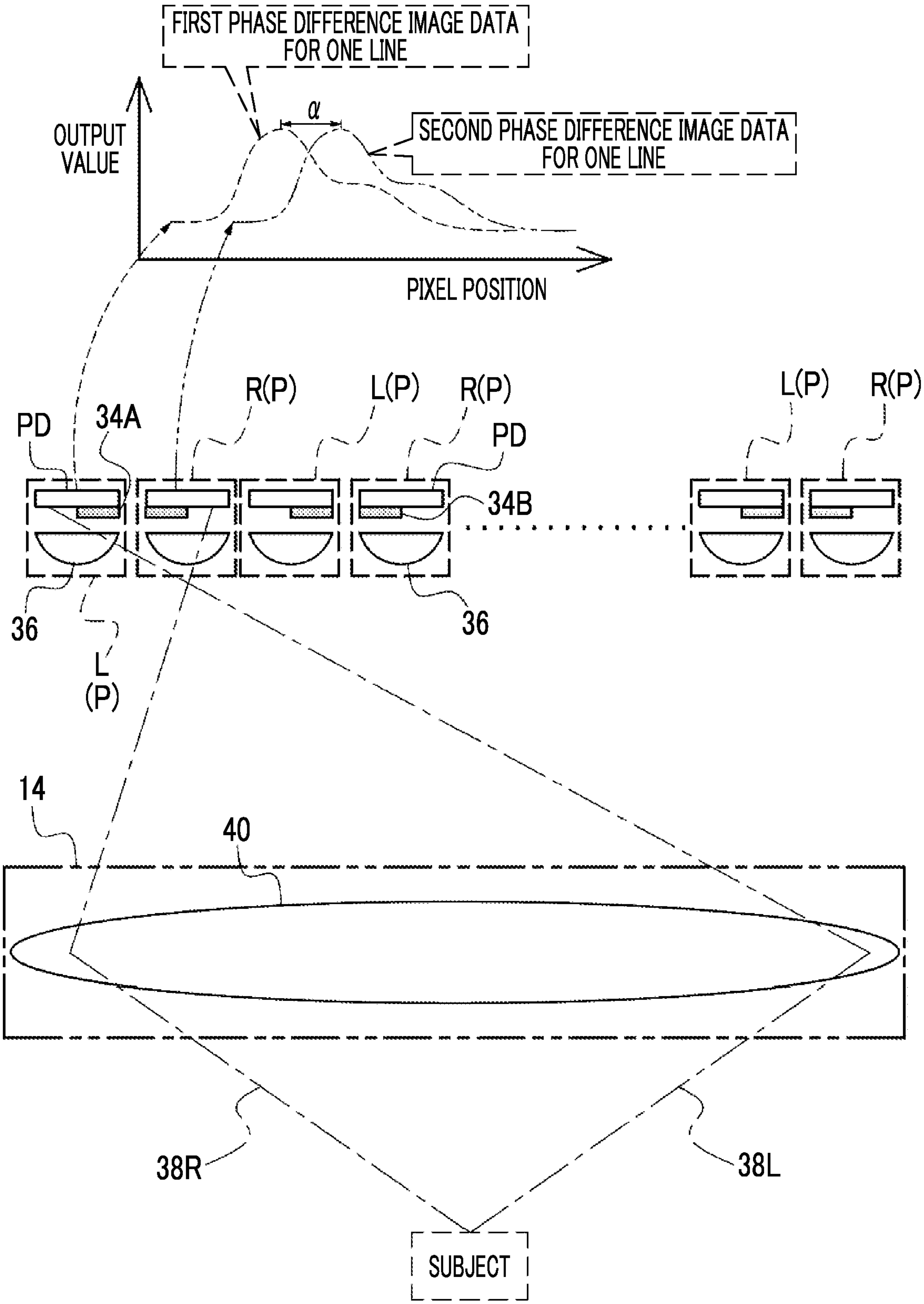
FIG. 4 is a conceptual diagram showing an example of an incidence characteristic of subject light on a first phase difference pixel and a second phase difference pixel included in the photoelectric conversion element shown in FIG. 3.

As an example, as shown in FIG. 4, the first phase difference pixel L comprises a light shielding member 34A, a microlens 36, and the photodiode PD. In the first phase difference pixel L, the light shielding member 34A is disposed between the microlens 36 and the light-receiving surface of the photodiode PD. A left half (left side in a case of facing the subject from the light-receiving surface (in other words, a right side in a case of facing the light-receiving surface from the subject)) of the light-receiving surface of the photodiode PD in the row direction is shielded against the light by the light shielding member 34A.

The second phase difference pixel R comprises a light shielding member 34B, the microlens 36, and the photodiode PD. In the second phase difference pixel R, the light shielding member 34B is disposed between the microlens 36 and the light-receiving surface of the photodiode PD. A right half (right side in a case of facing the subject from the light-receiving surface (in other words, a left side in a case of facing the light-receiving surface from the subject)) of the light-receiving surface of the photodiode PD in the row direction is shielded against the light by the light shielding member 34B. It should be noted that, in the following, for convenience of description, in a case in which the distinction is not needed, the light shielding members 34A and 34B are referred to as a "light shielding member" without designating the reference numeral.

The interchangeable lens 14 comprises an imaging lens 40. Luminous flux passing through an exit pupil of the imaging lens 40 is roughly divided into left region passing light 38L and right region passing light 38R. The left region passing light 38L refers to the left half luminous flux of the luminous flux passing through the exit pupil of the imaging lens 40 in a case of facing the subject side from the phase difference pixel P side. The right region passing light 38R refers to the right half luminous flux of the luminous flux passing through the exit pupil of the imaging lens 40 in a case of facing the subject side from the phase difference pixel P side. The luminous flux passing through the exit pupil of the imaging lens 40 is divided into the right and left by the microlens 36, the light shielding member 34A, and the light shielding member 34B functioning as a pupil division unit. The first phase difference pixel L receives the left region passing light 38L as the subject light, and the second phase difference pixel R receives the right region passing light 38R as the subject light. As a result, first phase difference image data corresponding to the subject image corresponding to the left region passing light 38L and second phase difference image data corresponding to the subject image corresponding to the right region passing light 38R are generated by the photoelectric conversion element 30.

In the imaging apparatus 10, for example, in the same phase difference pixel line 32A, the distance to the subject based on a deviation amount $\alpha$ (hereinafter, also simply referred to as a "deviation amount $\alpha$") between the first phase difference image data for one line and the second phase difference image data for one line, that is, a subject distance is measured. It should be noted that, since a method of deriving the subject distance from the deviation amount $\alpha$ is a known technology, the detailed description thereof will be omitted here.

Figure 5:
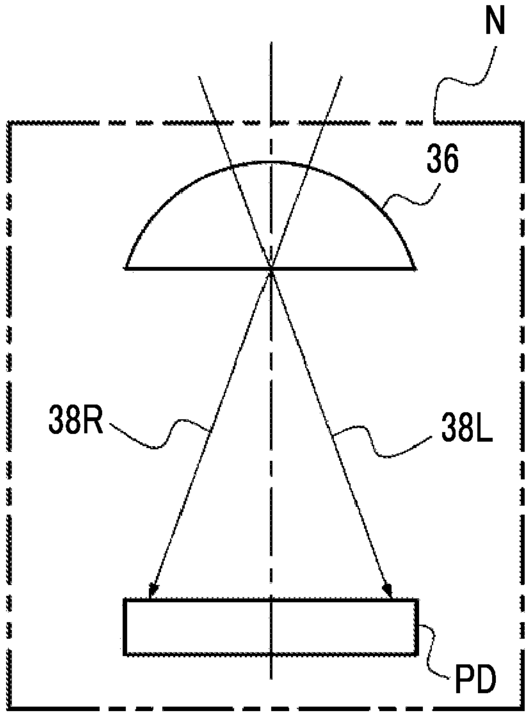
FIG. 5 is a schematic configuration diagram showing an example of a configuration of a non-phase difference pixel included in the photoelectric conversion element shown in FIG. 3.

As an example, as shown in FIG. 5, the non-phase difference pixel N is different from the phase difference pixel Pin that the light shielding member is not provided. The photodiode PD of the non-phase difference pixel N receives the left region passing light 38L and the right region passing light 38R as the subject light.

Figure 6:
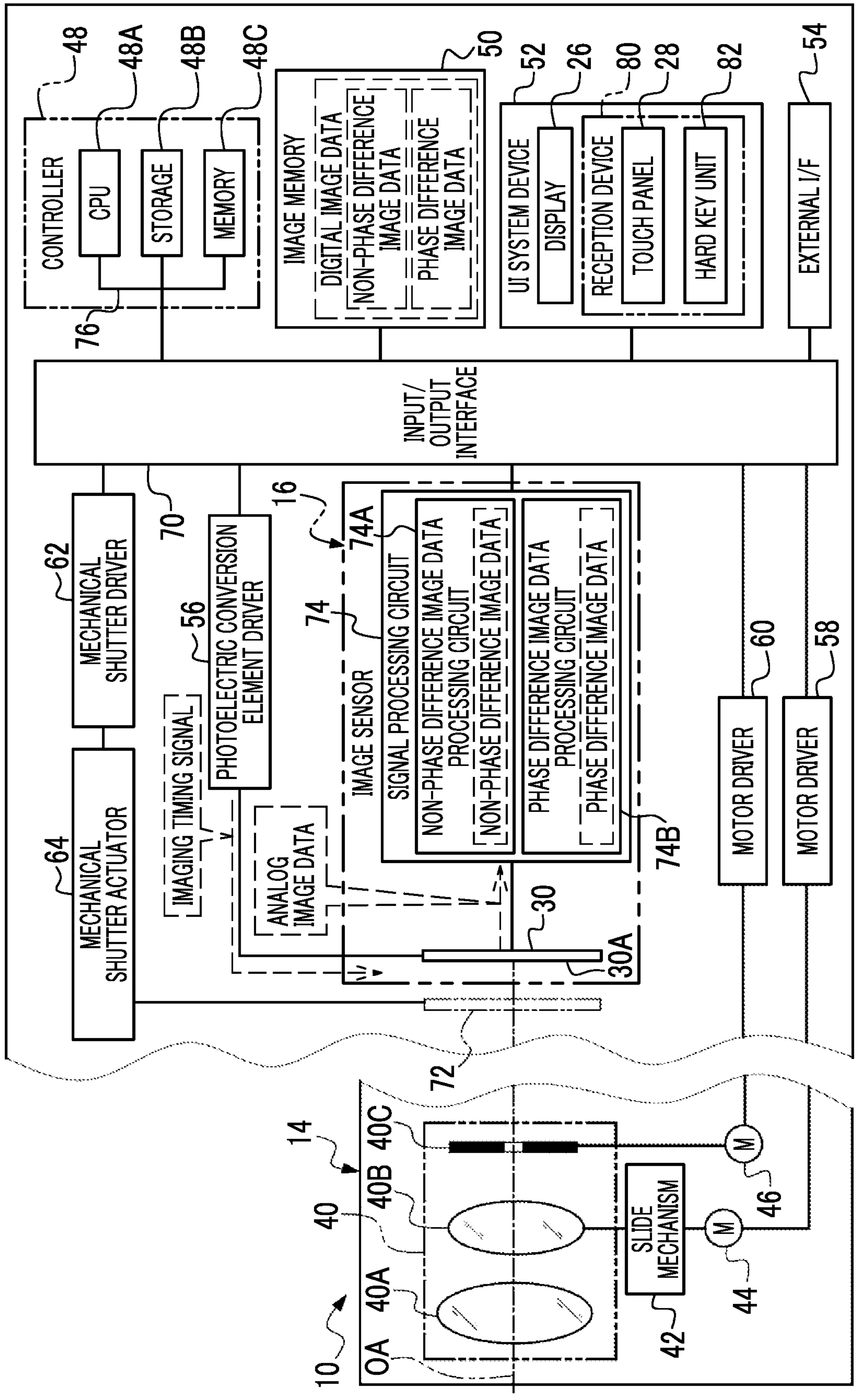
FIG. 6 is a schematic configuration diagram showing an example of a hardware configuration of the imaging apparatus.

As an example, as shown in FIG. 6, the imaging lens 40 comprises an objective lens 40A, a focus lens 40B, and a stop 40C. The objective lens 40A, the focus lens 40B, and the stop 40C are disposed in an order of the objective lens 40A, the focus lens 40B, and the stop 40C along the optical axis OA from the subject side (object side) to the imaging apparatus body 12 side (image side).

In addition, the interchangeable lens 14 comprises a slide mechanism 42, a motor 44, and a motor 46. The focus lens 40B is attached to the slide mechanism 42 in a slidable manner along the optical axis OA. In addition, the motor 44 is connected to the slide mechanism 42, and the slide mechanism 42 moves the focus lens 40B along the optical axis OA by receiving power of the motor 44 to operate. The stop 40C is a stop with an aperture having a variable size. The motor 46 is connected to the stop 40C, and the stop 40C adjusts exposure by receiving the power of the motor 46 to operate. It should be noted that a structure and/or an operation method of the interchangeable lens 14 can be changed as needed.

The motors 44 and 46 are connected to the imaging apparatus body 12 via a mount (not shown), and driving of the motors 44 and 46 is controlled in accordance with a command from the imaging apparatus body 12. It should be noted that, in the present embodiment, stepping motors are adopted as an example of the motors 44 and 46. Therefore, the motors 44 and 46 operate in synchronization with a pulse signal in accordance with the command from the imaging apparatus body 12. In addition, in the example shown in FIG. 6, the example is shown in which the motors 44 and 46 are provided in the interchangeable lens 14, but the technology of the present disclosure is not limited to this. One of the motors 44 and 46 may be provided in the imaging apparatus body 12, or both the motors 44 and 46 may be provided in the imaging apparatus body 12.

In the imaging apparatus 10, in a case of the imaging mode, an MF mode and an AF mode are selectively set in accordance with an instruction given to the imaging apparatus body 12. The MF mode is an operation mode for manually focusing. In the MF mode, for example, in a case in which a focus ring of the interchangeable lens 14 is operated by the user, the focus lens 40B is moved along the optical axis OA with a movement amount corresponding to an operation amount of the focus ring to adjust the focus.

In the AF mode, the imaging apparatus body 12 calculates a focus position in accordance with the subject distance, and moves the focus lens 40B toward the calculated focus position to adjust the focus. Here, the "focus position" refers to a position of the focus lens 40B on the optical axis OA in an in-focus state.

It should be noted that, in the following, for convenience of description, the control of aligning the focus lens 40B with the focus position is also referred to as an "AF control". In addition, in the following, for convenience of description, the calculation of the focus position is also referred to as an "AF calculation". In the imaging apparatus 10, a CPU 48A described below performs the AF calculation to detect the focus for a plurality of subjects. Moreover, the CPU 48A described below performs focusing on the subject based on a result of the AF calculation, that is, a detection result of the focus.

The imaging apparatus body 12 comprises the image sensor 16, a controller 48, an image memory 50, a UI system device 52, an external I/F 54, a photoelectric conversion element driver 56, a motor driver 58, a motor driver 60, a mechanical shutter driver 62, and a mechanical shutter actuator 64. In addition, the imaging apparatus body 12 comprises a mechanical shutter 72. In addition, the image sensor 16 comprises a signal processing circuit 74.

An input/output interface 70 is connected to the controller 48, the image memory 50, the UI system device 52, the external I/F 54, the photoelectric conversion element driver 56, the motor driver 58, the motor driver 60, the mechanical shutter driver 62, and the signal processing circuit 74.

The controller 48 comprises the CPU 48A, a storage 48B, and a memory 48C. The CPU 48A is an example of a "processor" according to the technology of the present disclosure, the memory 48C is an example of a "memory" according to the technology of the present disclosure, and the controller 48 is an example of an "imaging support device" and a "computer" according to the technology of the present disclosure.

The CPU 48A, the storage 48B, and the memory 48C are connected via a bus 76, and the bus 76 is connected to the input/output interface 70.

It should be noted that, in the example shown in FIG. 6, one bus is shown as the bus 76 for convenience of illustration, but a plurality of buses may be used. The bus 76 may be a serial bus, or may be a parallel bus, which includes a data bus, an address bus, a control bus, and the like.

Various parameters and various programs are stored in the storage 48B. The storage 48B is a non-volatile storage device. Here, an EEPROM is adopted as an example of the storage 48B. The EEPROM is merely an example, and an HDD and/or SSD or the like may be applied as the storage 48B instead of the EEPROM or together with the EEPROM. In addition, the memory 48C transitorily stores various pieces of information and is used as a work memory. Examples of the memory 48C include a RAM, but the technology of the present disclosure is not limited to this, and other types of storage devices may be used.

Various programs are stored in the storage 48B. The CPU 48A reads out a needed program from the storage 48B, and executes the read out program on the memory 48C. The CPU 48A controls the entire imaging apparatus body 12 in accordance with the program executed on the memory 48C. In the example shown in FIG. 6, the image memory 50, the UI system device 52, the external I/F 54, the photoelectric conversion element driver 56, the motor driver 58, the motor driver 60, and the mechanical shutter driver 62 are controlled by the CPU 48A.

The photoelectric conversion element driver 56 is connected to the photoelectric conversion element 30. The photoelectric conversion element driver 56 supplies an imaging timing signal for defining a timing of the imaging performed by the photoelectric conversion element 30 to the photoelectric conversion element 30 in accordance with an instruction from the CPU 48A. The photoelectric conversion element 30 performs reset, exposure, and output of the electric signal in response to the imaging timing signal supplied from the photoelectric conversion element driver 56. Examples of the imaging timing signal include a vertical synchronizing signal and a horizontal synchronizing signal.

In a case in which the interchangeable lens 14 is mounted on the imaging apparatus body 12, the subject light incident on the imaging lens 40 is imaged on the light-receiving surface 30A by the imaging lens 40. Under the control of the photoelectric conversion element driver 56, the photoelectric conversion element 30 photoelectrically converts the subject light received by the light-receiving surface 30A, and outputs the electric signal in accordance with the light amount of the subject light to the signal processing circuit 74 as analog image data indicating the subject light. Specifically, the signal processing circuit 74 reads out the analog image data from the photoelectric conversion element 30 in one frame unit and for each horizontal line by an exposure sequential read-out method. The analog image data is roughly divided into analog phase difference image data generated by the phase difference pixel P and analog non-phase difference image data generated by the non-phase difference pixel N.

The signal processing circuit 74 generates digital image data by digitizing the analog image data input from the photoelectric conversion element 30. The signal processing circuit 74 comprises a non-phase difference image data processing circuit 74A and a phase difference image data processing circuit 74B. The non-phase difference image data processing circuit 74A generates digital non-phase difference image data by digitizing the analog non-phase difference image data. The phase difference image data processing circuit 74B generates digital phase difference image data by digitizing the analog phase difference image data.

It should be noted that, in the following, for convenience of description, in a case in which the distinction is not needed, the digital non-phase difference image data and the digital phase difference image data are referred to as "digital image data". In addition, in the following, for convenience of description, in a case in which the distinction is not needed, the analog image data and the digital image data are referred to as "image data".

The mechanical shutter 72 is a focal plane shutter and is disposed between the stop 40C and the light-receiving surface 30A. The mechanical shutter 72 comprises a front curtain (not shown) and a rear curtain (not shown). Each of the front curtain and the rear curtain comprises a plurality of blades. The front curtain is disposed on the subject side with respect to the rear curtain.

The mechanical shutter actuator 64 is an actuator including a front curtain solenoid (not shown) and a rear curtain solenoid (not shown). The front curtain solenoid is a drive source for the front curtain, and is mechanically connected to the front curtain. The rear curtain solenoid is a drive source for the rear curtain, and is mechanically connected to the rear curtain. The mechanical shutter driver 62 controls the mechanical shutter actuator 64 in accordance with an instruction from the CPU 48A.

The front curtain solenoid selectively performs winding and pulling down of the front curtain by generating power under the control of the mechanical shutter driver 62 and giving the generated power to the front curtain. The rear curtain solenoid selectively performs winding and pulling down of the rear curtain by generating power under the control of the mechanical shutter driver 62 and giving the generated power to the rear curtain. In the imaging apparatus 10, the opening and closing of the front curtain and the opening and closing of the rear curtain are controlled by the CPU 48A, so that an exposure amount with respect to the photoelectric conversion element 30 is controlled.

In the imaging apparatus 10, the imaging for the live view image and the imaging for a recording image for recording the still picture and/or the video are performed by the exposure sequential read-out method (rolling shutter method). The image sensor 16 has an electronic shutter function, and the imaging for the live view image is realized by activating the electronic shutter function without operating the mechanical shutter 72 in the fully opened state.

On the other hand, imaging accompanied by the main exposure, that is, the imaging for the still picture (hereinafter, also referred to as "main exposure imaging") is realized by activating the electronic shutter function and operating the mechanical shutter 72 such that the mechanical shutter 72 transitions from the front curtain closed state to the rear curtain closed state. It should be noted that the image obtained by performing the main exposure imaging by the imaging apparatus 10 (hereinafter, also referred to as a "main exposure image") is an example of a "captured image" according to the technology of the present disclosure.

The digital image data is stored in the image memory 50. That is, the non-phase difference image data processing circuit 74A stores the non-phase difference image data in the image memory 50, and the phase difference image data processing circuit 74B stores the phase difference image data in the image memory 50. The CPU 48A acquires the digital image data from the image memory 50 and executes various pieces of processing by using the acquired digital image data.

The UI system device 52 comprises the display 26, and the CPU 48A displays various pieces of information on the display 26. In addition, the UI system device 52 comprises a reception device 80. The reception device 80 comprises the touch panel 28 and a hard key unit 82. The hard key unit 82 is a plurality of hard keys including the instruction key 24 (see FIG. 2). The CPU 48A is operated in accordance with various instructions received by the touch panel 28. It should be noted that, here, although the hard key unit 82 is provided in the UI system device 52, the technology of the present disclosure is not limited to this, and for example, the hard key unit 82 may be connected to the external I/F 54.

The external I/F 54 controls the exchange of various pieces of information with the device (hereinafter, also referred to as an "external device") that is present outside the imaging apparatus 10. Examples of the external I/F 54 include a USB interface. External devices (not shown), such as a smart device, a personal computer, a server, a USB memory, a memory card, and/or a printer, are directly or indirectly connected to the USB interface.

The motor driver 58 is connected to the motor 44 and controls the motor 44 in accordance with the instruction from the CPU 48A. The position of the focus lens 40B on the optical axis OA is controlled via the slide mechanism 42 by controlling the motor 44. The focus lens 40B is moved in accordance with the instruction from the CPU 48A while avoiding a main exposure period by the image sensor 16.

The motor driver 60 is connected to the motor 46 and controls the motor 46 in accordance with the instruction from the CPU 48A. The size of the aperture of the stop 40C is controlled by controlling the motor 46.

Figure 7:
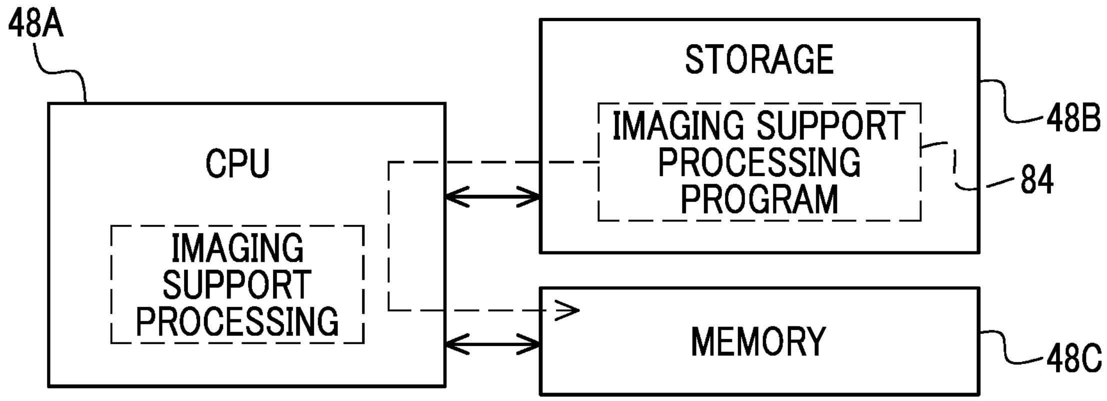
FIG. 7 is a block diagram showing an example of a configuration of a controller provided in the imaging apparatus.

As an example, as shown in FIG. 7, an imaging support processing program 84 is stored in the storage 48B. The CPU 48A reads out the imaging support processing program 84 from the storage 48B and executes the read out imaging support processing program 84 on the memory 48C. The CPU 48A performs imaging support processing in accordance with the imaging support processing program 84 executed on the memory 48C (see also FIGS. 20A and 20B).

By executing the imaging support processing, first, the CPU 48A acquires frequency information indicating a frequency of a subject feature classified into a category based on a feature of the subject (hereinafter, also referred to as "subject feature") specified from the main exposure image obtained by the imaging with the imaging apparatus 10. Moreover, the CPU 48A executes support processing of supporting the imaging by the imaging apparatus 10 (hereinafter, also simply referred to as "support processing") based on the acquired frequency information. In the following, the contents of the imaging support processing will be described in more detail.

Figure 8:
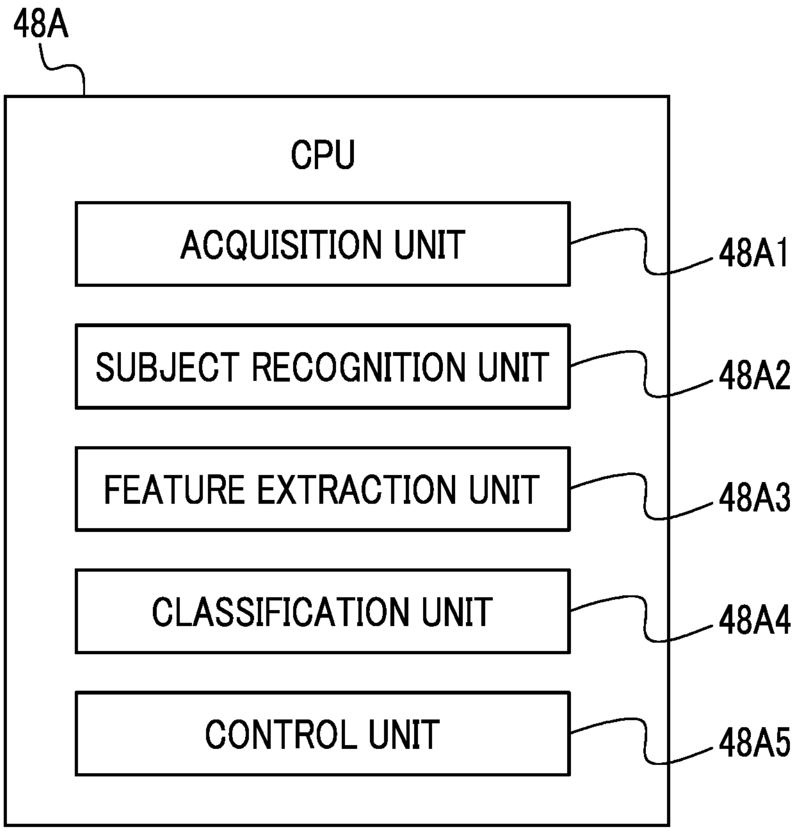
FIG. 8 is a block diagram showing an example of a main function of a CPU provided in the imaging apparatus.

As an example, as shown in FIG. 8, the CPU 48A executes the imaging support processing program 84 to be operated as an acquisition unit 48A1, a subject recognition unit 48A2, a feature extraction unit 48A3, a classification unit 38A4, and a control unit 48A5. It should be noted that the classification unit 38A4 is an example of a "classifier" according to the technology of the present disclosure.

Figure 9:
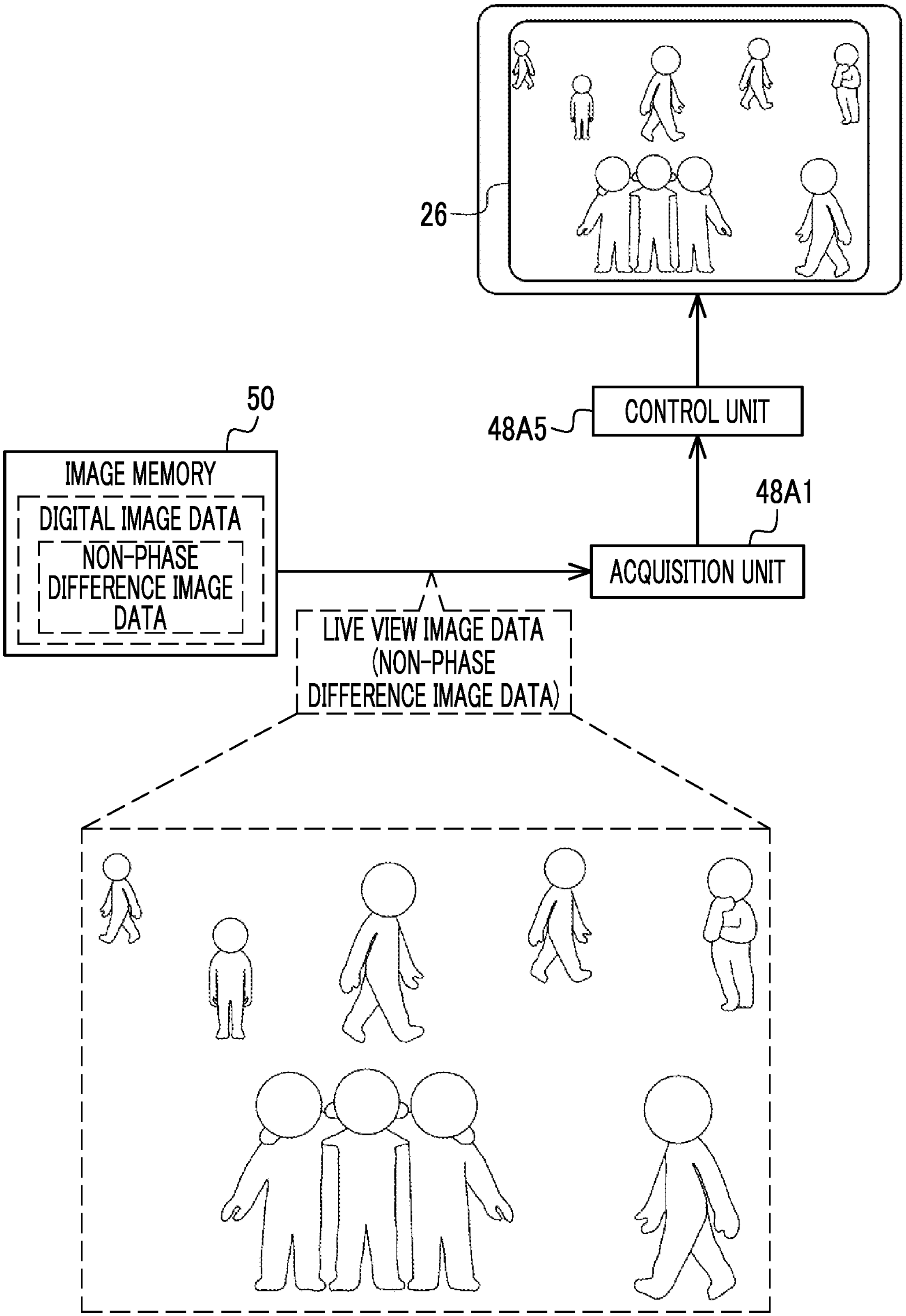
FIG. 9 is a conceptual diagram showing an example of processing contents in a case in which the CPU is operated as an acquisition unit and a control unit.

As an example, as shown in FIG. 9, the acquisition unit 48A1 acquires the non-phase difference image data from the image memory 50 as live view image data. The live view image data is acquired by the acquisition unit 48A1 from the image memory 50 at a predetermined frame rate (for example, 60 fps). The live view image data is image data indicating the live view image. The live view image data is obtained by imaging the imaging region with the image sensor 16. In the example shown in FIG. 9, the live view image data obtained by imaging the imaging region in which a plurality of persons are included as the live view image data. Here, the plurality of persons is an example of a "plurality of objects" according to the technology of the present disclosure.

It should be noted that, in the present embodiment, for convenience of description, a person is described as the subject of the imaging apparatus 10, but the technology of the present disclosure is not limited to this, and the subject may be a subject other than the person. Examples of the subject other than the person include small animals, insects, plants, architectures, landscapes, an organ of a living body, and/or a cell of the living body. That is, the imaging region does not have to include the person, and need only include a subject that can be imaged by the image sensor 16.

Each time the acquisition unit 48A1 acquires the live view image data for one frame, the control unit 48A5 displays the live view image indicated by the live view image data acquired by the acquisition unit 48A1 on the display 26. The live view image includes a plurality of person images indicating the plurality of persons as a plurality of subject images the plurality of subjects.

Figure 10:
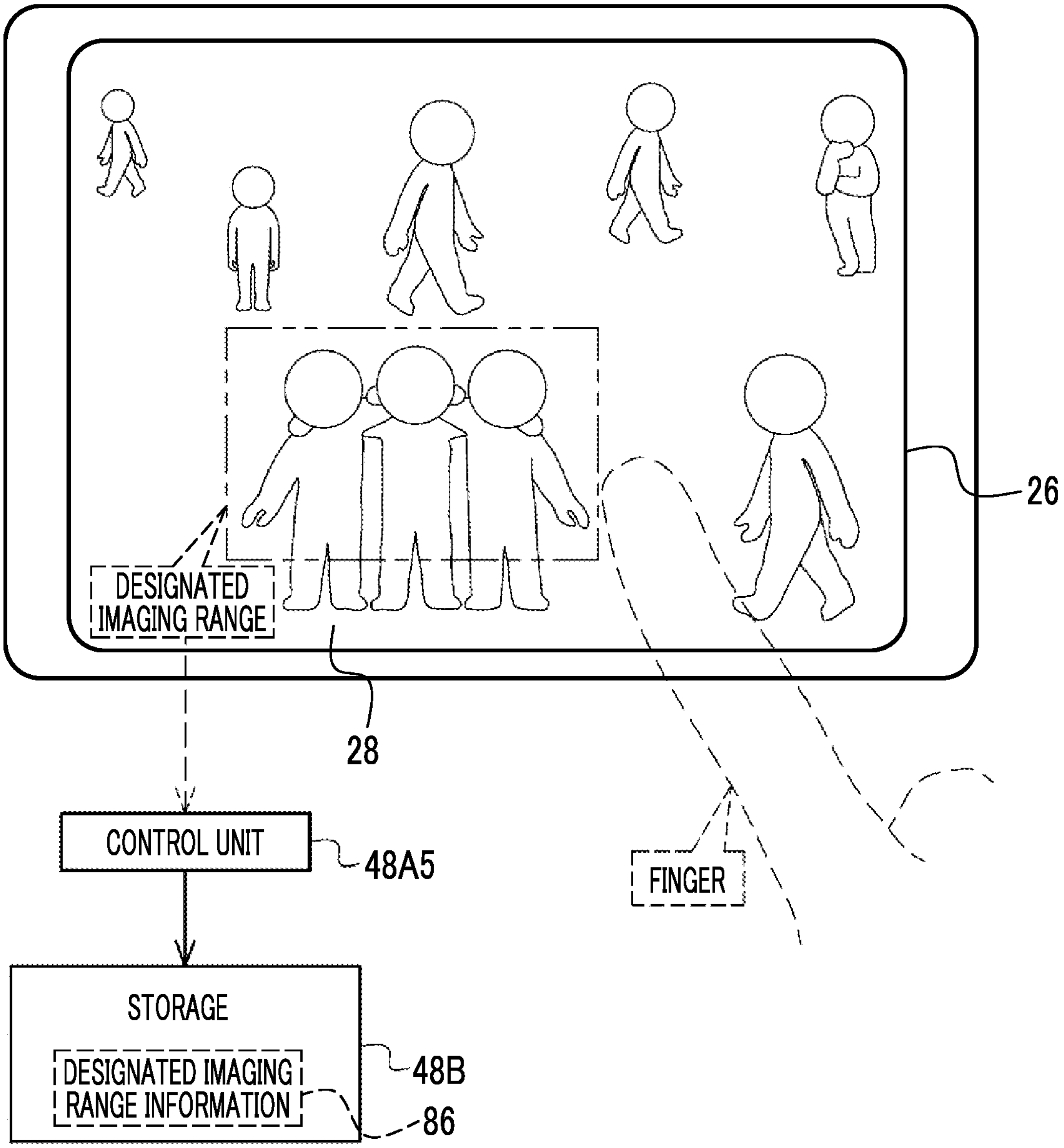
FIG. 10 is a conceptual diagram showing an example of processing contents in a case in which the CPU is operated as the control unit.

As an example, as shown in FIG. 10, in a state in which the live view image is displayed on the display 26, a designated imaging range is determined in accordance with an instruction given from an outside (for example, an instruction received by the reception device 80). For example, the designated imaging range is determined by operating the touch panel 28 with the finger of the user. One of purposes of determining the designated imaging range is, for example, to determine an imaging range which is a focusing target.

In the example shown in FIG. 10, an inside of the rectangle frame (in the example shown in FIG. 10, a frame of the two-dot chain line) formed by the user sliding the finger on the touch panel 28 while contacting the touch panel 28 is the designated imaging range. The control unit 48A5 stores designated imaging range information 86 indicating the designated imaging range determined in accordance with an instruction given from the outside in the storage 48B. The designated imaging range information 86 stored in the storage 48B is updated each time the designated imaging range is newly determined.

As an example, as shown in FIG. 11, the acquisition unit 48A1 acquires the non-phase difference image data from the image memory 50 as main exposure image data. The subject recognition unit 48A2 recognizes the subject in the imaging region based on the main exposure image data acquired by the acquisition unit 48A1. In the example shown in FIG. 11, a trained model 92 is stored in the storage 48B, and the subject recognition unit 48A2 recognizes the subject in the imaging region by using the trained model 92.

Examples of the trained model 92 include a trained model using a cascade classifier. The trained model using the cascade classifier is constructed as a trained model for image recognition, for example, by performing supervised machine learning on a neural network. It should be noted that the trained model 92 is not limited to the trained model using the cascade classifier, and may be a dictionary for pattern matching. That is, the trained model 92 may be any trained model as long as it is a trained model used in image analysis performed in a case in which the subject is recognized.

The subject recognition unit 48A2 performs the image analysis on the main exposure image data to recognize the person included in the imaging region as the subject. In addition, the subject recognition unit 48A2 performs the image analysis on the main exposure image data to recognize the feature of the person, such as a face (expression) of the person, a posture of the person, the opening and closing of eyes of the person, and the presence or absence of the person within the designated imaging range, as the subject feature.

The subject recognition unit 48A2 recognizes the face of the person as one of the subject features. The face of the person is, for example, any of a smiling face, a crying face, an angry face, or a straight face. The subject recognition unit 48A2 recognizes, for example, the smiling face, the crying face, the angry face, and the straight face as the subject features belonging to the category of "face of the person". It should be noted that, here, the smiling face refers to an expression of the person smiling, the crying face refers to an expression of the person crying, the angry face refers to an expression of the person who is angry, and the straight face refers to an expression that does not correspond to any of the smiling face, the crying face, or the angry face.

In addition, the subject recognition unit 48A2 recognizes the posture of the person as one of the subject features. The posture of the person is, for example, any of front or non-front. For example, the subject recognition unit 48A2 recognizes the front and the non-front as the subject features belonging to the category of "posture of the person". It should be noted that, here, the front means a state in which the person faces the front with respect to the light-receiving surface 30A (see FIG. 6). In addition, the non-front means that a direction of the person is a direction other than the front.

In addition, the subject recognition unit 48A2 recognizes the eyes of the person as one of the subject features. The eyes of the person are, for example, any of open eyes or closed eyes. The subject recognition unit 48A2 recognizes, for example, open eyes and closed eyes as the subject features belonging to the category of "eyes of the person". It should be noted that, here, the open eyes refer to a state in which the person has his/her eyes open, and the closed eyes refer to a state in which the person has his/her eyes closed.

In addition, the subject recognition unit 48A2 recognizes the presence or absence of the person within the designated imaging range as one of the subject features. The subject recognition unit 48A2 recognizes "within the designated imaging range" and "out of the designated imaging range" as the subject features belonging to the category of "designated imaging range". It should be noted that, here, "within the designated imaging range" refers to a state in which the person is present within the designated imaging range, and "out of the designated imaging range" refers to a state in which the person is present out of the designated imaging range.

In addition, the subject recognition unit 48A2 stores recognition result information 94 indicating a result of recognizing the subject (here, the person as an example) included in the imaging region in the memory 48C. The recognition result information 94 is overwritten and saved in the memory 48C in a one frame unit. The recognition result information 94 is information including a subject name, the subject feature, and recognition region specification coordinates, and is stored in the memory 48C in a unit of the subject included in the imaging region in a state in which the subject name, the subject feature, and the recognition region specification coordinates are associated with each other.

Here, the recognition region specification coordinates refer to coordinates indicating the position in the live view image of the quadrangular frame (hereinafter, also referred to as a "subject frame") that surrounds a feature region (for example, a face region indicating the face of the person) of a subject image indicating the subject recognized by the subject recognition unit 48A2. Examples of the recognition region specification coordinates include the coordinates of two vertices on a diagonal line of the subject frame in the live view image (for example, coordinates of an upper left corner and coordinates of a lower right corner). It should be noted that, as long as the shape of the subject frame is quadrangular, the recognition region specification coordinates may be coordinates of three vertices or may be coordinates of four vertices. In addition, the shape of the subject frame is not limited to be quadrangular and may be another shape. In this case as well, coordinates for specifying the position of the subject image in the live view image need only be used as the recognition region specification coordinates.

As an example, as shown in FIG. 12, the feature extraction unit 48A3 extracts subject-specific feature information from the recognition result information 94 stored in the memory 48C. The subject-specific feature information is information in which the subject name and the subject feature are associated with each other on a one-to-one basis in the unit of the subject.

Figure 13:
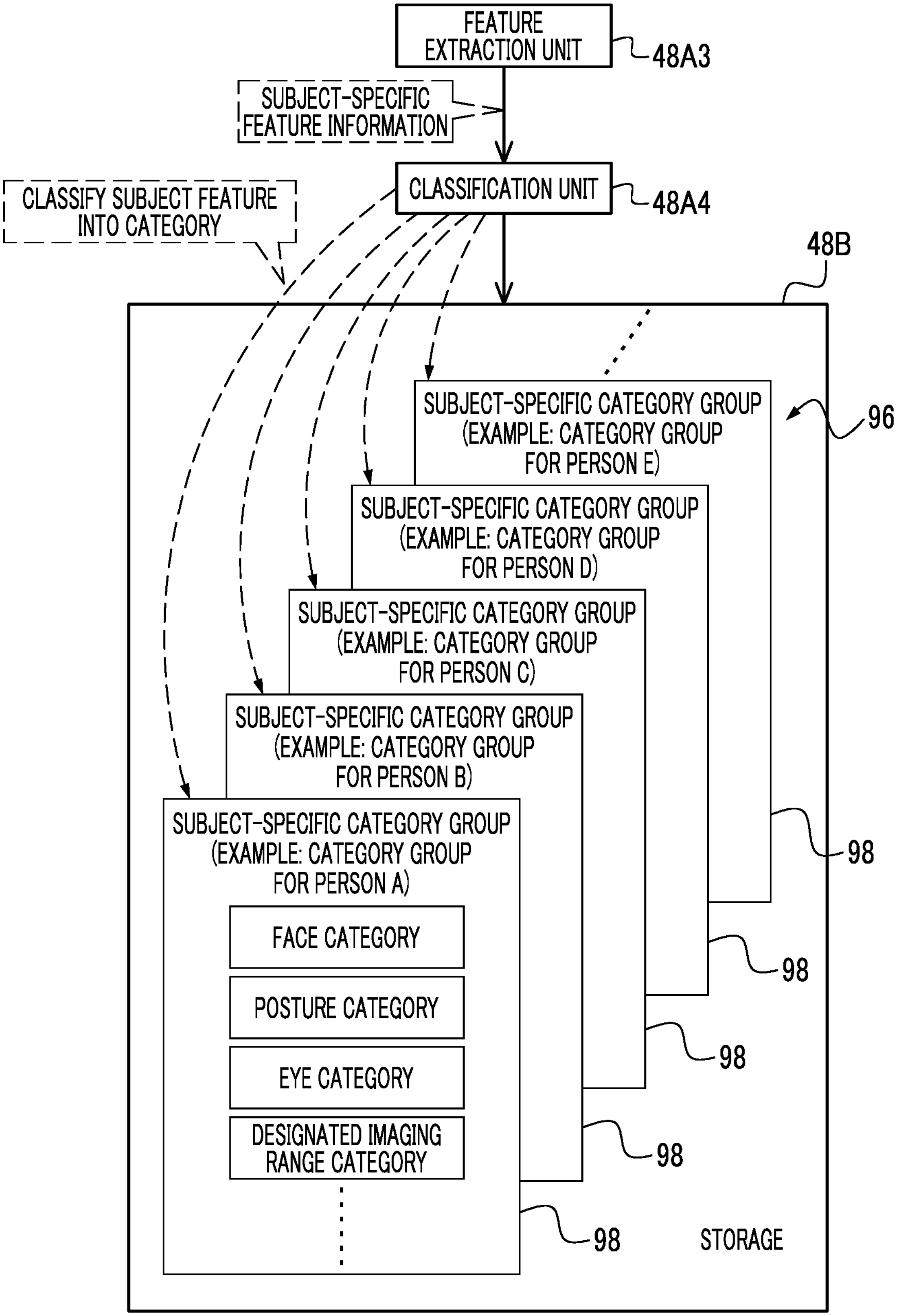
FIG. 13 is a conceptual diagram showing an example of processing contents in a case in which the CPU is operated as the feature extraction unit and a classification unit.

As an example, as shown in FIG. 13, a category database 96 is constructed in the storage 48B. The category database 96 includes a plurality of subject-specific category groups 98. One subject-specific category group 98 is assigned to each subject. In the example shown in FIG. 13, as the plurality of subject-specific category groups 98, a plurality of category groups (category group assigned to each person) including a category group for a person A, a category group for a person B, a category group for a person C, a category group for a person D, and a category group for a person E are shown. Each of the plurality of subject-specific category groups 98 is a category in which each of the plurality of persons themselves can be specified. It should be noted that the subject-specific category group 98 is an example of an "object target category" according to the technology of the present disclosure.

The classification unit 48A4 specifies the subject-specific category group 98 corresponding to the subject name from the subject name included in the subject-specific feature information, and classifies the subject feature corresponding to the subject name into the specified subject-specific category group 98.

The subject-specific category group 98 includes a plurality of categories. Each of the plurality of categories included in the subject-specific category group 98 is a category which is created for each unit independent of each other. The unit refers to a unit of the subject feature. In the example shown in FIG. 13, a face category, a posture category, an eye category, a designated imaging range category, and the like are shown as an example of the plurality of categories included in the subject-specific category group 98. The face category is a category determined by the subject feature in a unit of the "face of the person". The posture category is a category determined by the subject feature in a unit of the "posture of the person". The eye category is a category determined by the subject feature in units of the "eyes of the person". The designated imaging range category is a category determined by the subject feature in a unit of the "designated imaging range" applied to the person.

Figure 14:
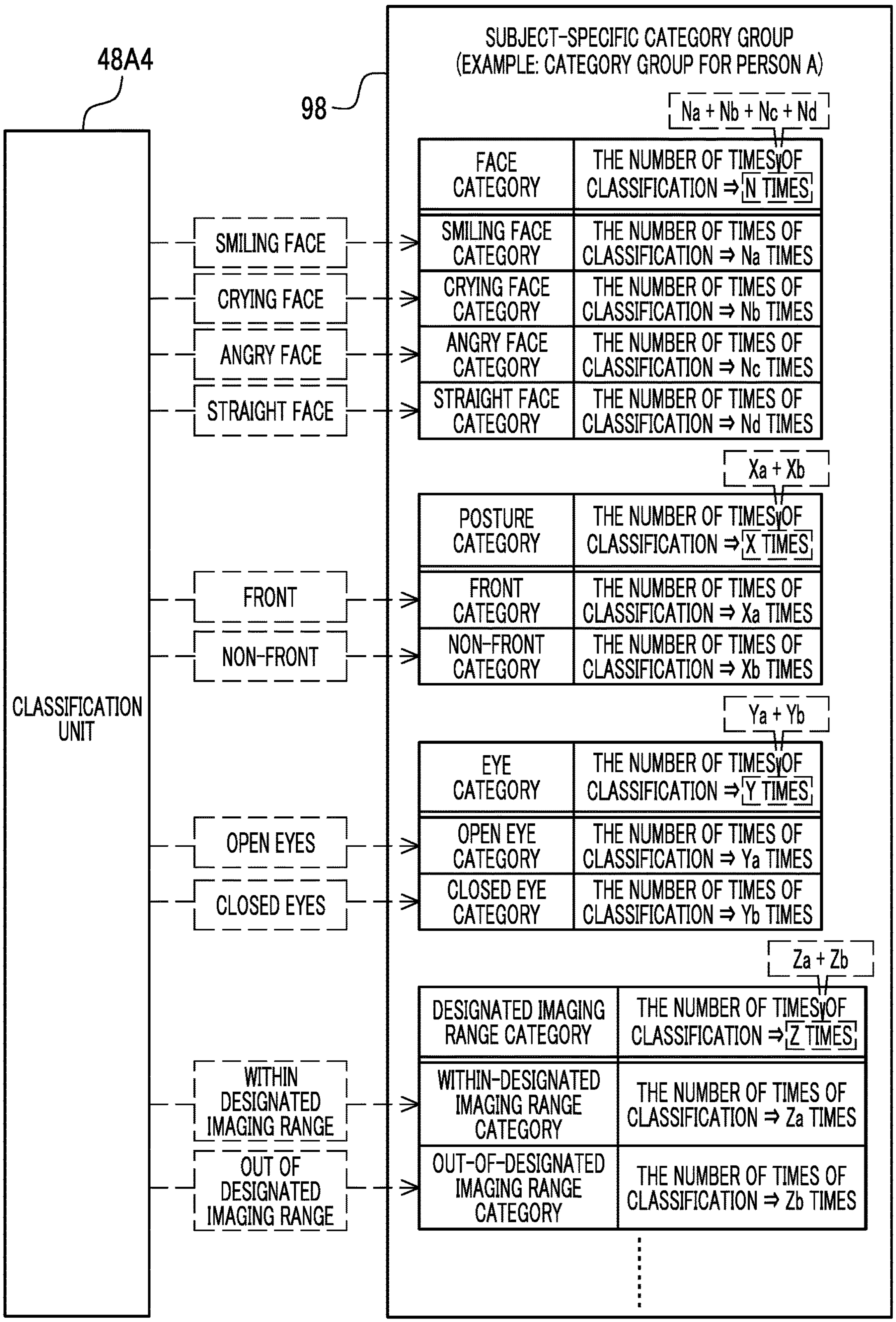
FIG. 14 is a conceptual diagram showing an example of an aspect in which subject features are classified into a plurality of categories by the classification unit.

As an example, as shown in FIG. 14, in a case in which the face category, the posture category, the eye category, and the designated imaging range category are set as a large category, a plurality of small categories are subordinate to the large category. The small category is a category into which the subject feature that is subordinate to the subject feature indicated by the large category is classified. The number of times of classification is associated with the plurality of small categories. The subject feature is classified into the small category by the classification unit 48A4. Each time the subject feature is classified and added into the small category once, "1" is added to the number of times of classification as the number of times the subject feature is classified.

In the example shown in FIG. 14, a smiling face category, a crying face category, an angry face category, and a straight face category are shown as the plurality of categories included in the face category in the subject-specific category group 98 used for the person A. The classification unit 48A4 classifies the subject feature of the person A of "smiling face", into the smiling face category. Moreover, each time the classification unit 48A4 classifies the subject feature of "smiling face" into the smiling face category once, the classification unit 48A4 adds "1" to the number of times of classification for the smiling face category. Each of the subject features of the person A of "crying face", "angry face", and "straight face" is also classified into the corresponding category by the classification unit 48A4 and "1" is added to the corresponding number of times of classification in the same manner as the subject feature of "smiling face".

The number of times of classification is also associated with the face category. The number of times of classification for the face category is the sum of the number of times of classification for the smiling face category, the number of times of classification for the crying face category, the number of times of classification for the angry face category, and the number of times of classification for the straight face category.

In addition, in the example shown in FIG. 14, a front category and a non-front category are shown as the plurality of categories included in the posture category in the subject-specific category group 98 used for the person A. The classification unit 48A4 classifies the subject feature of "front" of the person A into the front category. Moreover, each time the classification unit 48A4 classifies the subject feature of "front" into the front category once, the classification unit 48A4 adds "1" to the number of times of classification for the front category. The subject feature of the person A of "non-front" is also classified into the non-front category by the classification unit 48A4 and "1" is added to the corresponding number of times of classification in the same manner as the subject feature of "front".

The number of times of classification is also associated with the posture category. The number of times of classification for the posture category is the sum of the number of times of classification for the front category and the number of times of classification for the non-front category.

In addition, in the example shown in FIG. 14, an open eye category and a closed eye category are shown as the plurality of categories included in the eye category in the subject-specific category group 98 used for the person A. The classification unit 48A4 classifies the subject feature of "open eyes" of the person A into the open eye category. Moreover, each time the classification unit 48A4 classifies the subject feature of "open eyes" into the open eye category once, the classification unit 48A4 adds "1" to the number of times of classification for the open eye category. The subject feature of the person A of "closed eyes" is also classified into the closed eye category by the classification unit 48A4 and "1" is added to the corresponding number of times of classification in the same manner as the subject feature of "open eyes".

The number of times of classification is also associated with the eye category. The number of times of classification for the eye category is the sum of the number of times of classification for the open eye category and the number of times of classification for the closed eye category.

Further, in the example shown in FIG. 14, a within-designated imaging range category and an out-of-designated imaging range category are shown as the plurality of categories included within the designated imaging range category in the subject-specific category group 98 used for the person A. The classification unit 48A4 classifies the subject feature "within the designated imaging range" into the within-designated imaging range category. Moreover, each time the classification unit 48A4 classifies the subject feature "within the designated imaging range" into the within-designated imaging range category once, the classification unit 48A4 adds "1" to the number of times of classification for the within-designated imaging range category. The subject feature of "out of the designated imaging range" is also classified into the out-of-designated imaging range category by the classification unit 48A4 and "1" is added to the corresponding number of times of classification in the same manner as the subject feature of "within the designated imaging range".

The number of times of classification is also associated with the designated imaging range category. The number of times of classification for the designated imaging range category is the sum of the number of times of classification for the within-designated imaging range category and the number of times of classification for the out-of-designated imaging range category.

The subject-specific category group 98 is a category determined by the subject feature in a unit of "subject name", and the subject feature of the subject name is classified into the subject-specific category group 98. The number of times of classification is also associated with the subject-specific category group 98. The number of times of classification associated with the subject-specific category group 98 is the sum of the number of times of classification of a plurality of large categories belonging to the subject-specific category group 98.

Figure 15:
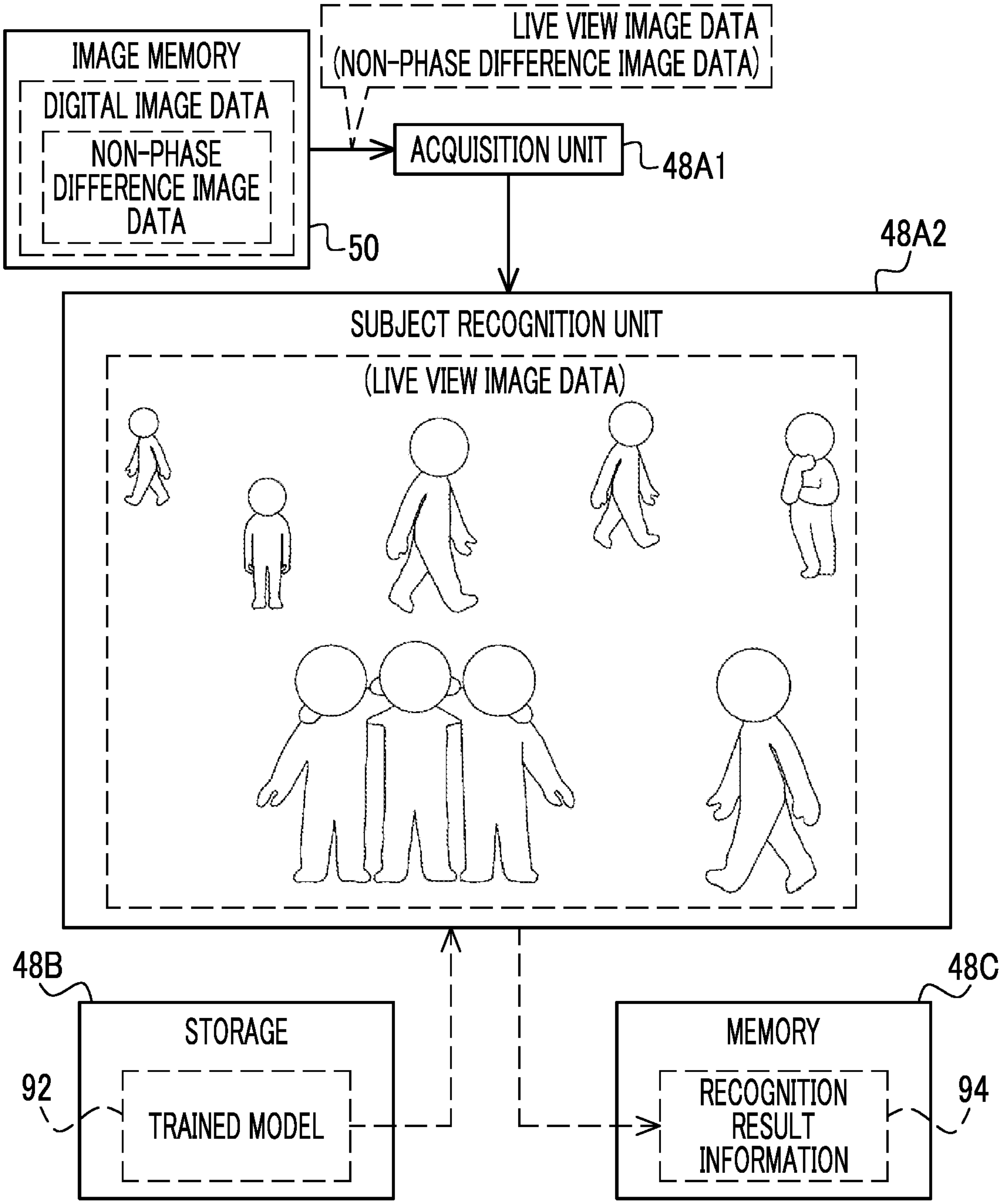
FIG. 15 is a conceptual diagram showing an example of processing contents in which the subject recognition unit recognizes a subject based on live view image data.

As an example, as shown in FIG. 15, the acquisition unit 48A1 acquires the non-phase difference image data from the image memory 50 as live view image data. The subject recognition unit 48A2 recognizes the subject in the imaging region by using the trained model 92 based on the live view image data acquired by the acquisition unit 48A1.

The subject recognition unit 48A2 recognizes the person included in the imaging region as the subject by performing the image analysis on the live view image data. In addition, the subject recognition unit 48A2 performs the image analysis on the live view image data to recognize the feature of the person, such as the face of the person, the posture of the person, the opening and closing of eyes of the person, and the presence or absence of the person within the designated imaging range, as the subject feature.

That is, the subject recognition unit 48A2 recognizes the smiling face, the crying face, the angry face, and the straight face as the subject features belonging to the face category by performing the image analysis on the live view image data. In addition, the subject recognition unit 48A2 performs the image analysis on the live view image data to recognize the front and the non-front as the subject features belonging to the posture category. In addition, the subject recognition unit 48A2 performs the image analysis on the live view image data to recognize the open eyes and closed eyes as the subject features belonging to the eye category. Further, the subject recognition unit 48A2 performs the image analysis on the live view image data to recognize "within the designated imaging range" and "out of the designated imaging range" as the subject features belonging to the designated imaging range category. The subject recognition unit 48A2 stores the recognition result information 94 indicating the result of recognizing the person included in the imaging region in the memory 48C. The recognition result information 94 is overwritten and saved in the memory 48C in a one frame unit.

Figure 16:
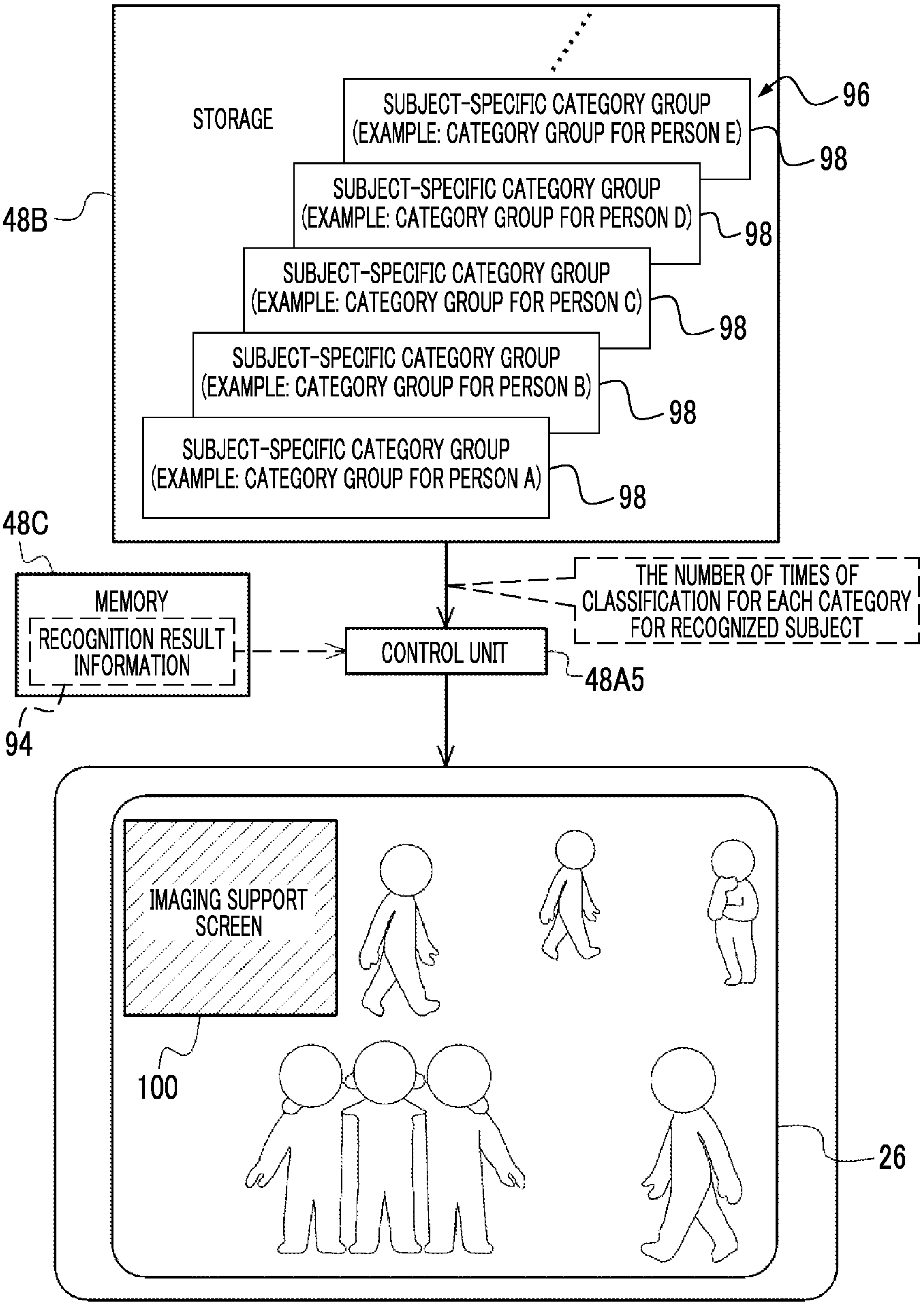
FIG. 16 is a conceptual diagram showing an example of processing contents in a case in which an imaging support screen is displayed in a live view image.

As an example, as shown in FIG. 16, the control unit 48A5 displays the live view image indicated by the live view image data acquired by the acquisition unit 48A1 on the display 26. In addition, the control unit 48A5 acquires the number of times of classification for each category for the person (hereinafter, also referred to as a "recognized person") recognized as the subject by the subject recognition unit 48A2 based on the live view image data from each category included in the category database 96 with reference to the recognition result information 94 stored in the memory 48C. That is, the control unit 48A5 acquires the number of times of classification for each recognized person from each category of the subject-specific category group 98 which corresponds to the recognized person.

The control unit 48A5 generates an imaging support screen 100 based on the number of times of classification acquired from each category included in the category database 96, and displays the generated imaging support screen 100 on the live view image in a superimposed manner. In the example shown in FIG. 16, the imaging support screen 100 is displayed on an upper left of the live view image.

Figure 17:
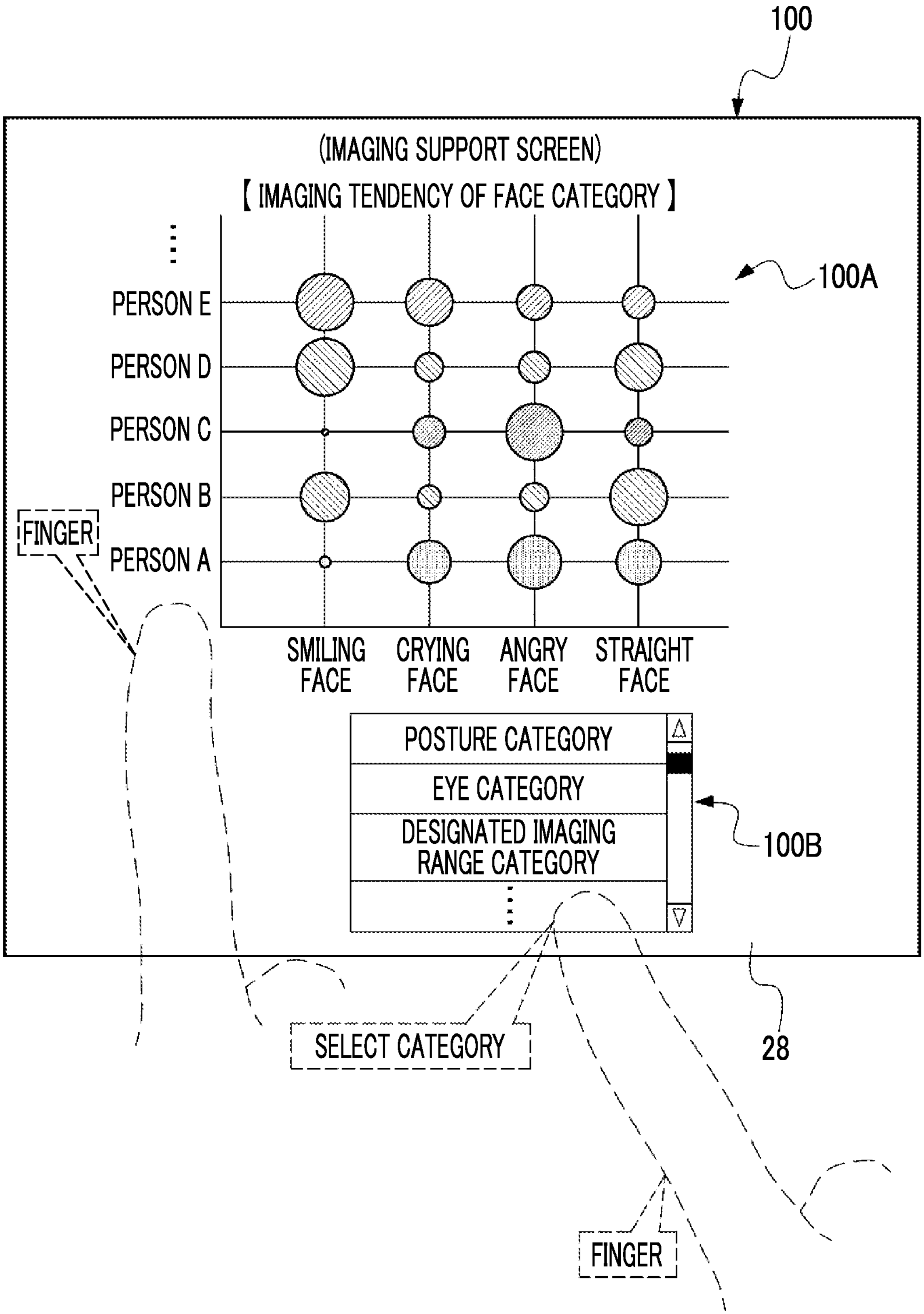
FIG. 17 is a screen view showing an example of an aspect in which a bubble chart and the like are displayed in the imaging support screen.

As an example, as shown in FIG. 17, the imaging support screen 100 displays a bubble chart 100A and a category selection screen 100B. The bubble chart 100A is a chart in which bubbles indicating the number of times of classification are plotted on two axes, an axis indicating a plurality of recognized persons and an axis indicating the category.

In the example shown in FIG. 17, the bubble chart related to the face category (hereinafter, also referred to as a "face category bubble chart") is shown as an example of the bubble chart 100A. The face category bubble chart is a chart in which bubbles of the number of times of classification of each of the smiling face category, the crying face category, the angry face category, and the straight face category belonging to the face category are plotted for each of the plurality of persons including the persons A to E.

In the imaging support screen 100, in addition to the face category bubble chart, a bubble chart related to the posture category (hereinafter, also referred to as a "posture category bubble chart"), a bubble chart related to the eye category (hereinafter, also referred to as an "eye category bubble chart"), and a bubble chart related to the designated imaging range category (hereinafter, also referred to as a "designated imaging range category bubble chart") are selectively displayed in accordance with the instruction given from the outside. Here, examples of the instruction given from the outside include the instruction received by the reception device 80. In the example shown in FIG. 17, a plurality of soft keys in which the names of the respective categories are shown are displayed in the category selection screen 100B using a scrolling method. In a case in which any soft key is turned on via the touch panel by an operation with the finger of the user, the bubble chart related to the category corresponding to the turned on soft key is displayed in the imaging support screen 100 as a new bubble chart 100A.

Figure 18:
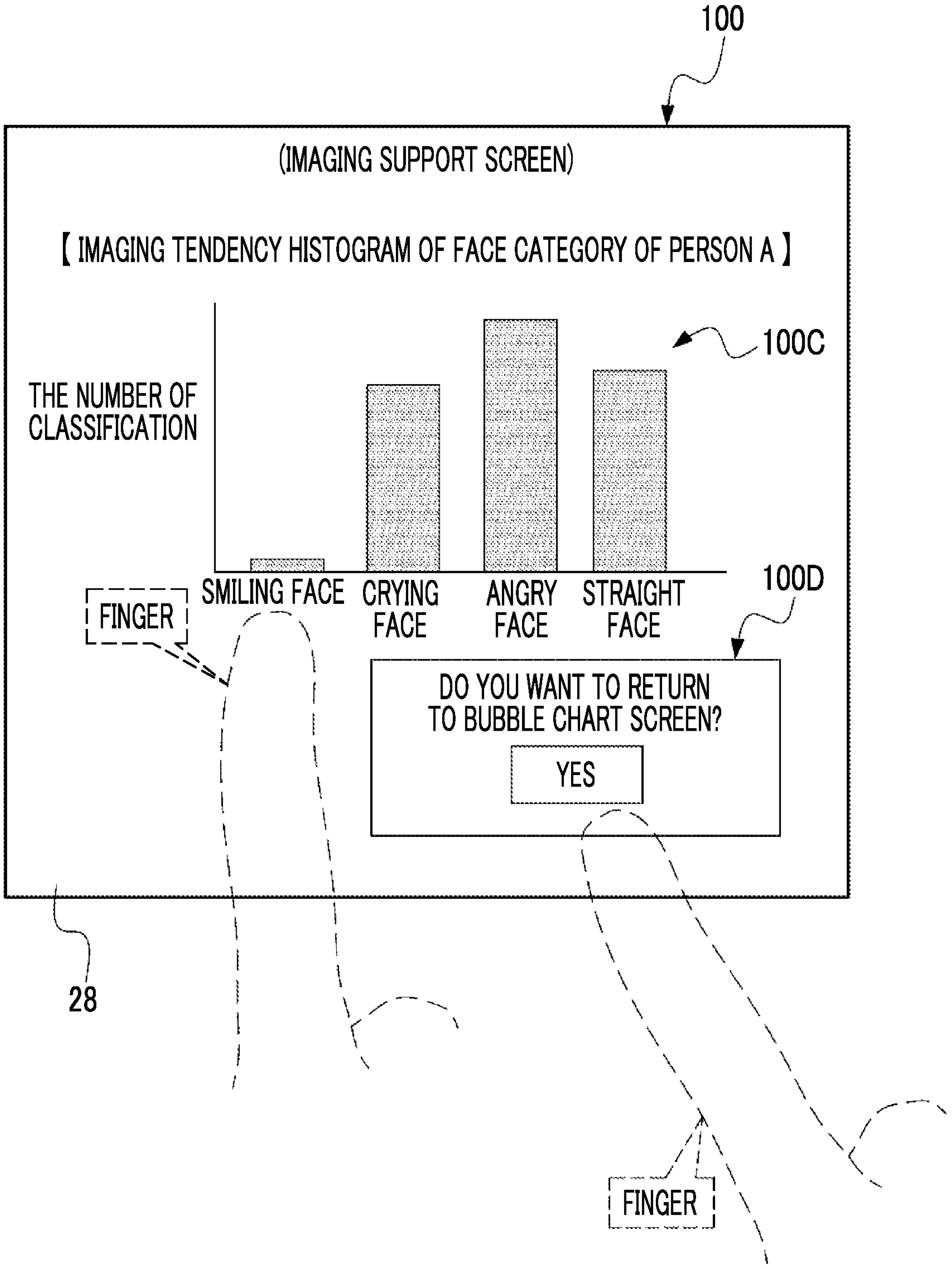
FIG. 18 is a screen view showing an example of an aspect in which a histogram and the like are displayed in the imaging support screen.

In addition, in a case in which any person in the bubble chart 100A is selected via the touch panel by the operation with the finger of the user, for the selected person, the number of times of classification of each category of the bubble chart 100A which is currently displayed is displayed as a histogram 100C (see FIG. 18) in the imaging support screen 100. In the example shown in FIG. 17, the person A in the bubble chart 100A is selected via the touch panel by the operation with the finger of the user. In this case, as shown in FIG. 18 as an example, as the histogram 100C, a histogram indicating an imaging tendency of the face category of the person A (hereinafter, also referred to as a "face category histogram") is displayed. In the face category histogram, a horizontal axis indicates each category of the smiling face category, the crying face category, the angry face category, and the straight face category, and a vertical axis indicates the number of times of classification.

In the example shown in FIG. 18, the face category histogram is shown as the histogram 100C, but different types of histograms are displayed as the histogram 100C in accordance with the type of the bubble chart 100A and the person selected by the user. Examples of the type of the histogram 100C include, in addition to the face category histogram, a histogram indicating the imaging tendency of the posture category (hereinafter, also referred to as a "posture category histogram"), a histogram indicating the imaging tendency of the eye category (hereinafter, also referred to as an "eye category histogram"), and a histogram indicating the imaging tendency of the designated imaging range category (hereinafter, also referred to as a "designated imaging range category histogram"), for each selected person. In addition, the histogram is not limited to the histogram for each person, and may be a histogram in which the horizontal axis represents the persons A to E and the vertical axis represents the number of times the person is classified into the subject-specific category group 98. As described above, the horizontal axis and the vertical axis of the histogram may be the axes of any element as long as the element can constitute the histogram.

In the example shown in FIG. 18, the imaging support screen 100 displays a display switching instruction screen 100D. The display switching instruction screen 100D is a screen that receives an instruction for switching from the display of the histogram 100C to the display of the bubble chart 100A. The display switching instruction screen 100D displays a message for guiding switching to the bubble chart 100A (in the example shown in FIG. 18, a message "Do you want to return to a bubble chart screen?") a switching soft key (in the example shown in FIG. 18, a soft key displayed as "Yes"). In a case in which the switching soft key is turned on via the touch panel by the operation of the finger of the user, the display of the histogram 100C is switched to the display of the bubble chart 100A.

Here, the reception device 80 (in the example shown in FIG. 18, the touch panel 28) designates the number of times of classification of any category in the histogram 100C. In the example shown in FIG. 18, the number of times of classification of the smiling face category is designated by selecting the smiling face category with the finger of the user via the touch panel 28. As described above, in a case in which the number of times of classification of any of the categories is designated, the control unit 48A5 performs the support processing for the category corresponding to the designated number of times of classification (hereinafter, also referred to as a "target category").

In addition, in the example shown in FIG. 18, the smiling face category is designated as the target category from the plurality of categories (smiling face category, crying face category, angry face category, and straight face category) in the histogram 100C for the person A. The target category is a category determined based on the number of times of classification (in the example shown in FIG. 18, a category designated based on the number of times of classification in accordance with the instruction received by the touch panel 28). In this case, as the support processing, the processing of supporting the imaging for the person A having "smiling face" which is the subject feature belonging to the smiling face category (hereinafter, also referred to as a "target category subject S" (see FIG. 19)) with the image sensor 16 is performed.

In a case in which the target category subject is imaged by the imaging apparatus 10, the target category is a category determined in accordance with a state of the target category subject S (for example, the expression of the face, the posture, and an opening/closing state of eyes, and/or a positional relationship between the person and the designated imaging range), and is a category into which the subject feature for the target category subject S is classified. In the example shown in FIG. 18, in a case in which the person A is imaged by the imaging apparatus 10 as the target category subject S, the smiling face category into which the subject feature of the smiling face, which is the least imaged expression among the smiling face, the crying face, the angry face, and the straight face of the person A, is classified is designated by the user as the target category.

The smiling face category designated as the target category by the user from the histogram 100C is a category of which the number of times of classification is lowest as compared with the crying face category, the angry face category, and the straight face category. This means that the number of main exposure images in which the person A is reflected with the smiling face is smaller than the number of main exposure images in which the person A is reflected with other expressions. It should be noted that the smiling face category in the histogram 100C is an example of a "low-frequency category" according to the technology of the present disclosure.

Figure 19:
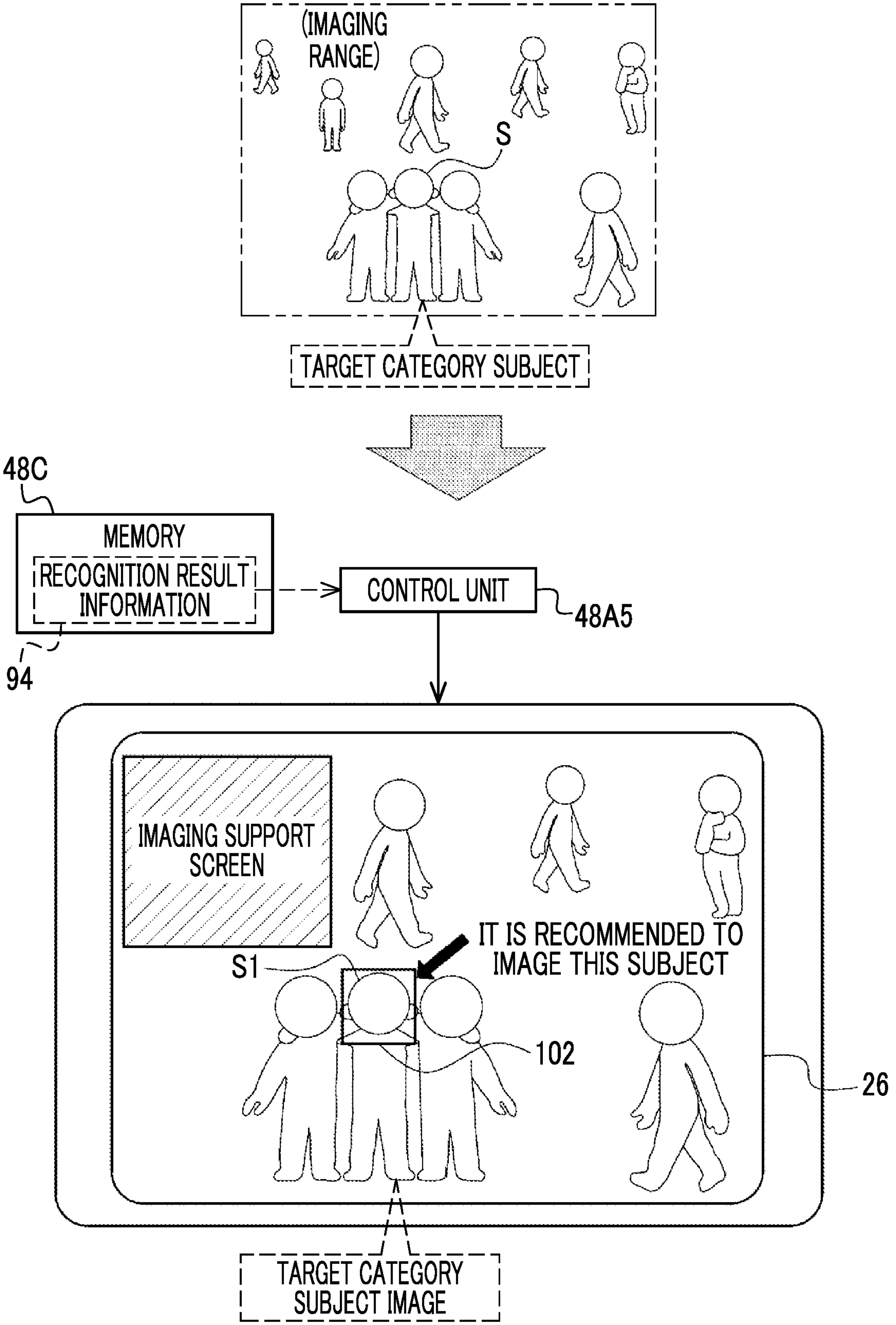
FIG. 19 is a screen view showing an example of a display aspect in the live view image in a case in which imaging support processing is executed.

As described above, in a case in which the target category is designated from the histogram 100C, as shown in FIG. 19 as an example, the control unit 48A5 displays the live view image obtained by imaging the imaging region including the target category subject S by the imaging apparatus 10 on the display 26 and performs display processing of specifying the target category subject S having the smiling face based on the recognition result information 94 and performing the display for recommending to image the specified target category subject S, as the support processing. The display processing includes processing of displaying an arrow pointing a target category subject image S1 indicating the target category subject S having the smiling face on the live view image and displaying information for recommending to image the target category subject S indicated by the target category subject image S1 pointed by the arrow (hereinafter, also referred to as "imaging recommend information"). In the example shown in FIG. 19, a message "It is recommended to image this subject" is shown as an example of the imaging recommend information.

In addition, the display processing includes processing of displaying the target category subject image S1 in the live view image in an aspect that is distinguishable from other image regions. In this case, for example, the control unit 48A5 detects the face region of the target category subject image (image region indicating the face of the target category subject S) based on the recognition result information 94 stored in the memory 48C and displays a detection frame 102 that surrounds the detected face region in the live view image to display the target category subject image S1 in the live view image in the aspect that is distinguishable from other image regions.

It should be noted that the method of displaying the target category subject image S1 in the live view image in the aspect that is distinguishable from other image regions is not limited to this, and for example, only the target category subject image S1 may be displayed in the live view image using a peaking method.

Next, the action of the imaging apparatus 10 will be described with reference to FIGS. 20A and 20B.

Figure 20A:
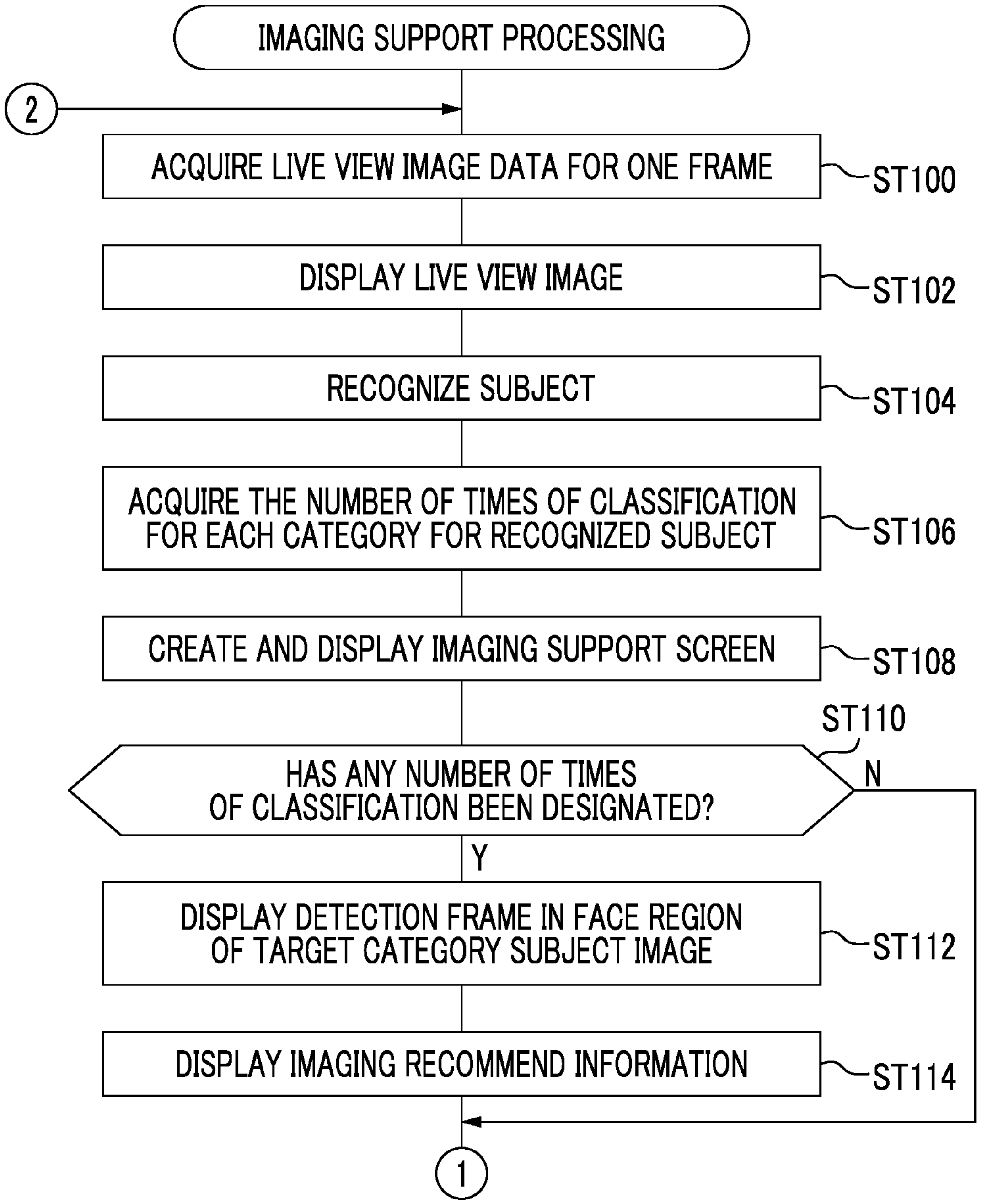
FIG. 20A is a flowchart showing an example of a flow of the imaging support processing.
Figure 20B:
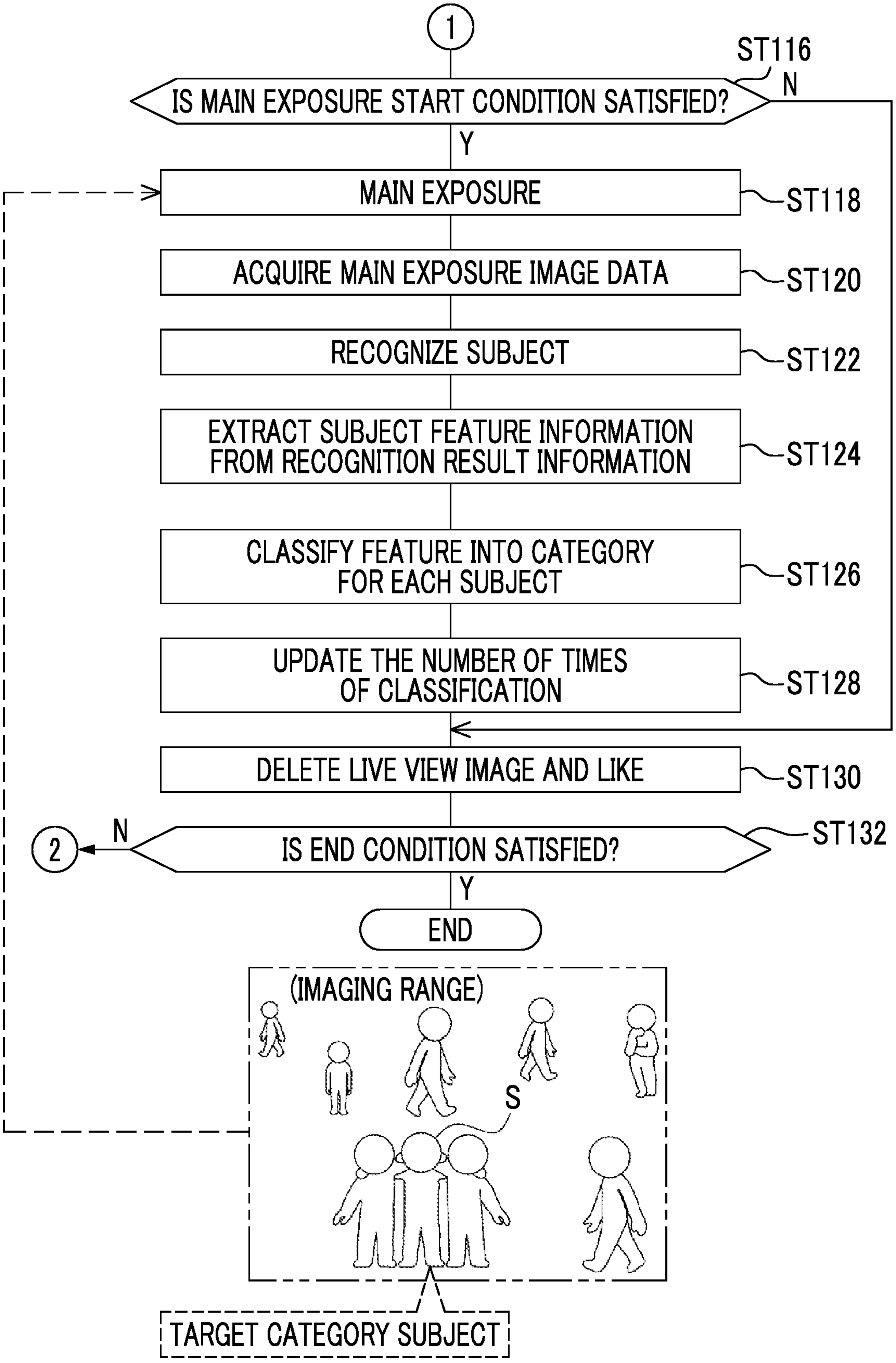
FIG. 20B is a continuation of the flowchart shown in FIG. 20A.

FIGS. 20A and 20B show examples of a flow of the imaging support processing executed by the CPU 48A in a case in which the imaging mode is set for the imaging apparatus 10. The flow of the imaging support processing is an example of an "imaging support method" according to the technology of the present disclosure. It should be noted that, in the following description, for convenience of description, the description will be made on the premise that the imaging apparatus 10 performs the imaging for the live view image at the predetermined frame rate. In addition, in the following description, for convenience of description, the description will be made on the premise that the designated imaging range information 86 is stored in the storage 48B and the category database 96 has already been constructed.

In the imaging support processing shown in FIG. 20A, first, in step ST100, the acquisition unit 48A1 acquires the live view image data from the image memory 50.

In next step ST102, the control unit 48A5 displays the live view image indicated by the live view image data, which is acquired in step ST100, on the display 26.

In next step ST104, the subject recognition unit 48A2 recognizes the subject in the imaging region by using the trained model 92 based on the live view image data acquired in step ST100.

In next step ST106, the control unit 48A5 acquires the number of times of classification for each category of the subject, which is recognized in step ST104, from the category database 96.

In next step ST108, the control unit 48A5 creates the imaging support screen 100 based on the number of times of classification acquired in step ST106, and displays the created imaging support screen 100 in a part of regions in the live view image.

In next step ST110, the control unit 48A5 determines whether or not any number of times of classification has been designated from the histogram 100C in the imaging support screen 100. In step ST110, in a case in which any number of times of classification is not yet designated from the histogram 100C in the imaging support screen 100, a negative determination is made, and the imaging support processing proceeds to step ST116 shown in FIG. 20B. In step ST110, in a case in which any number of times of classification has been designated from the histogram 100C in the imaging support screen 100, a positive determination is made, and the imaging support processing proceeds to step ST112.

In step ST112, the control unit 48A5 displays the detection frame 102 in the live view image so as to surround the face region of the target category subject image S1 indicating the target category subject S having the subject feature belonging to the target category designated based on the designated number of times of classification.

In next step ST114, the control unit 48A5 displays the imaging recommend information in the live view image. After the processing of step ST114 is executed, the imaging support processing proceeds to step ST116 shown in FIG. 20B.

In step ST116, the control unit 48A5 determines whether or not a condition for starting the main exposure (hereinafter, referred to as a "main exposure start condition") is satisfied. Examples of the main exposure start condition include a condition that the full push state is set in accordance with the instruction received by the reception device 80. In step ST116, in a case in which the main exposure start condition is not satisfied, a negative determination is made, and the imaging support processing proceeds to step ST130. In step ST116, in a case in which the main exposure start condition is satisfied, a positive determination is made, and the imaging support processing proceeds to step ST118.

In step ST118, the control unit 48A5 causes the image sensor 16 to perform the main exposure imaging, for the imaging region including the target category subject S. The main exposure image data indicating the main exposure image of the imaging region including the target category subject S is stored in the image memory 50 by performing the main exposure imaging.

In next step ST120, the acquisition unit 48A1 acquires the main exposure image data from the image memory 50.

In next step ST122, the subject recognition unit 48A2 recognizes the subject in the imaging region by using the trained model 92 based on the main exposure image data acquired in step ST120, and stores the recognition result information 94 to the memory 48C.

In next step ST124, the feature extraction unit 48A3 extracts the subject-specific feature information for each subject from the recognition result information 94 stored in the memory 48C.

In next step ST126, the classification unit 48A4 specifies the subject-specific category group 98 corresponding to the subject name from the subject name included in the subject-specific feature information extracted in step ST124, and classifies the subject feature into the corresponding category in the specified subject-specific category group 98.

In next step ST128, the classification unit 48A4 updates the number of times of classification by adding "1" to the number of times of classification of the category into which the subject feature is classified.

In next step ST130, the control unit 48A5 deletes the live view image and the like (for example, the live view image, the imaging support screen 100, the detection frame 102, and the imaging recommend information) from the display 26.

In next step ST132, the control unit 48A5 determines whether or not a condition for ending the imaging support processing (hereinafter, also referred to as "imaging support processing end condition") is satisfied. Examples of the imaging support processing end condition include a condition that the imaging mode set for the imaging apparatus 10 is released, and a condition that an instruction to end the imaging support processing is received by the reception device 80. In step ST120, in a case in which the imaging support processing end condition is not satisfied, a negative determination is made, and the imaging support processing proceeds to step ST100. In step ST132, in a case in which the imaging support processing end condition is satisfied, a positive determination is made, and the imaging support processing ends.

As described above, in the imaging apparatus 10, the control unit 48A5 acquires the number of times of classification of the subject feature classified into the category based on the subject feature of the subject specified from the main exposure image. Moreover, the control unit 48A5 performs the support processing of supporting the imaging with the imaging apparatus 10 based on the number of times of classification. Therefore, with the present configuration, it is possible to support the imaging with the imaging apparatus 10 in accordance with the number of times of classification in which the subject feature is classified into the category.

In addition, in the imaging apparatus 10, the category is categorized into the plurality of categories including the target category. In addition, the target category is the category determined based on the number of times of classification. In the example shown in FIG. 18, the user selects the number of times of classification to designate the target category. Moreover, the control unit 48A5 performs the processing of supporting the imaging on the target category subject S having the subject feature belonging to the target category. In the example shown in FIG. 19, the processing of supporting the imaging is performed on the target category subject S having the smiling face.

It should be noted that, in the example shown in FIG. 19, since the smiling face category is designated by the user selecting the number of times of classification of the smiling face category, the imaging for the target category subject S having the smiling face is supported. However, in a case in which the small category other than the smiling face category is designated from among the plurality of small categories in the face category by the user selecting the number of times of classification of other subject features (for example, the crying face, the angry face, and/or the straight face), the processing of supporting the imaging is performed on the target category subject S having the subject feature belonging to the designated target category.

It is not limited to the small category belonging to the face category, in a case in which the small category is designated by the user selecting the number of times of classification of the subject feature classified into the small category belonging to other large categories, the processing of supporting the imaging is performed on the target category subject S having the subject feature belonging to the small category designated as the target category.

In addition, in a case in which the subject-specific category group 98 is designated by the user selecting the number of times of classification of the subject name classified as the subject feature in the subject-specific category group 98, the processing of supporting the imaging is performed on the target category subject S having the subject feature belonging to the subject-specific category group 98 designated as the target category, that is, the target category subject S of the subject name corresponding to the subject-specific category group 98 designated as the target category.

Therefore, with the present configuration, it is possible to more efficiently image the target category subject desired by the user than in a case in which the imaging is performed by determining whether or not it is the target category subject S desired by the user only from the intuition of an imaging person.

In addition, in the present embodiment, the imaging recommend information (in the example shown in FIG. 19, the message "It is recommended to image this subject") is displayed as the display for recommending to image the target category subject S. Therefore, with the present configuration, it is possible to more efficiently image the target category subject having the subject feature desired by the user than in a case in which the imaging is performed by determining whether or not it is the target category subject S having the expression desired by the user only from the intuition of an imaging person.

In addition, in the present embodiment, the control unit 48A5 displays the live view image on the display 26 and displays the target category subject image S1 in the live view image in the aspect that is distinguishable from other image regions. Therefore, with the present configuration, it is possible to make the user visually recognize the target category subject.

In addition, in the present embodiment, the control unit 48A5 displays the live view image on the display 26 and displays the detection frame 102 for the face region of the target category subject image S1 in the live view image. Therefore, with the present configuration, it is possible to make the user recognize that the subject corresponding to the display region in which the detection frame 102 is displayed is the target category subject.

In addition, in the present embodiment, as the target category, the category having a relatively low number of times of classification among the plurality of categories (in the example shown in FIG. 18, the smiling face category) is designated by the user. Therefore, with the present configuration, it is possible to more efficiently image the subject in the category having a relatively low number of times of classification among the plurality of categories than in a case in which the imaging is performed by determining whether or not it is the subject in the category having a relatively low number of times of classification among the plurality of categories only from the intuition of the imaging person.

In addition, in the present embodiment, the target category is the category determined in accordance with the state of the target category subject S (for example, the expression of the person). In the example shown in FIG. 19, the smiling face category, which is determined in accordance with the state of the subject S of "smiling face", is designated as the target category. Moreover, the control unit 48A5 performs the processing of supporting the imaging for the target category subject S, which is the subject having the subject feature classified into the designated category. Therefore, with the present configuration, it is possible to increase the number of times of the imaging for the subject in the same state, or conversely, decrease the number of times for the imaging of the subject in the same state.

In addition, in the present embodiment, the plurality of subject-specific category groups 98 are included in the category database 96 as the category in which each of the plurality of persons themselves can be specified. Therefore, the control unit 48A5 performs the processing of supporting the imaging for the target category subject S which is the subject corresponding to the subject-specific category group 98 designated by the user. Therefore, with the present configuration, it is possible to increase the number of times of the imaging for the same subject, or conversely, decrease the number of times for the imaging of the same subject.

In addition, in the present embodiment, the category into which the subject feature is classified is created for each of a plurality of units. Examples of the plurality of units include a unit of "subject name (for example, a name of the person or an identifier for specifying the person)", a unit of "face (expression) of the person", a unit of "posture of the person", a unit of "eyes of the person", and a unit of "designated imaging range". Therefore, with the present configuration, it is possible to support the imaging with the imaging apparatus 10 in accordance with the number of times of classification in which the subject feature is classified into the category in the designated unit.

In addition, in the present embodiment, as the support processing of supporting the imaging with the imaging apparatus 10, the control unit 48A5 performs the processing including the processing of displaying the number of times of classification on the display 26. In the example shown in FIG. 17, the number of times of classification is expressed by using the bubble chart 100A, and in the example shown in FIG. 18, the number of times of classification is expressed by using the histogram 100C. Therefore, with the present configuration, it is possible to make the user grasp the number of times of the imaging for each of the various subject features.

In addition, in the present embodiment, in a case in which the number of times of classification in the histogram 100C is designated by the reception device 80 in a state in which the histogram 100C is displayed on the display 26, the processing of supporting the imaging related to the category corresponding to the designated number of times of classification is performed by the control unit 48A5. Therefore, with the present configuration, it is possible to support the imaging for the subject having the subject feature intended by the user.

Figure 21:
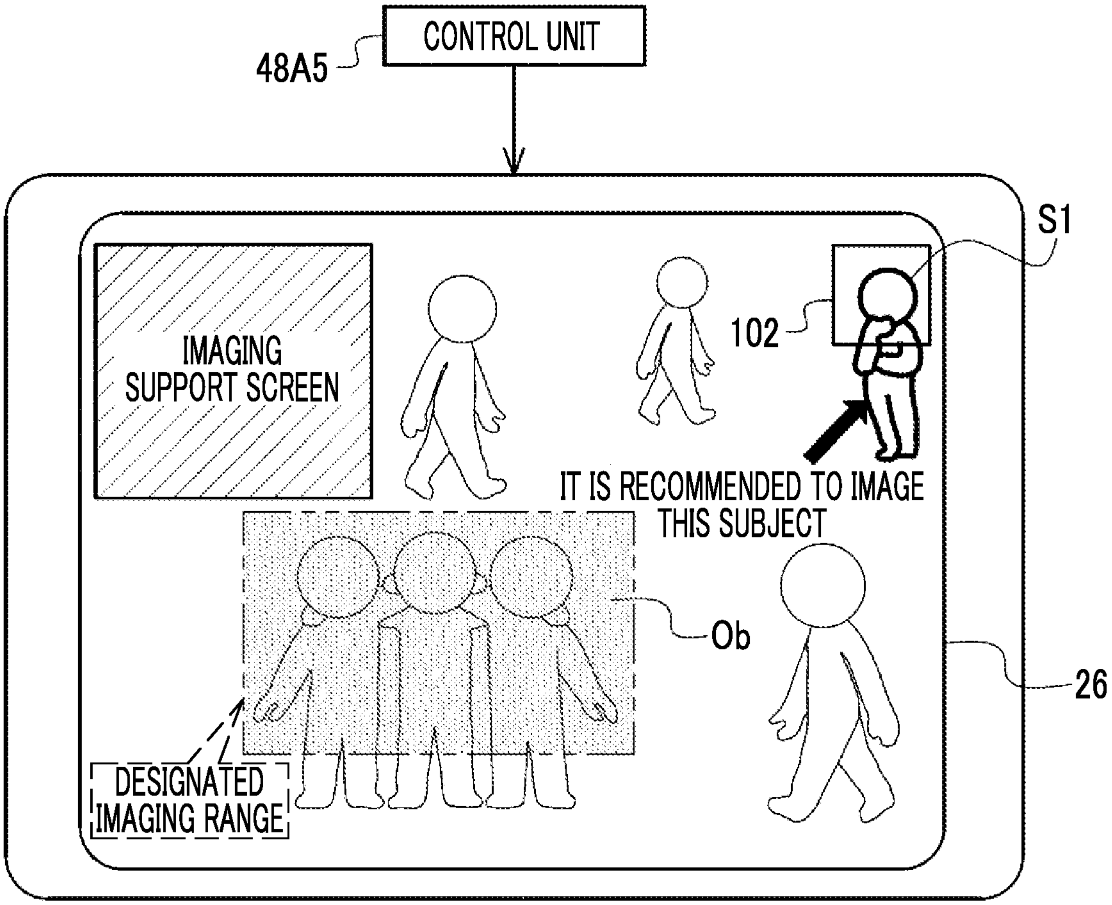
FIG. 21 is a screen view showing an example of display contents in the live view image in which an object indicating a designated imaging region and a target category subject image are displayed in different display aspects.

It should be noted that, in the embodiment described above, the form example has been described in which the target category subject S is positioned within the designated imaging range, but the technology of the present disclosure is not limited to this. For example, in a case in which the target category subject S is positioned out of the designated imaging range, as shown in FIG. 21 as an example, the target category subject image S1 is displayed at a position separated from an object Ob indicating the designated imaging range in the live view image. In this case, in the live view image, the control unit 48A5 displays the object Ob indicating the designated imaging range and the target category subject image S1 (example of an "object indicating the target category subject" according to the technology of the present disclosure) in difference display aspects. In the example shown in FIG. 21, the target category subject image S1 is displayed using the peaking method, and the object Ob is colored with a translucent color (for example, translucent gray). As a result, it is possible to visually identify the designated imaging range intended by the user as the imaging target and the target category subject S.

In addition, in the embodiment described above, the imaging related to the category corresponding to the designated number of times of classification (in the example shown in FIG. 18, the smiling face category) is supported by the user designating the number of times of classification indicated by the histogram 100C via the touch panel 28, but the technology of the present disclosure is not limited to this. For example, the control unit 48A5 may specify the low-frequency category having a relatively low number of times of classification among the plurality of categories as the target category, and perform the processing of supporting the imaging related to the specified low-frequency category. For example, the low-frequency category refers to a category having the lowest number of times of classification (for example, the smiling face category) among the plurality of small categories (smiling face category, crying face category, angry face category, and straight face category) belonging to the large category (for example, the face category) designated by the user via the reception device 80. The control unit 48A5 specifies an interest subject having the subject feature classified into the low-frequency category among interest subjects (for example, the person A) designated by the user via the reception device 80 in the live view image, and performs the processing of supporting the imaging for the specified interest subject. In this case, the selection (operation by the user) for the histogram 100C is unneeded, and the imaging support screen 100 does not have to be displayed.

Figure 22:
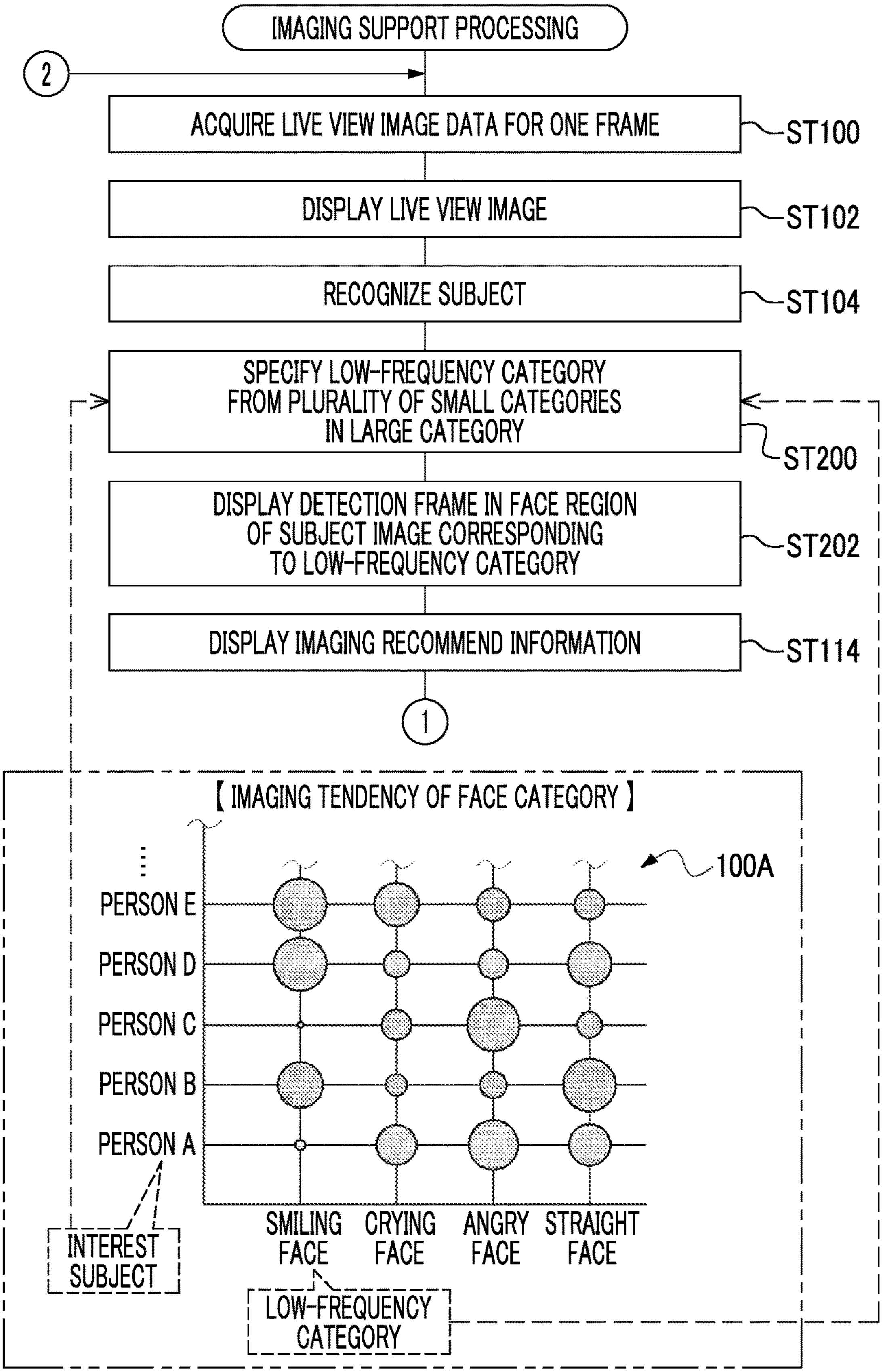
FIG. 22 is a flowchart showing a first modification example of the flow of the imaging support processing.

As described above, in a case in which the processing of supporting the imaging for the interest subject having the subject feature classified into the low-frequency category is performed by the control unit 48A5, the imaging support processing is executed by the CPU 48A as shown in FIG. 22 as an example. The flowchart shown in FIG. 22 is different from the flowchart shown in FIG. 20A in that steps ST200 and ST202 are provided instead of steps ST106 to ST112.

In step ST200 of the imaging support processing shown in FIG. 22, the control unit 48A5 specifies the low-frequency category from the plurality of small categories in the large category designated by the user, for the interest subject designated by the user. For example, according to the bubble chart 100A shown in FIG. 22, in a case in which the face category is designated as the large category by the user and the person A is designated as the interest subject by the user, the smiling face category is specified as the low-frequency category by the control unit 48A5.

In next step ST202, the control unit 48A5 specifies the subject image (hereinafter, also referred to as an "interest subject image") indicating the interest subject having the subject feature classified into the low-frequency category among the interest subjects designated by the user in the live view image, and displays the detection frame 102 (see FIGS. 19 and 21) for the face region of the interest subject image. For example, in a case in which the person A is designated as the interest subject by the user and the smiling face category is automatically specified as the low-frequency category in step ST200, first, the control unit 48A5 specifies the person image indicating the person A having the smiling face among the persons A as the interest subject image in the live view image based on the recognition result information 94. Moreover, the control unit 48A5 displays the detection frame 102 that surrounds the face region of the person image indicating the person A having the smiling face in the live view image. It should be noted that, in the present embodiment, "automatic" does not mean that the operation is triggered by an artificial operation (for example, the operation by the user), but that the operation is performed by the controller 48 by itself.

Therefore, in the example shown in FIG. 22, since the imaging for the subject having the subject feature classified into the category having the lowest number of times of classification is supported, it is possible to more efficiently image the subject in the low-frequency category than in a case in which the imaging is performed by determining whether or not it is the subject in the low-frequency category only from the intuition of the imaging person.

In the embodiment described above, the form example has been described in which the main exposure imaging is performed in a case in which the condition that the instruction from the user is received by the reception device 80 is satisfied as the main exposure start condition in the imaging support processing, but the technology of the present disclosure is not limited to this. For example, the control unit 48A5 may detect the target category subject based on the imaging result of the imaging apparatus 10, and automatically acquire the image including the image corresponding to the target category subject on a condition that the target category subject is detected.

In this case, for example, first, the control unit 48A5 specifies the low-frequency category as the target category, in the same manner as the example shown in FIG. 22. Moreover, the main exposure imaging is automatically started in a case in which the control unit 48A5 detects that a low-frequency interest subject image, which is the interest subject image corresponding to the low-frequency category, is present in the live view image based on the recognition result information 94. Here, the low-frequency interest subject image corresponding to the low-frequency category refers to the interest subject image indicating the person A having the subject feature of "smiling face" among the persons A in a case in which the smiling face category is specified as the low-frequency category by the control unit 48A5, for example, on the premise that the person A is designated as the interest subject. It should be noted that the main exposure image data for one frame may be stored in a predetermined storage region (for example, the image memory 50) by performing the main exposure imaging, or only data related to the low-frequency interest subject image of the main exposure image data for one frame may be stored in the predetermined storage region.

Figure 23:
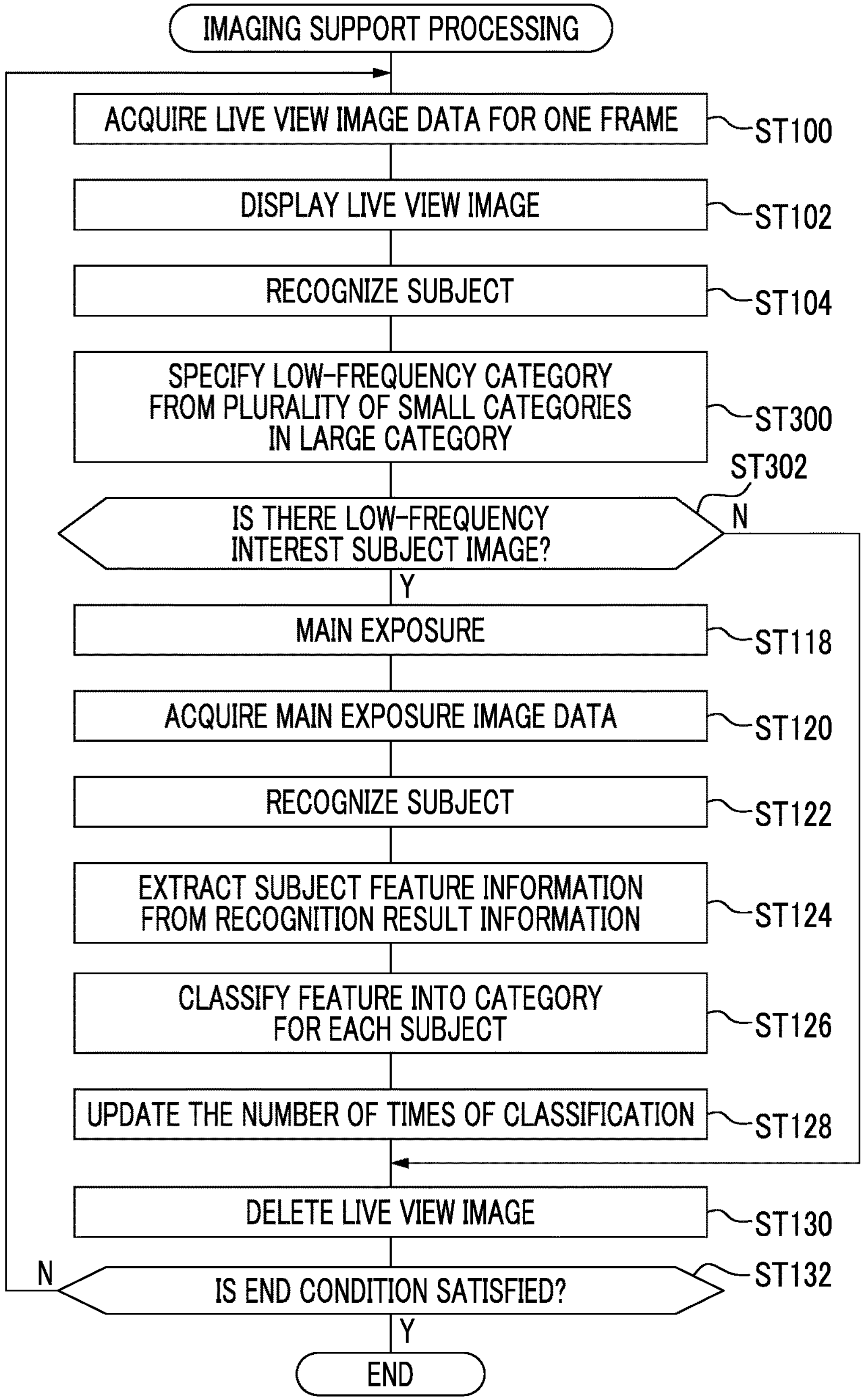
FIG. 23 is a flowchart showing a second modification example of the flow of the imaging support processing.

As described above, in a case in which the image including the image corresponding to the target category subject is automatically acquired by the control unit 48A5 on a condition that the target category subject is detected, as shown in FIG. 23 as an example, the imaging support processing is executed by the CPU 48A. The flowchart shown in FIG. 23 is different from the flowcharts shown in FIGS. 20A and 20B in that steps ST300 and ST302 are provided instead of steps ST106 to ST116.

In step ST300 of the imaging support processing shown in FIG. 23, the control unit 48A5 executes the same processing as the processing of step ST200 shown in FIG. 22.

In next step ST302, the control unit 48A5 determines whether or not the low-frequency interest subject image is present in the live view image based on the recognition result information 94. In step ST302, in a case in which the low-frequency interest subject image is not present in the live view image, a negative determination is made, and the imaging support processing proceeds to step ST130. In step ST302, in a case in which the low-frequency interest subject image is present in the live view image, a positive determination is made, and the imaging support processing proceeds to step ST118.

As described above, since the main exposure imaging is started in a case in which the control unit 48A5 detects that the low-frequency interest subject image is present in the live view image, it is possible to reduce the time and effort needed for imaging the target category subject as compared with a case in which the imaging is started on the condition that the target category subject is found by the visual observation and the instruction from the user is received by the reception device 80.

In the example shown in FIG. 23, the form example has been described in which a determination is made as to whether or not the low-frequency interest subject image is present in the live view image in step ST302 of the imaging support processing and the main exposure imaging is started in a case in which a determination is made that the low-frequency interest subject image is present in the live view image, but the technology of the present disclosure is not limited to this. For example, the processing of step ST352 shown in FIG. 24 may be executed by the control unit 48A5 instead of the processing of step ST302 shown in FIG. 23.

Figure 24:
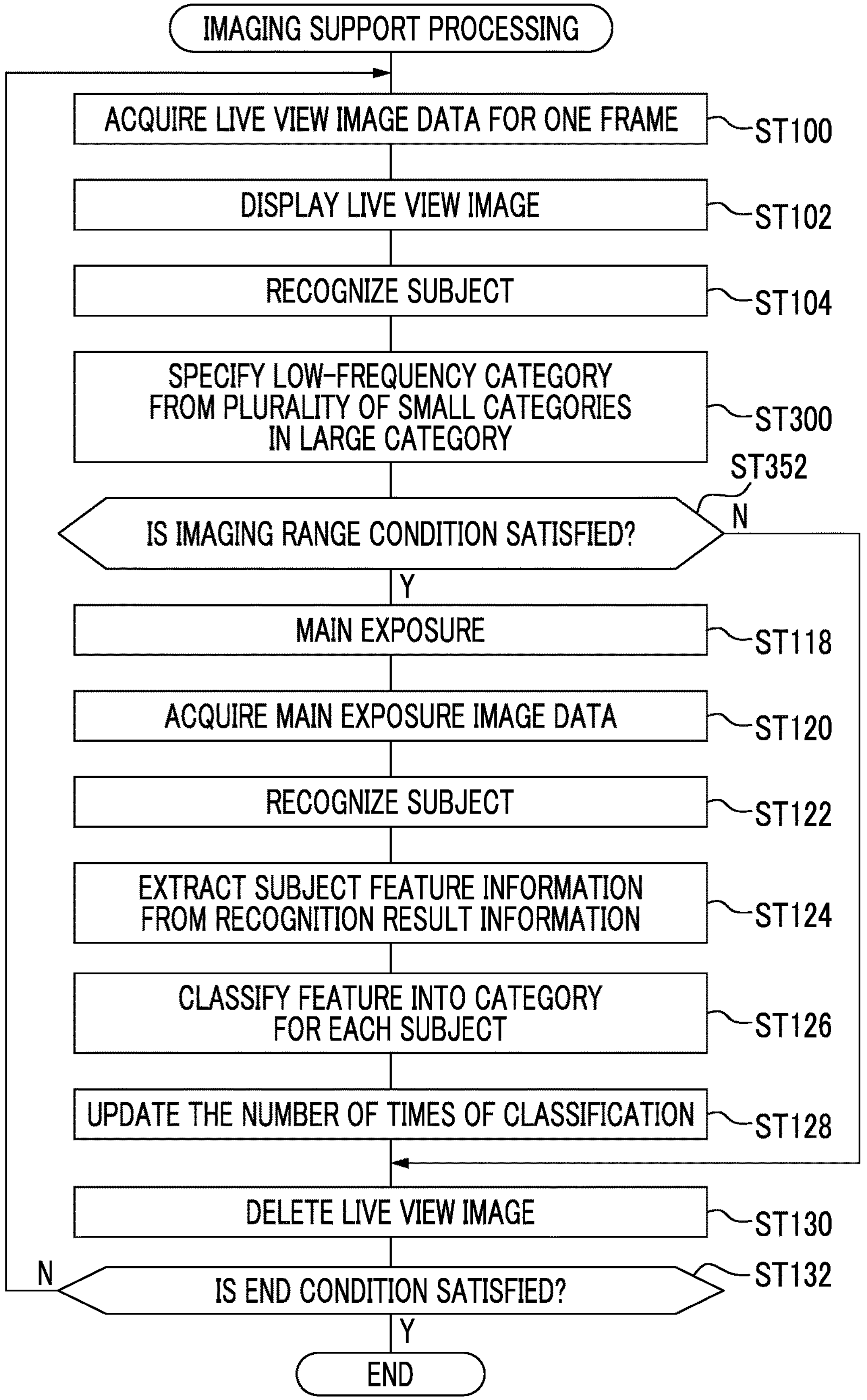
FIG. 24 is a flowchart showing a third modification example of the flow of the imaging support processing.

In step ST352 of the imaging support processing shown in FIG. 24, the control unit 48A5 determines whether or not an imaging range condition is satisfied. Here, the imaging range condition refers to a condition that the target category subject is included within the designated imaging range indicated by the designated imaging range information 86 (see FIGS. 10 and 11). The determination of whether or not the target category subject is included within the designated imaging range is made by, for example, determining whether or not the interest subject indicated by the low-frequency interest subject image is included within the designated imaging range based on the designated imaging range information 86 and the recognition result information 94. In step ST352, in a case in which the imaging range condition is not satisfied, a negative determination is made, and the imaging support processing proceeds to step ST130. In step ST352, in a case in which the imaging range condition is satisfied, a positive determination is made, and the imaging support processing proceeds to step ST118.

As described above, since the main exposure imaging is performed on the condition that the target category subject is included within the designated imaging range, it is possible to reduce the time and effort needed for imaging the target category subject as compared with a case in which the imaging is started on the condition that the target category subject included within the designated imaging range is found by the visual observation and the instruction from the user is received by the reception device 80.

In the example shown in FIG. 24, the main exposure imaging is performed in step ST118 of the imaging support processing, but the imaging may be performed in a state in which the target category subject within the designated imaging range is in focus. The "imaging" here may be the imaging for the live view image or imaging for a recording image (for example, a still picture or a video).

Figure 25:
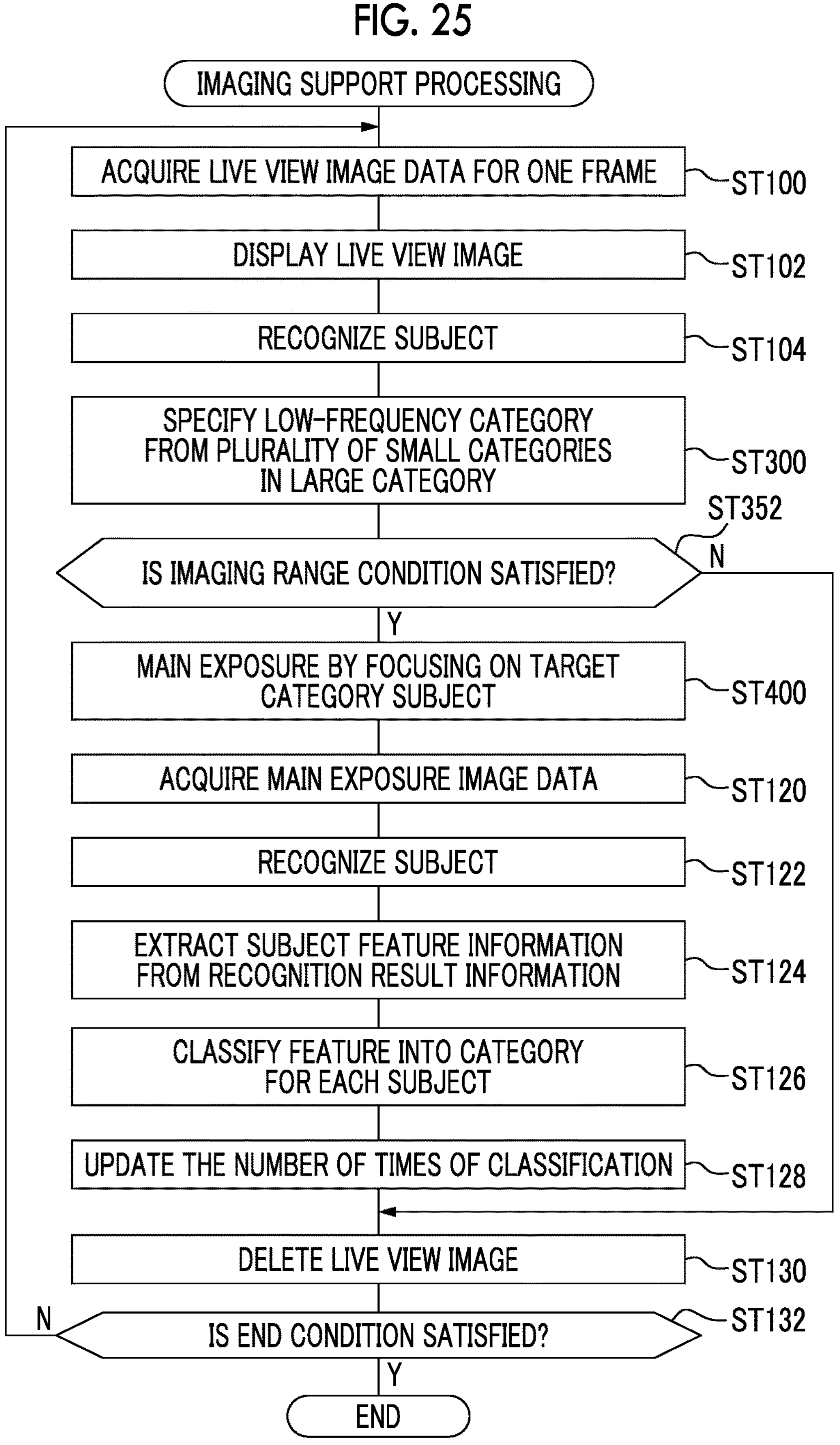
FIG. 25 is a flowchart showing a fourth modification example of the flow of the imaging support processing.

In this case, the imaging support processing shown in FIG. 25 is executed by the CPU 48A. The flowchart shown in FIG. 25 is different from the flowchart shown in FIG. 24 in that step ST400 is provided instead of step ST118.

In step ST400 of the imaging support processing shown in FIG. 25, for the imaging region including the target category subject S, the control unit 48A5 causes the image sensor 16 to perform the main exposure imaging after the target category subject (for example, the interest subject indicated by the low-frequency interest subject image in the live view image) is in focus based on the result of the AF calculation. After the processing of step ST400 is executed, the imaging support processing proceeds to step ST120.

As described above, since the main exposure imaging is performed after the target category subject is in focus within the designated imaging range, it is possible to reduce the time and effort needed for focusing and imaging the target category subject after positioning the target category subject within the designated imaging range.

In the example shown in FIG. 25, the form example has been described in which the main exposure imaging is performed in a case in which the imaging range condition is satisfied, but the technology of the present disclosure is not limited to this. For example, the control unit 48A5 may perform predetermined processing in a case in which a degree of difference between a first imaging condition (for example, the imaging condition determined in accordance with the instruction received by the reception device 80) given from the outside and a second imaging condition given to the target category subject is equal to or larger than a predetermined degree of difference.

Figure 26:
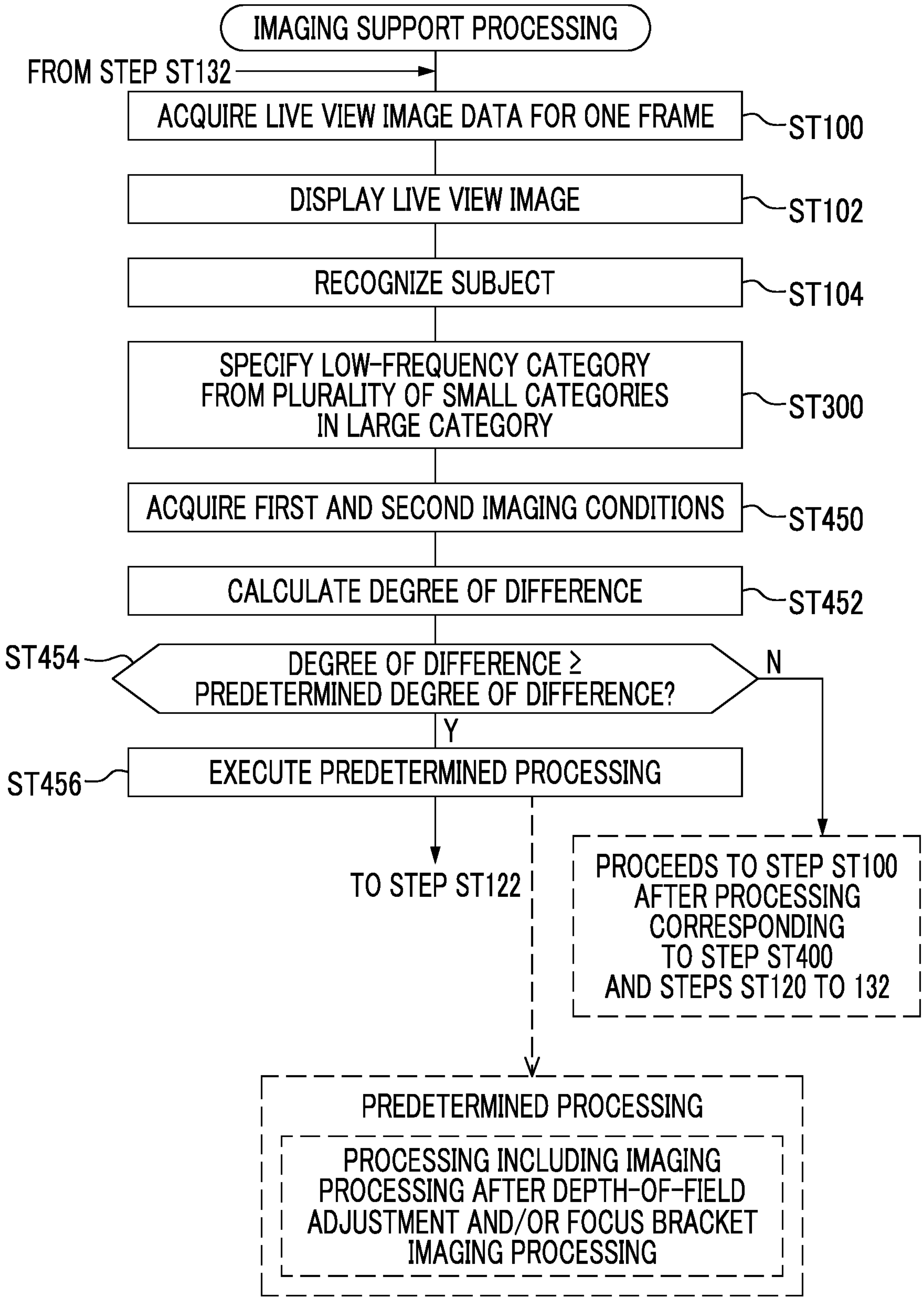
FIG. 26 is a flowchart showing a fifth modification example of the flow of the imaging support processing.

In this case, for example, the imaging support processing shown in FIG. 26 is executed by the CPU 48A. The flowchart shown in FIG. 26 is different from the flowchart shown in FIG. 25 in that steps ST450 to ST456 are provided instead of steps ST352, ST400, and ST120.

In step ST450 of the imaging support processing shown in FIG. 26, the control unit 48A5 acquires the first imaging condition and the second imaging condition. Examples of the first imaging condition and the second imaging condition will be described below.

In next step ST452, the control unit 48A5 calculates the degree of difference between the first imaging condition and the second imaging condition acquired in step ST450 (for example, a value indicating how much the first imaging condition and the second imaging condition deviate from each other).

In next step ST454, the control unit 48A5 determines whether or not the degree of difference calculated in step ST452 is equal to or larger than the predetermined degree of difference. In step ST454, in a case in which the degree of difference calculated in step ST452 is smaller than the predetermined degree of difference, a negative determination is made, and the control unit 48A5 executes the processing corresponding to the processing of step ST400, and the processing (see FIG. 25) of steps ST120 to ST132 and then proceeds to step ST100. In step ST454, in a case in which the degree of difference calculated in step ST452 is equal to or larger than the predetermined degree of difference, a positive determination is made, and the imaging support processing proceeds to step ST456.

In step ST456, the control unit 48A5 executes the predetermined processing. Although the details will be described below, the predetermined processing is processing including imaging processing after depth-of-field adjustment of performing the main exposure imaging after a depth of field is adjusted and/or focus bracket imaging processing of performing the main exposure imaging using a focus bracket method. After the processing of step ST456 is executed, the imaging support processing proceeds to step ST122.

As described above, in the example shown in FIG. 26, since the predetermined processing is performed in a case in which the degree of difference between the first imaging condition given from the outside and the second imaging condition given to the target category subject is equal to or larger than the predetermined degree of difference, it is possible to contribute to the imaging under the imaging condition intended by the user.

Figure 27:
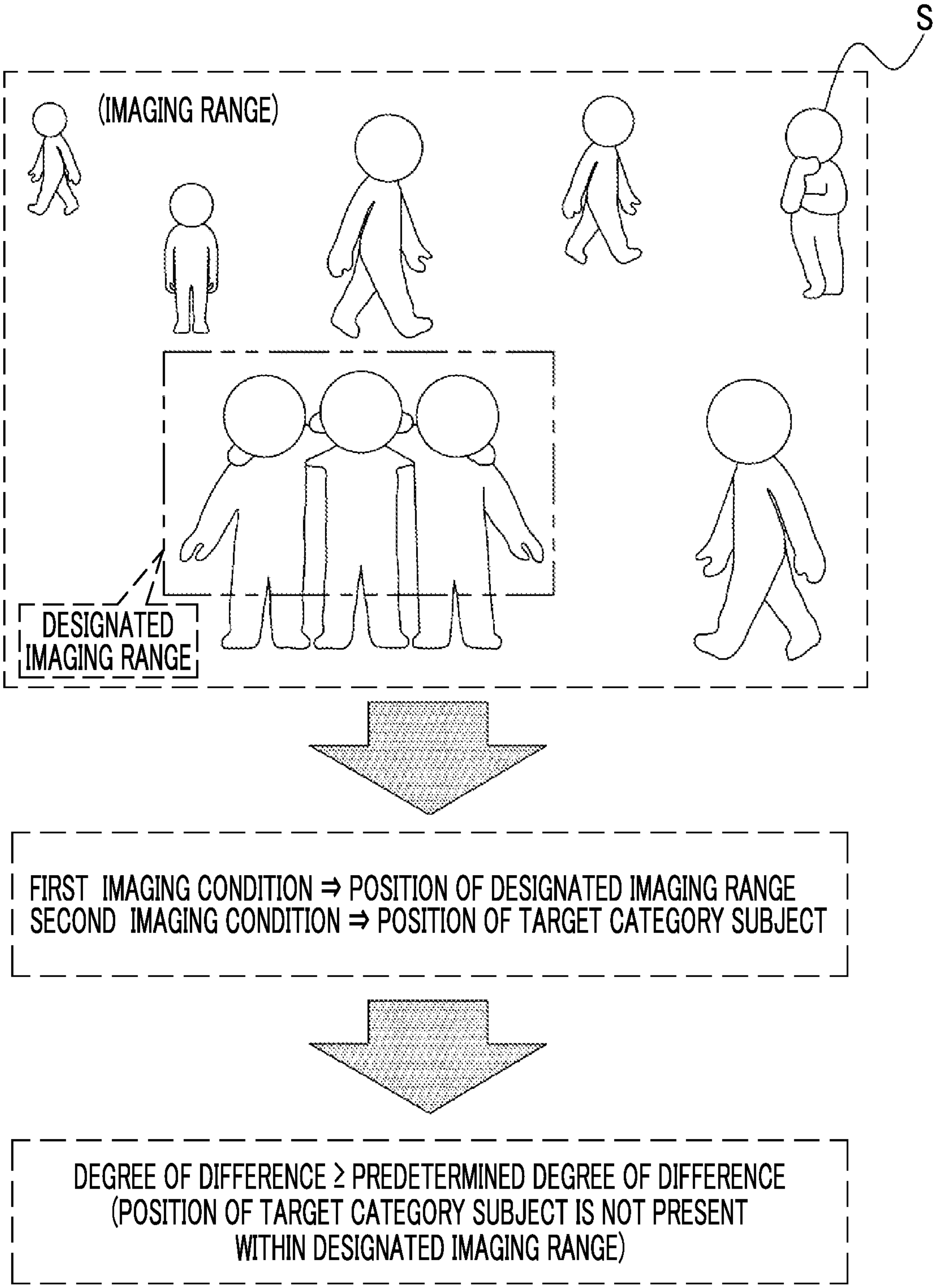
FIG. 27 is a conceptual diagram showing a calculation example of a degree of difference between a first imaging condition and a second imaging condition.
Figure 28:
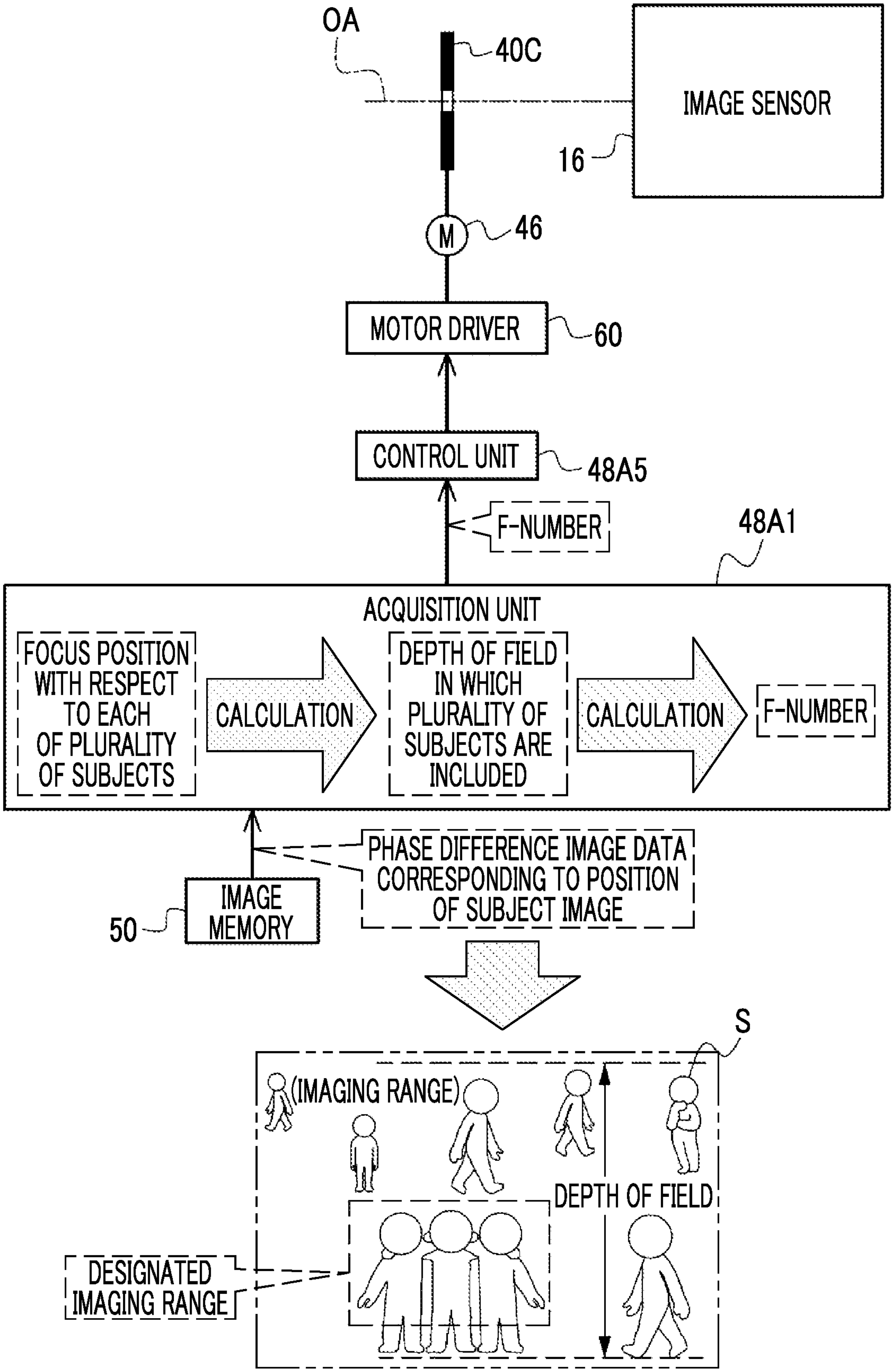
FIG. 28 is a conceptual diagram showing an example of processing contents performed in a case in which a depth of field is increased.

In the examples shown in FIGS. 27 and 28, the contents of the imaging processing after depth-of-field adjustment are shown. As shown in FIG. 27 as an example, in a case in which the first imaging condition is the position of the designated imaging range, the second imaging condition is the position of the target category subject, and the position of the target category subject is not within the designated imaging range, the control unit 48A5 determines that the degree of difference is equal to or larger than the predetermined degree of difference. In a case in which the degree of difference is equal to or larger than the predetermined degree of difference, the control unit 48A5 controls the imaging apparatus 10 to include the subject within the designated imaging range and the target category subject within the depth of field, and causes the image sensor 16 to perform the main exposure imaging in a state in which the subject within the designated imaging range and the target category subject are included within the depth of field.

In a case in which the degree of difference is equal to or larger than the predetermined degree of difference, as shown in FIG. 28 as an example, first, based on the result of the AF calculation with respect to each of the plurality of subjects, that is, at least one subject within the designated imaging range (hereinafter, also referred to as a "within-designated imaging range subject") and the target category subject, the acquisition unit 48A1 calculates the focus position with respect to the within-designated imaging range subject and the target category subject. For example, the acquisition unit 48A1 calculates the focus position with respect to each of the within-designated imaging range subject and the target category subject based on the phase difference image data corresponding to each position of a within-designated imaging range subject image (image indicating the within-designated imaging range subject) and the target category subject image S1 in the live view image. It should be noted that the method of calculating the focus position is merely an example, and the focus position may be calculated by the calculation method of a TI/F method or a contrast AF method.

The acquisition unit 48A1 calculates the depth of field in which the within-designated imaging range subject and the target category subject are included, based on the plurality of focus positions calculated for each of the within-designated imaging range subject and the target category subject. The depth of field is calculated by using a first calculation expression. The first calculation expression is, for example, a calculation expression in which the plurality of focus positions are used as independent variables and the depth of field is used as a dependent variable. It should be noted that a first table in which the plurality of focus positions and the depth of field are associated with each other may be used instead of the first calculation expression.

The acquisition unit 48A1 calculates an F-number for realizing the calculated depth of field. The acquisition unit 48A1 calculates the F-number by using a second calculation expression. The second calculation expression used here is, for example, a calculation expression in which the depth of field is used as an independent variable and the F-number is used as a dependent variable. It should be noted that a second table in which the value indicating the depth of field and the F-number are associated with each other may be used instead of the second calculation expression.

The control unit 48A5 operates the stop 40C by controlling the motor 46 via the motor driver 60 in accordance with the F-number calculated by the acquisition unit 48A1.

As described above, in the examples shown in FIGS. 27 and 28, in a case in which the position of the target category subject S is not within the designated imaging range, the stop 40C is operated to include the within-designated imaging range subject and the target category subject S within the depth of field, and the main exposure imaging is performed in a state in which the within-designated imaging range subject and the target category subject are included within the depth of field. As a result, it is possible to obtain the images having higher contrast without performing the imaging a plurality of times as the within-designated imaging range subject image and the target category subject image than in a case in which the within-designated imaging range subject and the target category subject S are not included within the depth of field.

By the way, due to the structure of the imaging apparatus 10, a situation is also considered that both the within-designated imaging range subject and the target category subject S are not included within the depth of field. In a case in which such a situation is reached, the control unit 48A5 causes the imaging apparatus 10 to image the within-designated imaging range subject and the target category subject using the focus bracket method.

Figure 29:
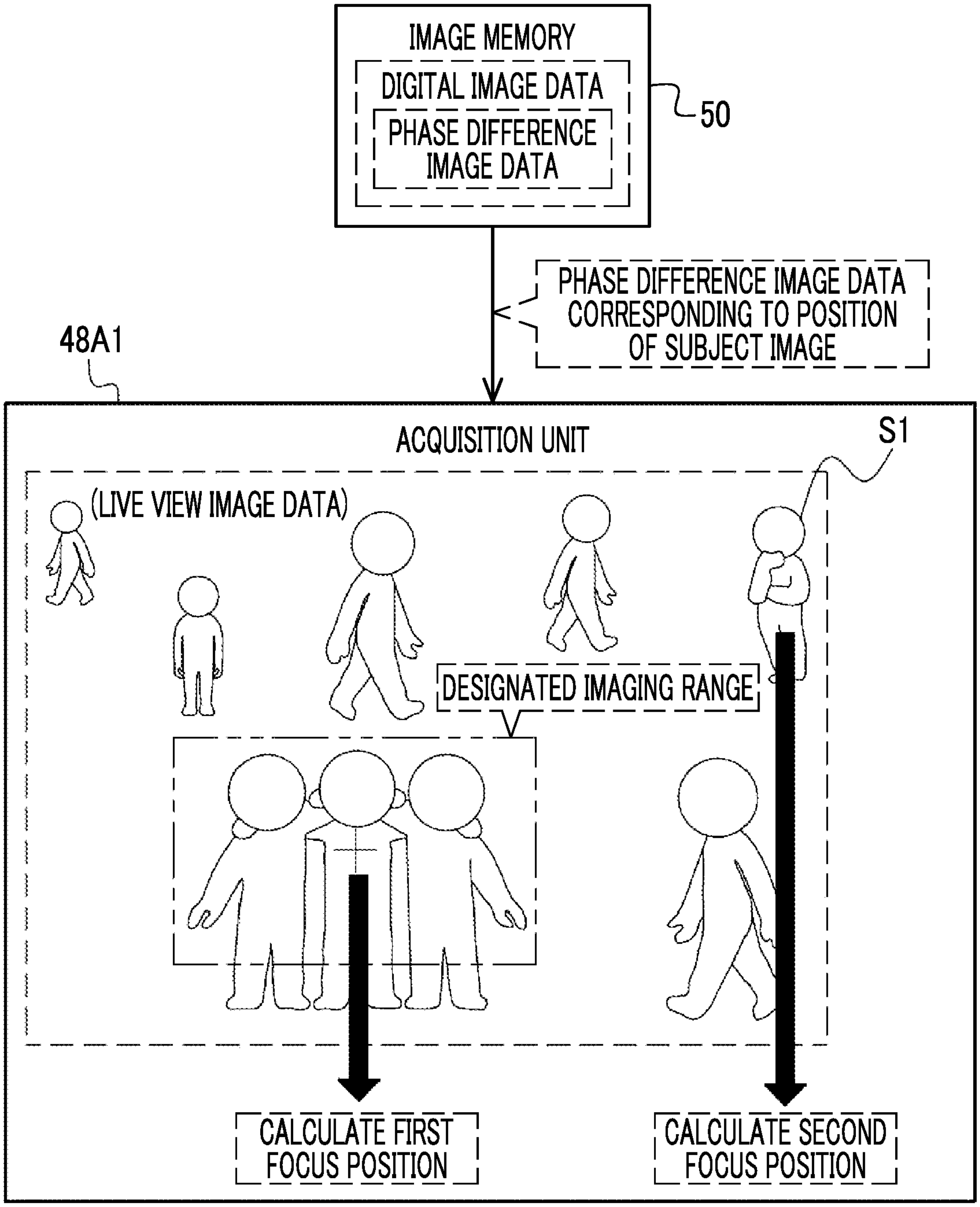
FIG. 29 is a conceptual diagram showing a calculation example of a focus position with respect to a within-designated imaging range subject and a focus position with respect to a target category subject.

In this case, as shown in FIG. 29 as an example, first, the acquisition unit 48A1 calculates a first focus position and a second focus position based on the phase difference image data corresponding to the position of each of the within-designated imaging range subject image and the target category subject image S1 in the live view image. The first focus position is the focus position with respect to the center of the within-designated imaging range subject, and the second focus position is the focus position with respect to the target category subject S. The first and second focus positions are focus positions used in a case in which the main exposure imaging is performed using the focus bracket method.

Figure 30:
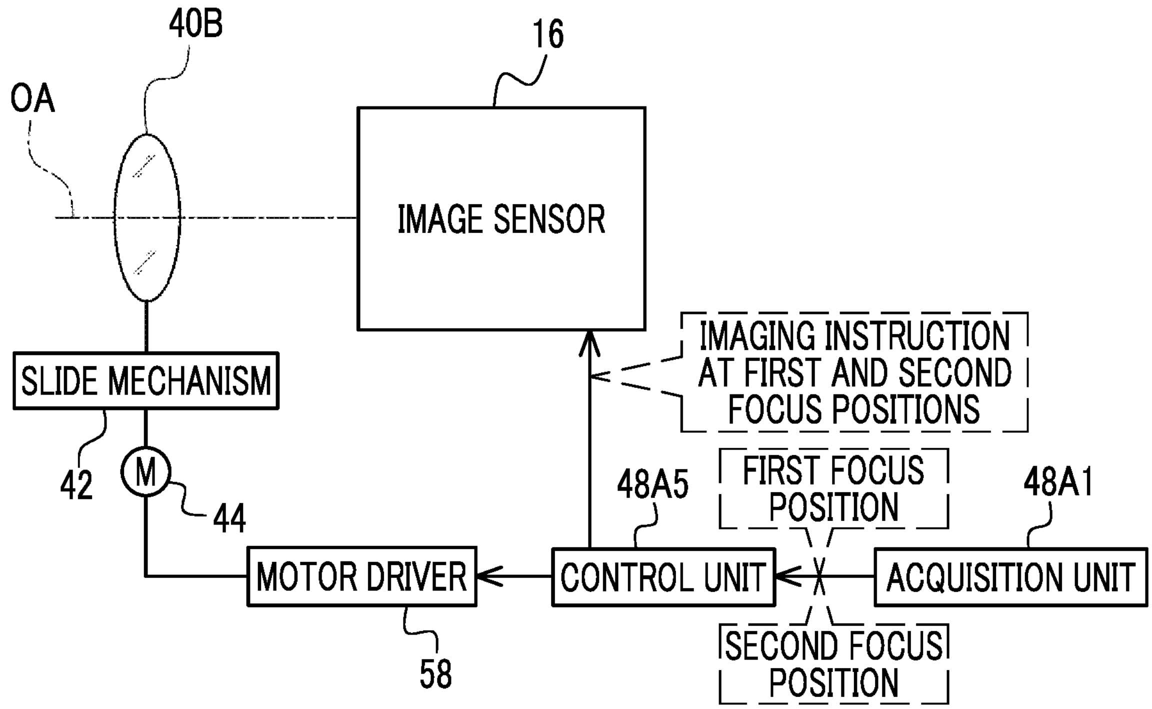
FIG. 30 is a block diagram showing an example of processing contents in a case in which main exposure imaging of a focus bracket method is performed.

In a case in which the first and second focus positions are calculated by the acquisition unit 48A1, as shown in FIG. 30 as an example, the control unit 48A5 moves the focus lens 40B to the first focus position, and instructs the image sensor to start the main exposure imaging at a timing at which the focus lens 40B reaches the first focus position. In response to this, the main exposure imaging is performed by the image sensor 16. After the main exposure imaging is performed in a state in which the focus lens 40B is aligned with the first focus position in this way, the control unit 48A5 moves the focus lens 40B to the second focus position, and instructs the image sensor to start the main exposure imaging at a timing at which the focus lens 40B reaches the second focus position. In response to this, the main exposure imaging is performed by the image sensor 16. It should be noted that, here, the first and second focus positions are described as the focus position used in the main exposure imaging using the focus bracket method, but this is merely an example, and three or more focus positions may be used as the focus position used in the main exposure imaging using the focus bracket method.

As described above, in the examples shown in FIGS. 29 and 30, in a case in which both the within-designated imaging range subject and the target category subject S are not included within the depth of field due to the structure of the imaging apparatus 10, the main exposure imaging is performed on the within-designated imaging range subject and the target category subject S using the focus bracket method. As a result, even in a case in which both the within-designated imaging range subject and the target category subject S are not included within the depth of field due to the structure of the imaging apparatus 10, it is possible to obtain the images having higher contrast as the within-designated imaging range subject image and the target category subject image than in a case in which only the imaging for one frame is performed in a situation in which the within-designated imaging range subject and the target category subject S are not included within the depth of field.

In the example shown in FIG. 27, the position of the designated imaging range is shown as the first imaging condition, and the position of the target category subject S is shown as the second imaging condition, but the technology of the present disclosure is not limited to this. For example, the first imaging condition may be brightness of a reference subject (for example, the within-designated imaging range subject), and the second imaging condition may be brightness of the target category subject S. In this case, in a case in which a degree of difference between the brightness of the reference subject and the brightness of the target category subject S (hereinafter, also referred to as a "degree of difference in brightness") is equal to or larger than a predetermined degree of difference in brightness, the control unit 48A5 executes exposure bracket method imaging processing as the predetermined processing described above. The exposure bracket method imaging processing is processing of causing the imaging apparatus 10 to image the reference subject and the target category subject S using the exposure bracket method.

In addition, in a case in which the degree of difference in brightness is smaller than the predetermined degree of difference in brightness, the control unit 48A5 causes the imaging apparatus 10 to image the reference subject and the target category subject S with the exposure determined with reference to the reference subject.

Figure 31:
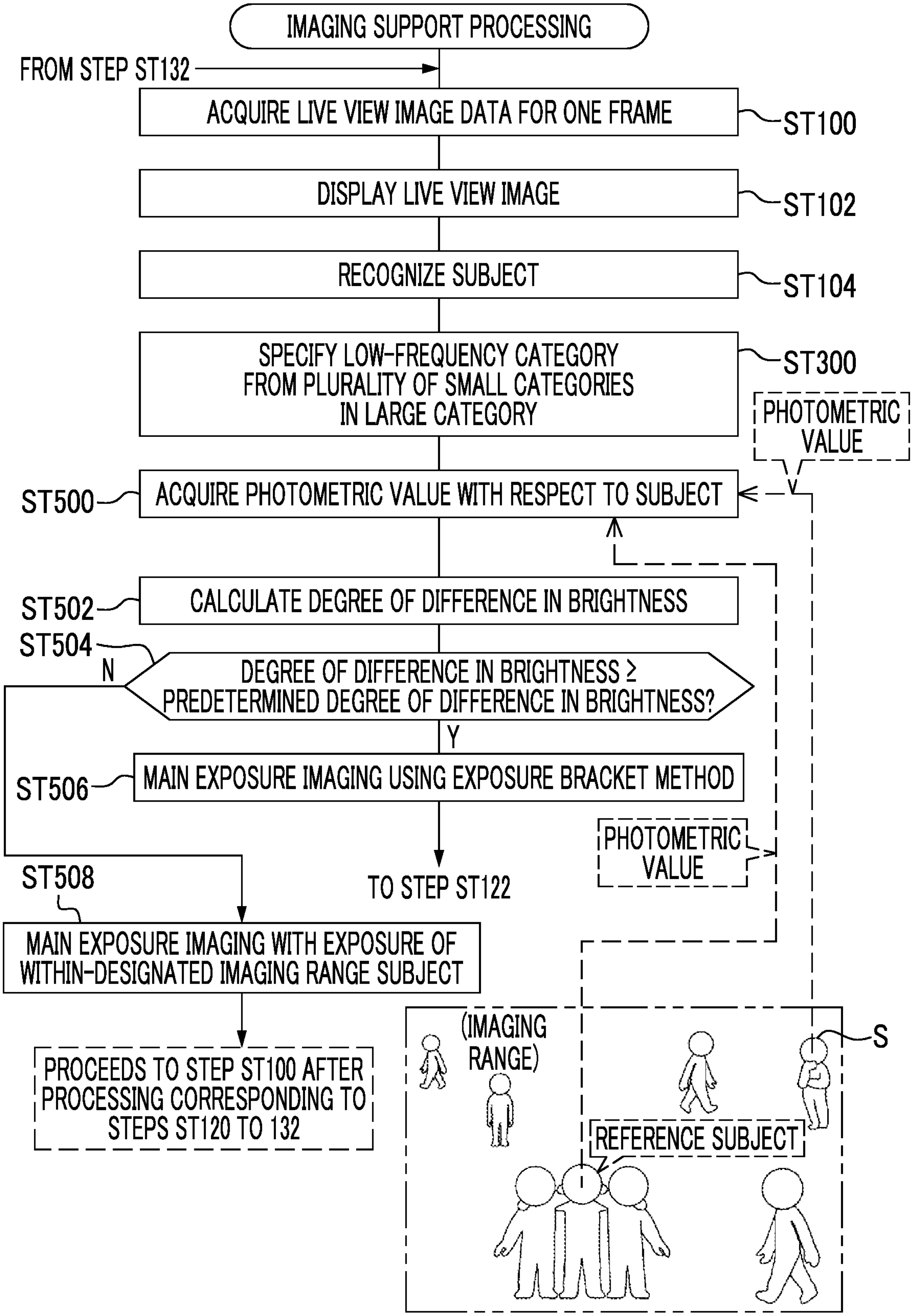
FIG. 31 is a flowchart showing a sixth modification example of the flow of the imaging support processing.

The exposure bracket method imaging processing is realized, for example, by executing the imaging support processing shown in FIG. 31 by the CPU 48A. The flowchart shown in FIG. 31 is different from the flowchart shown in FIG. 26 in that steps ST500 to ST508 are provided instead of steps ST450 to ST456.

In step ST500 of the imaging support processing shown in FIG. 31, the acquisition unit 48A1 acquires a photometric value for each of the within-designated imaging range subject and the target category subject S. The photometric value may be calculated based on the live view image data or may be detected by a photometric sensor (not shown).

In next step ST502, the control unit 48A5 calculates the degree of difference in brightness by using the two photometric values acquired for the within-designated imaging range subject and the target category subject S, respectively, in step ST500. The degree of difference in brightness is an absolute value of the difference between the two photometric values, for example.

In next step ST504, the control unit 48A5 determines whether or not the degree of difference in brightness calculated in step ST502 is equal to or larger than the predetermined degree of difference in brightness. The predetermined degree of difference in brightness may be a fixed value or may be a variable value that is changed in accordance with the given instruction and/or the given condition. In step ST504, in a case in which the degree of difference in brightness is smaller than the predetermined degree of difference in brightness, a negative determination is made, and the imaging support processing proceeds to step ST508. In step ST504, in a case in which the degree of difference in brightness is equal to or larger than the predetermined degree of difference in brightness, a positive determination is made, and the imaging support processing proceeds to step ST506.

In step ST506, the control unit 48A5 controls the imaging apparatus 10 to execute the main exposure imaging using the exposure bracket method for each of the within-designated imaging range subject and the target category subject S. After the processing of step ST506 is executed, the imaging support processing proceeds to step ST122. It should be noted that the main exposure image data of each frame obtained by performing the main exposure imaging using the exposure bracket method may be individually stored in a predetermined storage region, or may be stored in the predetermined storage region as composite image data of one frame obtained by composition.

In step ST508, the control unit 48A5 controls the imaging apparatus 10 to execute the main exposure imaging on the within-designated imaging range subject and the target category subject S with the exposure determined with reference to the within-designated imaging range subject. After the processing of step ST508 is executed, the control unit 48A5 executes the processing corresponding to steps ST120 to ST132 (see FIG. 25) and then proceeds to step ST100.

As described above, in the example shown in FIG. 31, in a case in which the degree of difference in brightness is equal to or larger than the predetermined degree of difference in brightness, the main exposure imaging is performed using the exposure bracket method for the within-designated imaging range subject and the target category subject S. As a result, it is possible to obtain the image having less unevenness in brightness as the within-designated imaging range subject image and the target category subject image S1 than in a case in which only the imaging for one frame is performed under a situation in which there is unevenness in brightness between the within-designated imaging range subject and the target category subject S.

In addition, in the example shown in FIG. 31, in a case in which the degree of difference in brightness is smaller than the predetermined degree of difference in brightness, the main exposure imaging is performed on the within-designated imaging range subject and the target category subject S with the exposure determined with reference to the reference subject. As a result, it is possible to reduce the time and effort needed in a case in which the main exposure imaging is performed on the within-designated imaging range subject and the target category subject S after eliminating the unevenness in brightness between within-designated imaging range subject and the target category subject S.

Figure 32:
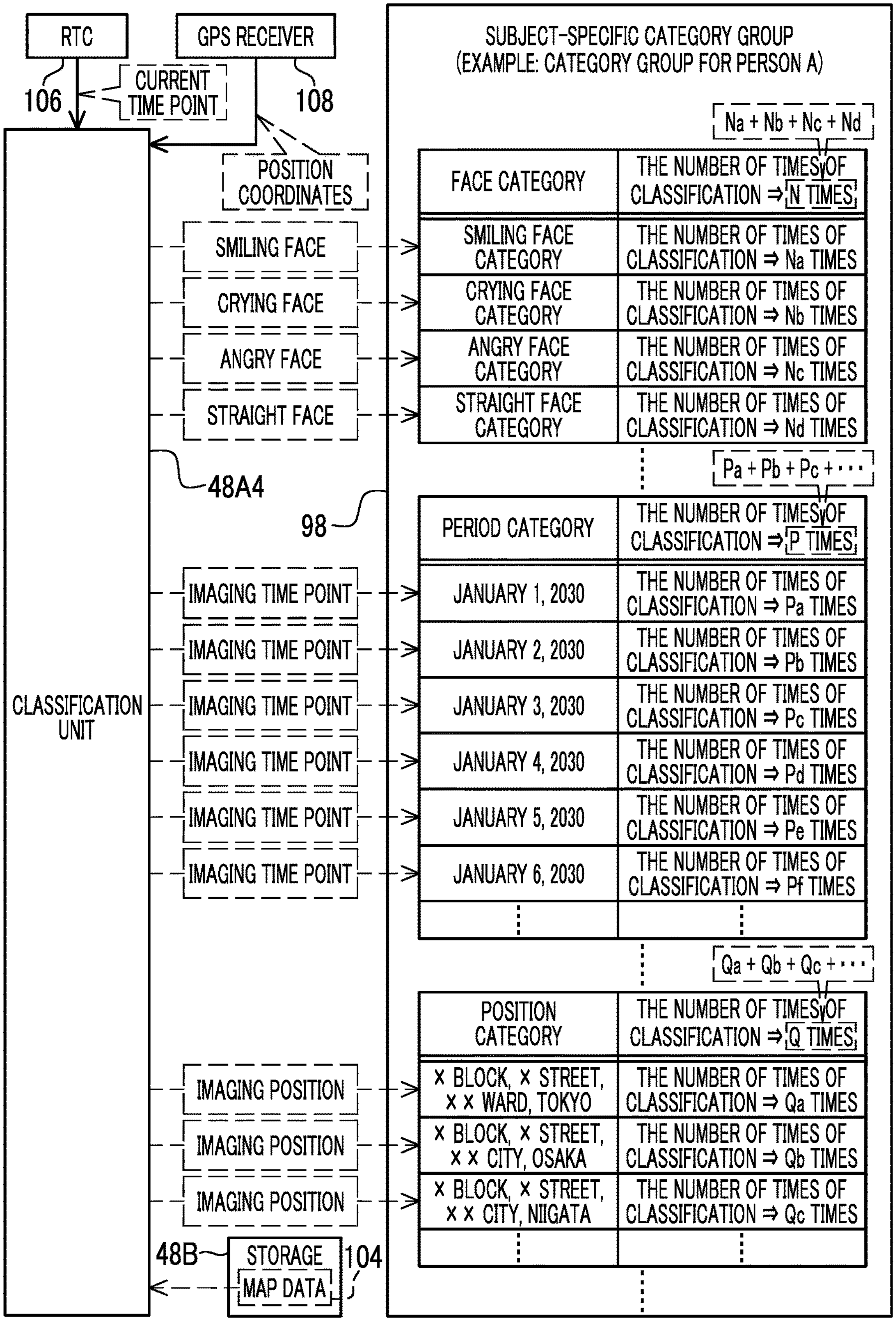
FIG. 32 is a block diagram showing an example of a configuration of a subject-specific category group.

In the embodiment described above, the face category, the posture category, the eye category, and the designated imaging range category are described as examples of the large category included in the subject-specific category group 98, but the technology of the present disclosure is not limited to this. For example, as shown in FIG. 32, in the subject-specific category group 98, a period category which is a category determined by the subject feature in a unit of "period" and/or a position category which is a category determined by the subject feature in a unit of "position" may be included as the large category. Here, the period refers to a period during which the subject is imaged. In addition, the position refers to a position at which the subject is imaged.

The period category includes a plurality of date categories in which the dates are different from each other as the small categories. The number of times of classification is associated with each of the plurality of date categories. In addition, the number of times of classification is also associated with the period category. The number of times of classification of the period category is the sum of the number of times of classification of the plurality of date categories.

The position category includes a plurality of small position categories having different positions from each other as the small categories. The number of times of classification is associated with each of the plurality of small position categories. In addition, the number of times of classification is also associated with the position category. The number of times of classification of the position category is the sum of the number of times of classification of the plurality of small position categories.

In the example shown in FIG. 32, map data 104 is stored in the storage 48B. The map data 104 is data in which position coordinates of latitude, longitude, and height are associated with an address on a map. The classification unit 48A4 refers to the map data 104. It should be noted that the small position category is not limited to the address on the map, and may be position coordinates.

In the example shown in FIG. 32, an RTC 106 and a GPS receiver 108, which is an example of a GNSS receiver, are connected to the classification unit 48A4. The RTC 106 acquires a current time point. The RTC 106 receives drive power from a power supply system disconnected from a power supply system for the controller 48, and continues to tick the current time point (year, month, day, hour, minute, and second) even in a state in which the controller 48 is shut down.

The GPS receiver 108 receives radio waves from a plurality of GPS satellites (not shown), which are an example of a plurality of GNSS satellites, and calculates the position coordinates for specifying the current position of the imaging apparatus 10 based on the reception result.

Each time the main exposure imaging for one frame is performed, the classification unit 48A4 acquires the current time point from the RTC 106 and classifies the acquired current time point as an imaging time point into the corresponding date category among the plurality of date categories included in the period category. Each time the classification unit 48A4 classifies the imaging time point into the date category, "1" is added to the number of times of classification of the date category into which the imaging time point is classified. It should be noted that, here, the classification unit 48A4 acquires the current time point from the RTC 106, but the classification unit 48A4 may acquire the current time point via a communication network, such as the Internet.

Each time the main exposure imaging for one frame is performed, the classification unit 48A4 acquires the position coordinates from the GPS receiver 108 as a position at which the imaging is performed (hereinafter, also referred to as an "imaging position"). The classification unit 48A4 specifies the address corresponding to the acquired imaging position from the map data 104. Moreover, the classification unit 48A4 classifies the imaging position into the small position category corresponding to the specified address. Each time the classification unit 48A4 classifies the imaging position into the small position category, "1" is added to the number of times of classification of the small position category into which the imaging position is classified.

Figure 33:
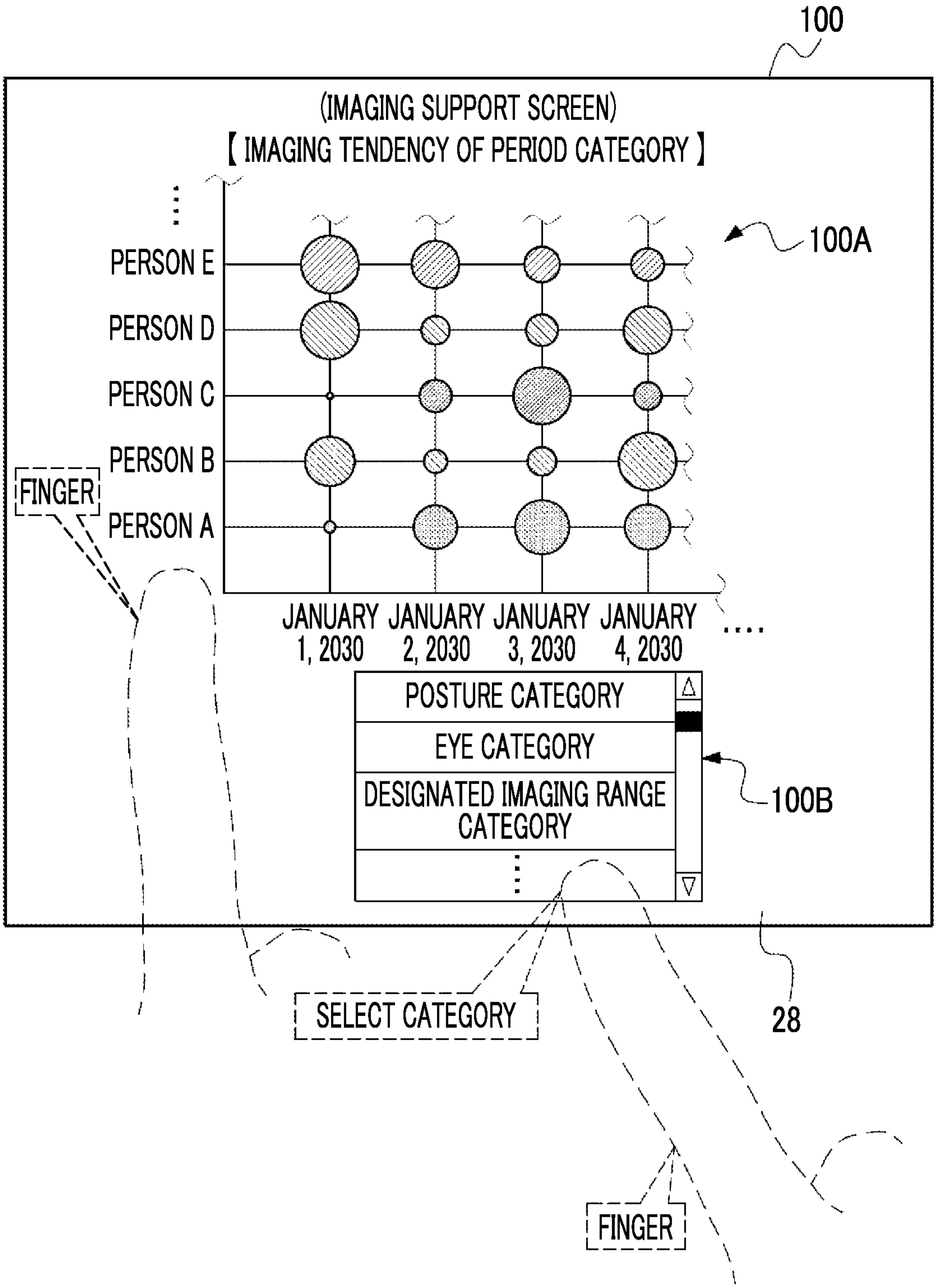
FIG. 33 is a screen view showing an example of an aspect in which a period category bubble chart and the like are displayed in the imaging support screen.

In the example shown in FIG. 33, the imaging support screen 100 displays a bubble chart related to the period category (hereinafter, also referred to as a "period category bubble chart") as the bubble chart 100A. In the same manner as the face category bubble chart (see FIG. 17), also in the period category bubble chart, bubbles indicating the number of times of classification are plotted on two axes of the axis indicating the plurality of recognized persons and an axis indicating the date category.

In addition, in a case in which the position category is selected from the category selection screen 100B of the reception device 80 (for example, the touch panel 28), the imaging support screen 100 displays a bubble chart related to the position category (hereinafter, a position category bubble chart) as the bubble chart 100A. In the same manner as the bubble chart related to the face category (see FIG. 17), also in the position category bubble chart, bubbles indicating the number of times of classification are plotted on two axes of the axis indicating the plurality of recognized persons and an axis indicating the small position category.

Figure 34:
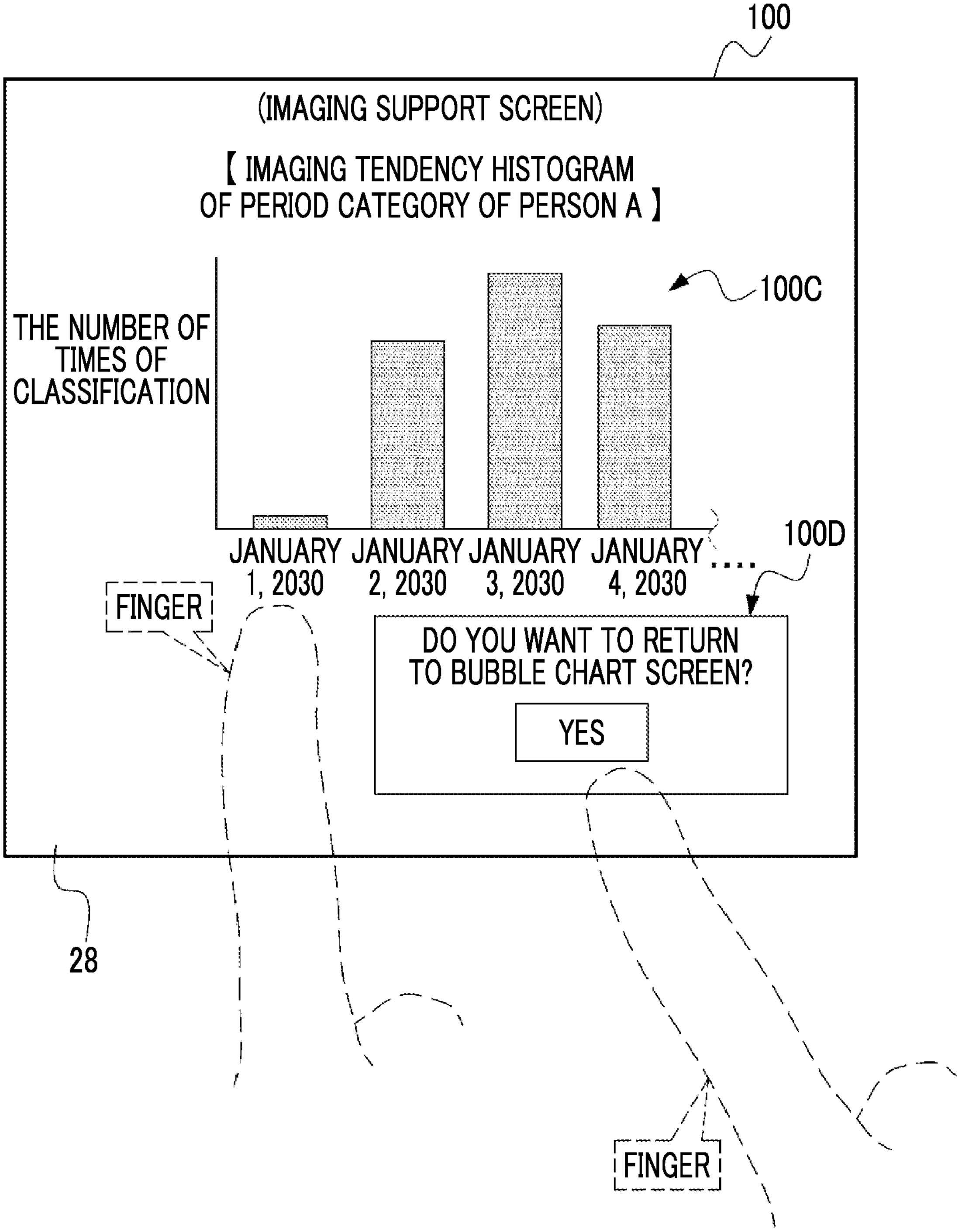
FIG. 34 is a screen view showing an example of an aspect in which a period category histogram and the like are displayed in the imaging support screen.

In the example shown in FIG. 34, the imaging support screen 100 displays a histogram related to the period category (hereinafter, also referred to as "period category histogram") as the histogram 100C. A horizontal axis of the period category histogram indicates the date category, and a vertical axis of the period category histogram indicates the number of times of classification. In addition, the imaging support screen 100 displays, as the histogram 100C, a histogram related to the position category (hereinafter, also referred to as a "position category histogram") so as to be switchable with a histogram of another category (not shown). A horizontal axis of the position category histogram indicates the small position category, and a vertical axis of the position category histogram indicates the number of times of classification.

As described above, the subject-specific category group 98 includes, as the large category, the period category determined by the subject feature in a unit of "period". In addition, the period category includes the plurality of date categories in which the dates are different from each other. Moreover, each time the main exposure imaging for one frame is performed, the imaging time point is classified into the date category, and the period category bubble chart and the period category histogram corresponding to the number of times of classification are displayed on the display 26 together with the live view image. The period category bubble chart and the period category histogram are used in the same method as the face category bubble chart and the face category histogram described in the embodiment described above. Therefore, with the present configuration, it is possible to support the imaging with the imaging apparatus 10 in accordance with the number of times of classification counted by classifying the imaging time point into the date category. It should be noted that, here, the date category divided by year, month, and day is described, this is merely an example, and a category may be used in which the period is divided by year, month, day, hour, minute, or second.

In addition, the subject-specific category group 98 includes, as the large category, the position category determined by the subject feature in a unit of "position". In addition, the position category includes the plurality of small position categories in which the positions are different from each other. Moreover, each time the main exposure imaging for one frame is performed, the imaging position is classified into the small position categories, and the position category bubble chart and the position category histogram corresponding to the number of times of classification are displayed on the display 26 together with the live view image. The position category bubble chart and the position category histogram are used in the same method as the face category bubble chart and the face category histogram described in the embodiment described above. Therefore, with the present configuration, it is possible to support the imaging with the imaging apparatus 10 in accordance with the number of times of classification counted by classifying the imaging position into the small position category.

Figure 35:
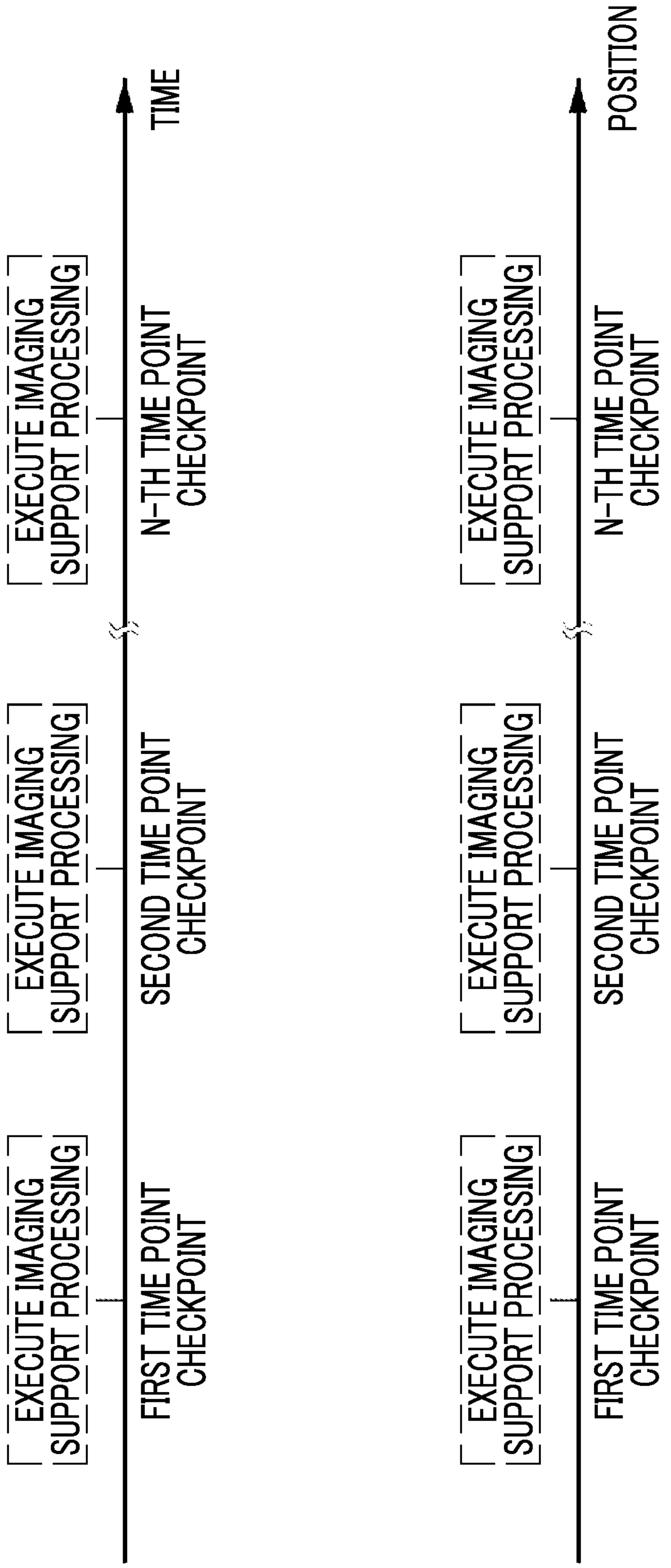
FIG. 35 is a time chart showing an example of an aspect in which the imaging support processing is executed at predetermined time intervals and an example of an aspect in which the imaging support processing is executed at each position checkpoint.

In the embodiment described above, the form example has been described in which it is assumed that the imaging support processing is continuously executed while the imaging mode is set, but the technology of the present disclosure is not limited to this, and the imaging support processing may be intermittently executed in accordance with the time point and/or the position. For example, as shown in FIG. 35, the imaging support processing may be executed only for a designated time (for example, 10 minutes) at a time point checkpoint divided at a predetermined time (for example, 1 hour) interval. The predetermined time interval that determines the time point checkpoint may be fixed or may be changed in accordance with the given instruction and/or the given condition (for example, the imaging condition). In addition, as shown in FIG. 35 as an example, the imaging support processing may be executed only for a designated time at a plurality of position checkpoints divided for each position. The position checkpoint can be specified by using the map data 104 and the GPS receiver 108, for example.

In addition, in the embodiment described above, the form example has been described in which the subject feature is classified into the category by the classification unit 48A4 regardless of an imaging scene imaged by the imaging apparatus 10, but the technology of the present disclosure is not limited to this. For example, the classification unit 48A4 may classify the subject feature into the category in a case in which a scene to be imaged by the imaging apparatus 10 matches a specific scene (for example, a scene of a sports day, a scene of a beach, and a scene of a concert). The specific scene may be a scene imaged in the past.

Figure 36:
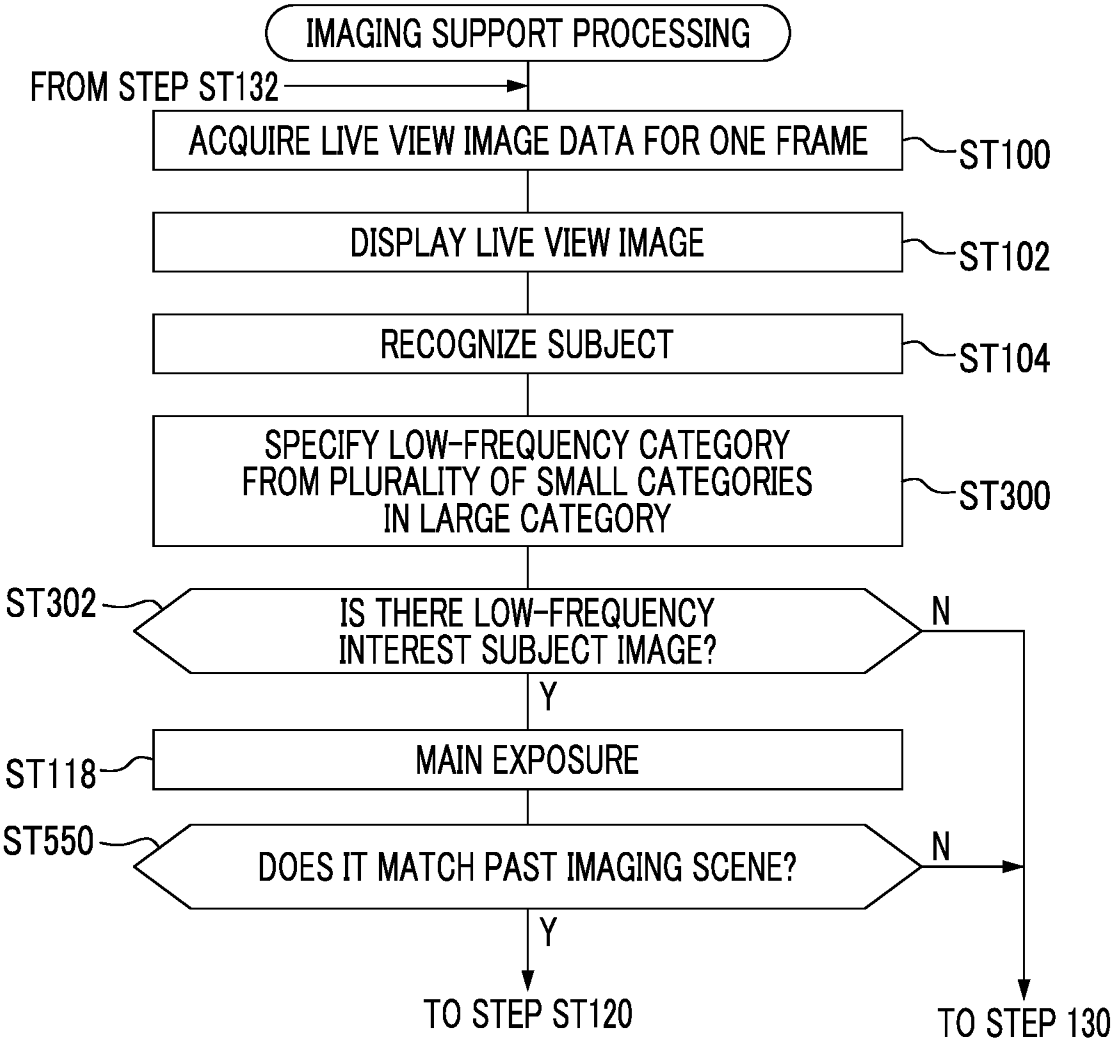
FIG. 36 is a flowchart showing a seventh modification example of the flow of the imaging support processing.

In this case, as an example, the imaging support processing shown in FIG. 36 is executed by the CPU 48A. The flowchart shown in FIG. 36 is different from the flowchart shown in FIG. 23 in that step ST550 is provided between steps ST118 and ST120.

In step ST550 of the imaging support processing shown in FIG. 36, the subject recognition unit 48A2 recognizes the subject in the imaging region based on the latest main exposure image data obtained by performing the main exposure imaging in step ST118 to specify the current imaging scene. In addition, the subject recognition unit 48A2 specifies the past imaging scene based on the past main exposure captured image data (for example, the main exposure image data obtained within the period designated by the user). Moreover, the subject recognition unit 48A2 determines whether or not the current imaging scene and the past imaging scene match. In step ST550, in a case in which the current imaging scene and the past imaging scene do not match, a negative determination is made, and the imaging support processing proceeds to step ST130. In step ST550, in a case in which the current imaging scene and the past imaging scene match, a positive determination is made, and the imaging support processing proceeds to step ST120. As a result, in step ST126, the subject feature is classified into the category for each subject by the classification unit 48A4.

As described above, since the classification unit 48A4 classifies the subject feature into the category for each subject only in a case in which the current imaging scene and the specific scene match, the subject feature specified from the main exposure image data obtained by performing the main exposure imaging on the scene that is not intended by the user can be prevented from being classified into the category.

In addition, since the classification unit 48A4 classifies the subject feature into the category for each subject only in a case in which the current imaging scene and the past imaging scene match, the subject feature specified from the main exposure image data obtained by performing the main exposure imaging on the current imaging scene that matches the past imaging scene can be classified into the category.

Figure 37:
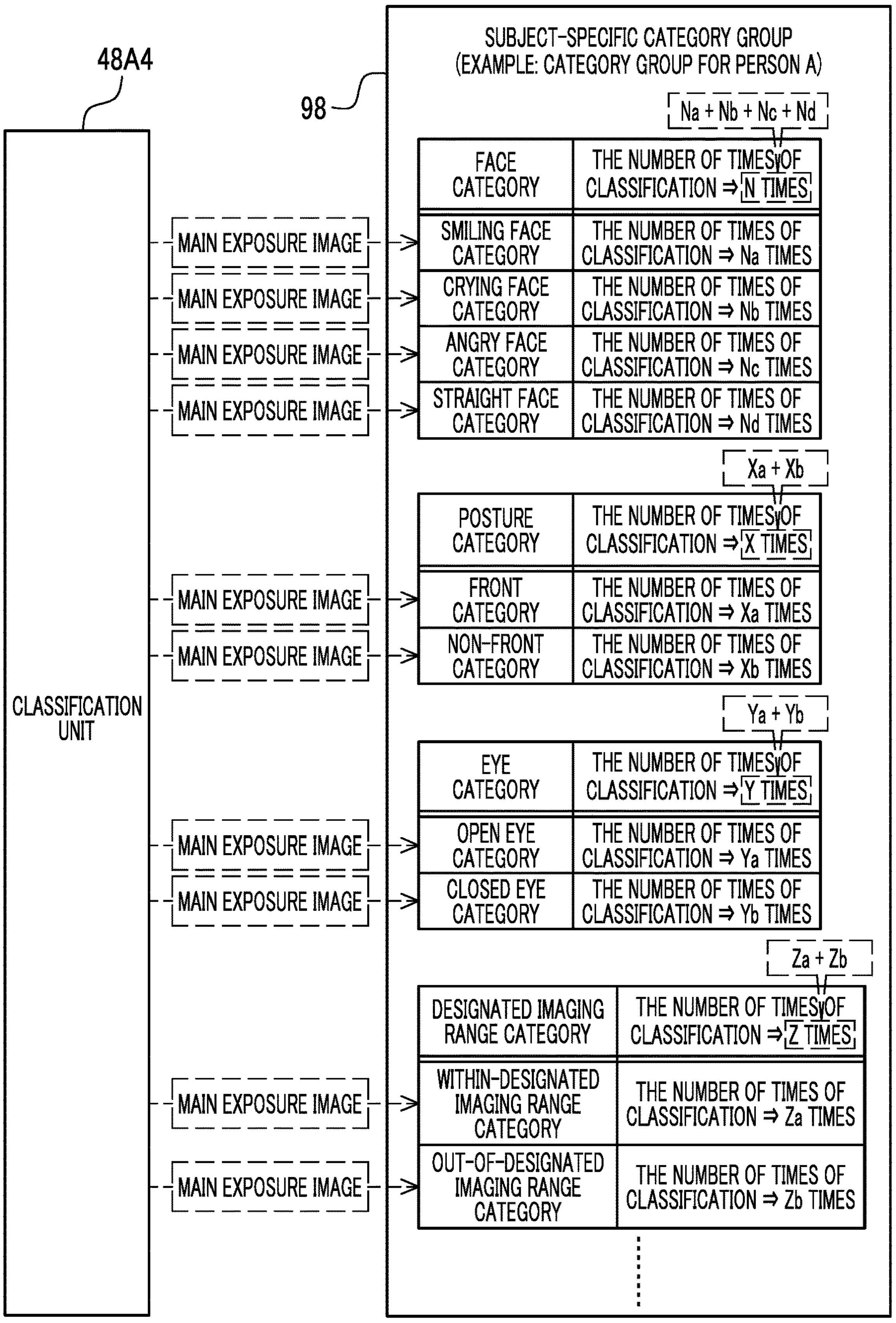
FIG. 37 is a conceptual diagram showing an example of an aspect in which a main exposure image is classified into a plurality of categories by the classification unit.

In addition, in the embodiment described above, the form example has been described in which the subject feature is classified into each of the plurality of categories, but the technology of the present disclosure is not limited to this. For example, as shown in FIG. 37, the main exposure image obtained by performing the main exposure imaging may be classified into each of the plurality of categories by the classification unit 48A4. In this case, each time the main exposure image is classified into the category, "1" is added to the number of times of classification of the category into which the main exposure image is classified. The subject-specific category group 98 constructed in this way is also used by the same method as the subject-specific category group 98 described in the embodiment. Therefore, with the present configuration, it is possible to support the imaging with the imaging apparatus 10 in accordance with the number of times of classification in which the main exposure image is classified into the category.

Figure 38:
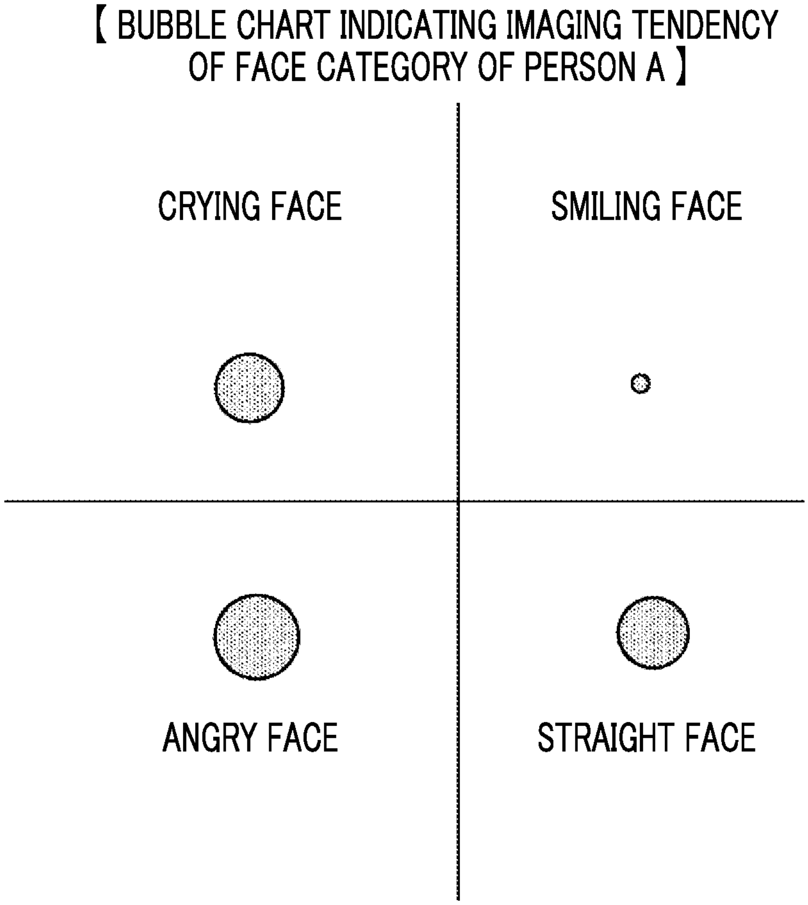
FIG. 38 is a conceptual diagram showing an example of a four-quadrant face category bubble chart.
Figure 39:
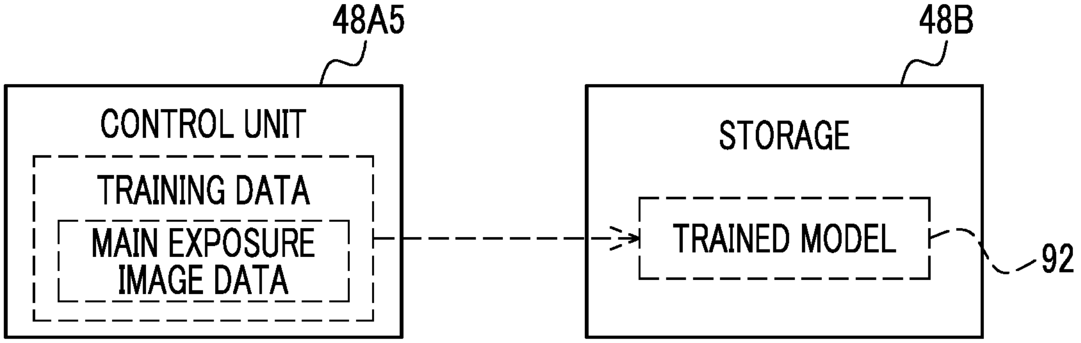
FIG. 39 is a block diagram showing an example of an aspect in which training data including main exposure image data obtained by main exposure imaging in which support processing is executed is used in machine learning of a trained model.

In addition, in the embodiment described above, the face category histogram (see FIG. 18) related to the person A is described, but the technology of the present disclosure is not limited to this. For example, as shown in FIG. 38, instead of the face category histogram, a four-quadrant face category bubble chart may be used. In the four-quadrant face category bubble chart, the smiling face category is assigned to a first quadrant, the crying face category is assigned to a second quadrant, the angry face category is assigned to a third quadrant, and the straight face category is assigned to a fourth quadrant. Moreover, the number of times of classification corresponding to each category is expressed by the size of the bubble. It should be noted that, as shown in FIG. 38, in a case in which the display is performed by the categories of four quadrants, the expression of the face may be classified in more detail and a scatter diagram may be displayed instead of the bubble chart. In this case, a delicate expression of the face can be expressed by adjusting a plot position of the point based on the classified expression of the face. For example, even in the same smiling face category, an image in which the smiling face closer to the crying face is reflected is plotted on a left side of the figure in the first quadrant. In addition, an image in which the smiling face closer to the straight face is reflected is plotted on a lower side of the figure in the first quadrant. With such a scatter diagram, it is possible for the user to grasp in more detail what kind of face of the person is imaged.

In addition, in the embodiment described above, the bubble chart 100A and the histogram 100C are described, but the technology of the present disclosure is not limited to this. Another graph may be used or a numerical value indicating the number of times of classification may be displayed in a form divided for each subject or for each category.

In addition, in the embodiment described above, the form example has been described in which the imaging related to the category corresponding to the number of times of classification selected by the user from the histogram 100C is supported, but the technology of the present disclosure is not limited to this, and the category in which the imaging is supported may be directly selected by the user from the histogram 100C and the like via the reception device 80 (for example, the touch panel 28).

In addition, in the embodiment described above, the form example has been described in which the main exposure image data is stored in the image memory 50, but data including the main exposure image data obtained by performing the main exposure imaging supported by performing the support processing described above may be used in the machine learning of the trained model 92 as training data. Accordingly, it is possible to create the trained model 92 based on the main exposure image data obtained by performing the main exposure imaging supported by performing the support processing.

Figure 40:
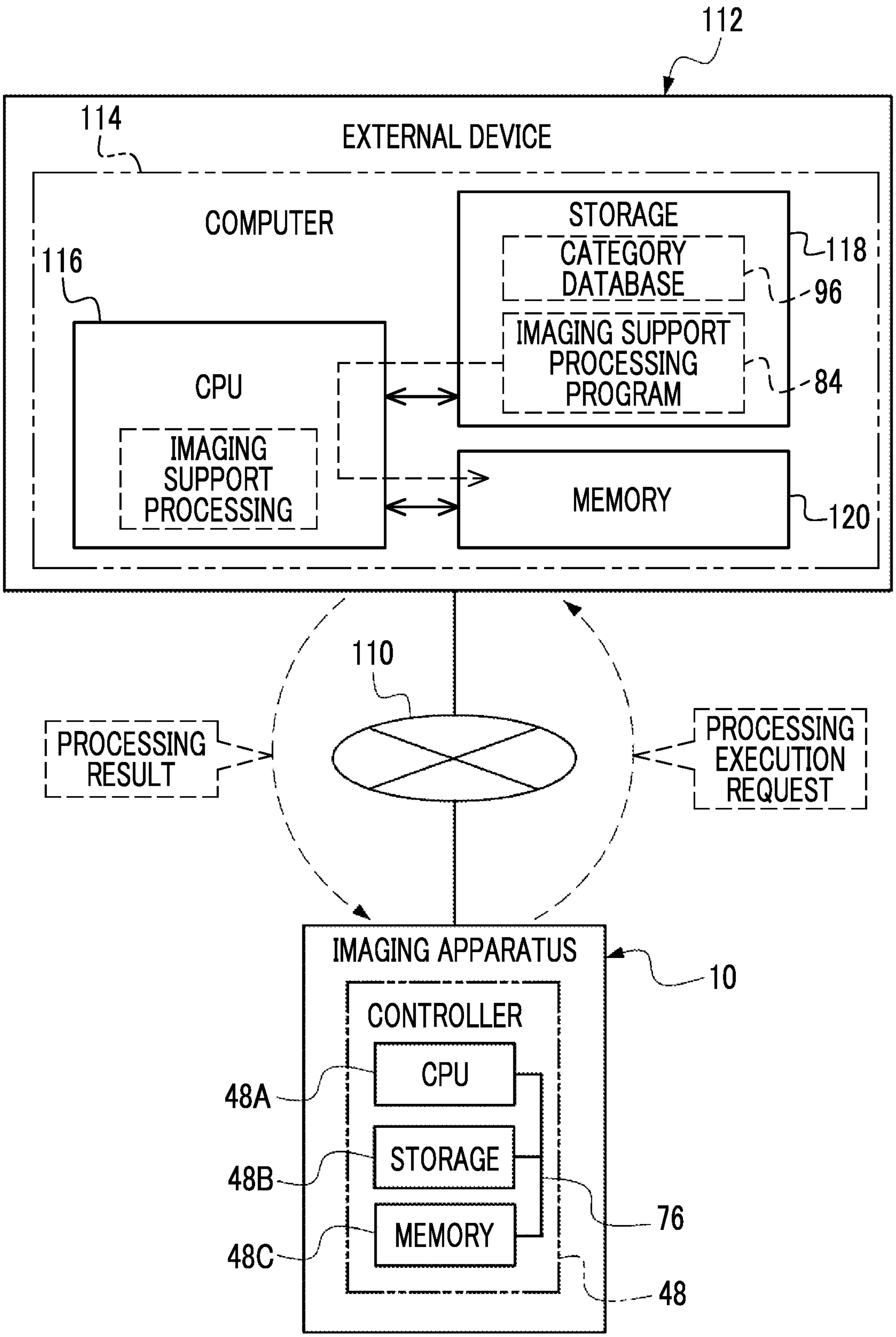
FIG. 40 is a block diagram showing an example of an aspect in which the imaging apparatus causes an external device to execute the imaging support processing.

In addition, in the embodiment described above, the form example has been described in which the imaging support processing is executed by the controller 48 in the imaging apparatus 10, but the technology of the present disclosure is not limited to this. For example, as shown in FIG. 40, the imaging support processing may be executed by a computer 114 in an external device 112 that is communicably connected to the imaging apparatus 10 via a network 110, such as a LAN or a WAN. In the example shown in FIG. 40, the computer 114 comprises a CPU 116, a storage 118, and a memory 120. The category database 96 is constructed in the storage 118, and the imaging support processing program 84 is stored in the storage 118.

The imaging apparatus 10 requests the external device 112 to execute the imaging support processing, via the network 110. In response to this, the CPU 116 of the external device 112 reads out the imaging support processing program 84 from the storage 118, and executes the imaging support processing program 84 on the memory 120. The CPU 116 performs the imaging support processing in accordance with the imaging support processing program 84 executed on the memory. Moreover, the CPU 116 provides a processing result obtained by executing the imaging support processing to the imaging apparatus 10 via the network 110.

In addition, the imaging apparatus 10 and the external device 112 may be configured to execute the imaging support processing in a distributed manner, or a plurality of devices including the imaging apparatus 10 and the external device 112 may execute the imaging support processing in a distributed manner. In a case of performing the distribution processing, for example, the CPU 48A of the imaging apparatus 10 may be operated as the acquisition unit 48A1 and the control unit 48A5, and the CPU of the device (for example, the external device 112) other than the imaging apparatus 10 may be operated as the subject recognition unit 48A2, the feature extraction unit 48A3, and the classification unit 48A4. That is, the processing load applied to the imaging apparatus 10 may be reduced by causing the external device having a higher operation power than the imaging apparatus 10 to perform the processing having a relatively large processing load.

In addition, in the embodiment described above, the still picture is described as the main exposure image, but the technology of the present disclosure is not limited to this, and the video may be used as the main exposure image. The video may be a video for recording or a video for display, that is, the live view image or a postview image.

In addition, in the embodiment described above, the imaging recommend information is displayed in the live view image, but it is not always necessary to display the imaging recommend information in the live view image. For example, during the main exposure imaging of the video, the display (at least one of the arrow, the face frame, or the message) indicating the target category subject may be performed in the same manner as the imaging recommend information. By displaying the target category subject during the main exposure imaging of the video in this way, it is possible for the user to recognize that the target category subject is included in the video by using the imaging apparatus 10. In addition, it is possible for the user to acquire the still picture including the target category subject by using the imaging apparatus 10 to cut out the frame including the target category subject after the main exposure imaging of the video. In this case, the imaging apparatus 10 may perform the classification into the same category each time the target category subject is specified by the main exposure imaging of the video, and perform the display by updating the histogram and/or the bubble chart. As described above, it is possible for the user to grasp what kind of subject is included only by performing the imaging for the video and acquiring the video by using the imaging apparatus 10. In addition, in this case, a value based on the still picture and a value based on the video may be displayed in different aspects in the histogram and/or the bubble chart. For example, in the histogram, a histogram based on the still picture and a histogram based on the video are displayed in different colors by a stacked bar graph. As described above, it is possible for the user to grasp whether each number of times of classification is based on the still picture or the video. In addition, the histogram and/or the bubble chart may be created based only on the classification of the subject indicated by the subject region included in one video. As described above, it is possible for the user to grasp what kind of category into which the subject region is classified is included in the one video. It should be noted that such the histogram and/or the bubble chart may be displayed on the display 26 based on the user operation or the like after imaging for the still picture or the video, or in a playback mode in which the live view image is not displayed.

In addition, in the embodiment described above, the form example has been described in which the number of times of classification is continuously increased, but the technology of the present disclosure is not limited to this. For example, the number of times of classification corresponding to at least one category included in the subject-specific category group 98 may be reset on a regular basis or at a designated timing. For example, it may be reset in accordance with the time and/or the position. Specifically, it may be reset once a day, may be reset once an hour, or may be reset each 100 meters of the position change.

In addition, in the embodiment described above, the smiling face category is described as the target category, but the technology of the present disclosure is not limited to this, and other categories may be used as the target category or a plurality of categories may be used as the target category. In this case, for example, in the face category histogram shown in FIG. 18, the number of times of classification related to the plurality of categories (for example, the smiling face category and the crying face category) or the plurality of categories need only be selected by the user.

In addition, in the embodiment described above, the person A is described as the target category subject, but the technology of the present disclosure is not limited to this, and a plurality of target category subjects may be used. In this case, for example, in the face category bubble chart shown in FIG. 17, the plurality of persons (for example, the person A, the person B, and the person C) need only be selected by the user. As a result, for example, in a case in which the target category is the smiling face category, the various pieces of support processing described above are performed in a scene in which at least any one of the plurality of persons selected by the user has the smiling face.

In addition, in the embodiment described above, the number of times of classification, which is a simple number of times the subject feature is classified into the category, is described, but the technology of the present disclosure is not limited to this. For example, the number of times of classification per unit time may be used.

In addition, in the embodiment described above, the detection frame 102 (see FIGS. 19 and 21) has been described, but the technology of the present disclosure is not limited to this, and information (for example, a name and/or a category name) related to the subject surrounded by the detection frame 102 may also be displayed together with the detection frame 102.

In addition, in the embodiment described above, a physical camera (hereinafter, also referred to as a "physical camera") is described as the imaging apparatus 10, but the technology of the present disclosure is not limited to this. A virtual camera that generates virtual viewpoint image data by virtually imaging the subject from a virtual viewpoint based on captured image data obtained by the imaging with a plurality of physical cameras set at different positions may be applied instead of the physical camera. In this case, an image indicated by the virtual viewpoint image data, that is, a virtual viewpoint image is an example of a "captured image" according to the technology of the present disclosure.

In the embodiment described above, the form example is described in which the non-phase difference pixel divided region 30N and the phase difference pixel divided region 30P are used in combination, but the technology of the present disclosure is not limited to this. For example, an area sensor may be used in which the phase difference image data and the non-phase difference image data are selectively generated and read out instead of the non-phase difference pixel divided region 30N and the phase difference pixel divided region 30P. In this case, on the area sensor, a plurality of photosensitive pixels are two-dimensionally arranged. For the photosensitive pixels included in the area sensor, for example, a pair of independent photodiodes in which the light shielding member is not provided are used. In a case in which the non-phase difference image data is generated and read out, the photoelectric conversion is performed by the entire region of the photosensitive pixels (pair of photodiodes), and in a case in which the phase difference image data is generated and read out (for example, a case in which passive method distance measurement is performed), the photoelectric conversion is performed by at one photodiode of the pair of photodiodes. Here, one photodiode of the pair of photodiodes is a photodiode corresponding to the first phase difference pixel L described in the above embodiment, and the other photodiode of the pair of photodiodes is a photodiode corresponding to the second phase difference pixel R described in the above embodiment. It should be noted that the phase difference image data and the non-phase difference image data may be selectively generated and read out by all the photosensitive pixels included in the area sensor, but the technology of the present disclosure is not limited to this, and the phase difference image data and the non-phase difference image data may be selectively generated and read out by a part of the photosensitive pixels included in the area sensor.

In the embodiment described above, the image plane phase difference pixel is described as the phase difference pixel P, but the technology of the present disclosure is not limited to this. For example, the non-phase difference pixels N may be disposed in place of the phase difference pixels P included in the photoelectric conversion element 30, and a phase difference AF plate including a plurality of phase difference pixels P may be provided in the imaging apparatus body 12 separately from the photoelectric conversion element 30.

In the embodiment described above, an AF method using the distance measurement result based on the phase difference image data, that is, the phase difference AF method is described, but the technology of the present disclosure is not limited to this. For example, the contrast AF method may be adopted instead of the phase difference AF method. In addition, the AF method based on the distance measurement result using the parallax of a pair of images obtained from a stereo camera, or the AF method using a TI/F method distance measurement result using a laser beam or the like may be adopted.

In the embodiment described above, the focal plane shutter is described as an example of the mechanical shutter 72, but the technology of the present disclosure is not limited to this, and the technology of the present disclosure is established even in a case in which another type of mechanical shutter, such as a lens shutter, is applied instead of the focal plane shutter.

Figure 41:
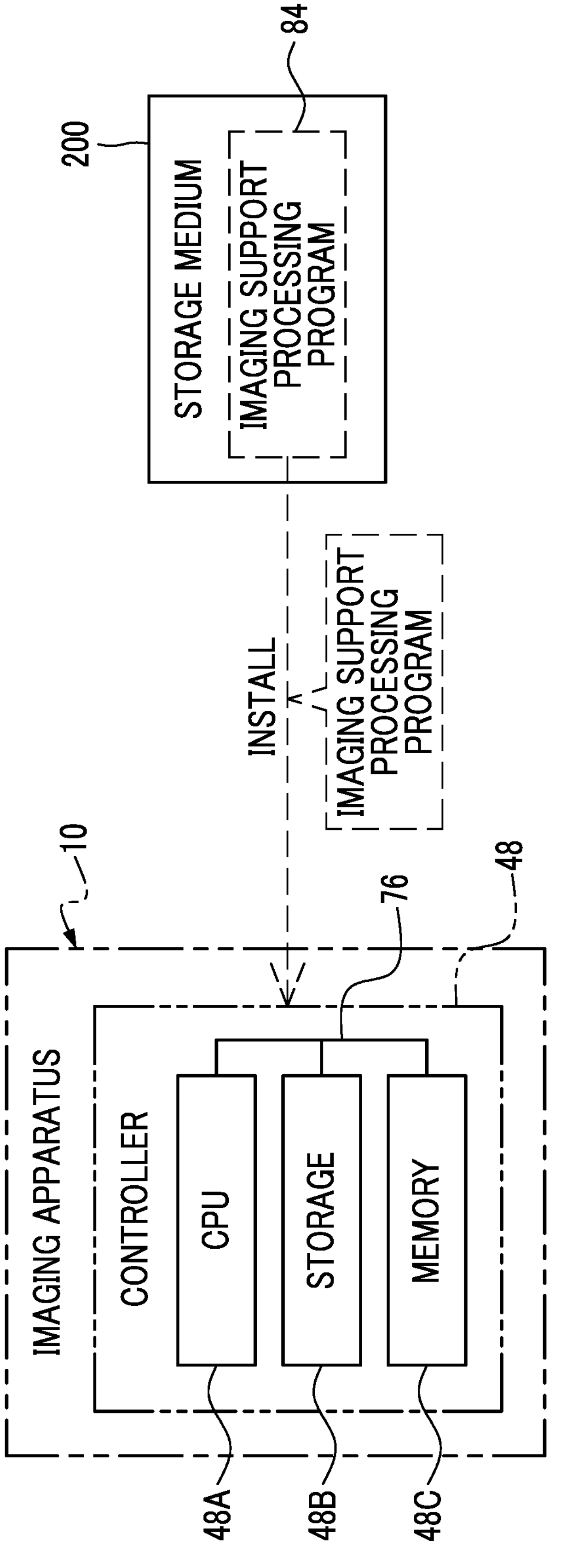
FIG. 41 is a block diagram showing an example of an aspect in which an imaging support processing program is installed in the controller in the imaging apparatus from a storage medium in which the imaging support processing program is stored.

In the embodiment described above, the form example is described in which the imaging support processing program 84 is stored in the storage 48B, but the technology of the present disclosure is not limited to this. For example, as shown in FIG. 41, the imaging support processing program 84 may be stored in a storage medium 200. The storage medium 200 is a non-transitory storage medium. Examples of the storage medium 200 include any portable storage medium, such as an SSD or a USB memory.

The imaging support processing program 84, which is stored in the storage medium 200, is installed in the controller 48. The CPU 48A executes the imaging support processing in accordance with the imaging support processing program 84.

In addition, the imaging support processing program 84 may be stored in a storage unit of another computer or server device connected to the controller 48 via a communication network (not shown), and the imaging support processing program 84 may be downloaded in response to a request of the imaging apparatus 10 and installed in the controller 48.

It should be noted that it is not required to store the entire imaging support processing program 84 in the storage unit or the storage 48B of another computer or server device connected to the controller 48, and a part of the imaging support processing program 84 may be stored.

In the example shown in FIG. 41, the aspect example is described in which the controller 48 is built in the imaging apparatus 10, but the technology of the present disclosure is not limited to this, and for example, the controller 48 may be provided outside the imaging apparatus 10.

In the example shown in FIG. 41, the CPU 48A is a single CPU, but may be a plurality of CPUs. In addition, a GPU may be applied instead of the CPU 48A.

In the example shown in FIG. 41, the controller 48 is described, but the technology of the present disclosure is not limited to this, and a device including an ASIC, an FPGA, and/or a PLD may be applied instead of the controller 48. In addition, a hardware configuration and a software configuration may be used in combination, instead of the controller 48.

As a hardware resource for executing the imaging support processing described in the embodiment, the following various processors can be used. Examples of the processor include a CPU which is a general-purpose processor functioning as the hardware resource for executing the imaging support processing by executing software, that is, a program. In addition, examples of the processor include a dedicated electric circuit which is a processor having a circuit configuration designed to be dedicated for executing specific processing, such as the FPGA, the PLD, or the ASIC. A memory is built in or connected to any processor, and any processor executes the imaging support processing by using the memory.

The hardware resource for executing the imaging support processing may be composed of one of these various processors, or may be composed of a combination (for example, a combination of a plurality of FPGAs or a combination of a CPU and an FPGA) of two or more processors of the same type or different types. In addition, the hardware resource for executing the imaging support processing may be one processor.

As a configuring example of one processor, first, there is a form in which one processor is composed of a combination of one or more CPUs and software and the processor functions as the hardware resource for executing the imaging support processing. Secondly, as represented by SoC, there is a form in which a processor that realizes the functions of the entire system including a plurality of hardware resources for executing the imaging support processing with one IC chip is used. As described above, the imaging support processing is realized by using one or more of the various processors described above as the hardware resource.

Further, as the hardware structure of these various processors, more specifically, it is possible to use an electric circuit in which circuit elements, such as semiconductor elements, are combined. In addition, the imaging support processing is merely an example. Therefore, it is needless to say that the deletion of an unneeded step, the addition of a new step, and the change of a processing order may be employed within a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unneeded parts may be deleted, new elements may be added, or replacements may be made with respect to the description contents and the shown contents above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

With respect to the embodiment described above, the following supplementary notes will be further disclosed.

(Supplementary Note 1)

An imaging support device comprising a processor, and a memory connected to or built in the processor, in which the processor acquires frequency information indicating a frequency of a feature of a subject specified from a captured image obtained by imaging with an imaging apparatus, the feature being classified into a category based on the feature, and performs support processing of supporting the imaging with the imaging apparatus based on the frequency information.

(Supplementary Note 2)

The imaging support device according to Supplementary Note 1, in which the category is categorized into a plurality of categories including at least one target category, the target category is a category determined based on the frequency information, and the support processing is processing including processing of supporting the imaging for a target category subject having the feature belonging to the target category.

(Supplementary Note 3)

The imaging support device according to Supplementary Note 2, in which the support processing is processing including display processing of performing display for recommending to image the target category subject.

(Supplementary Note 4)

The imaging support device according to Supplementary Note 3, in which the display processing is processing of displaying an image for display on a display and displaying a frame that surrounds at least a part of a target category subject image in the image for display.

(Supplementary Note 5)

The imaging support device according to any one of Supplementary Notes 2 to 4, in which the processor detects the target category subject based on an imaging result of the imaging apparatus, and acquires an image including an image corresponding to the target category subject on a condition that the target category subject is detected.

(Supplementary Note 6)

The imaging support device according to Supplementary Note 5, in which the processor detects the target category subject and causes the imaging apparatus to perform the imaging accompanied by main exposure on a condition that the target category subject is included in a predetermined imaging range.

(Supplementary Note 7)

The imaging support device according to any one of Supplementary Notes 2 to 6, in which, in a case in which the target category subject is positioned out of a designated imaging range determined in accordance with a given instruction from an outside, the processor controls the imaging apparatus to include the designated imaging range and the target category subject within a depth of field.

(Supplementary Note 8)

The imaging support device according to Supplementary Note 7, in which, in a case in which both the designated imaging range and the target category subject are not included within the depth of field due to a structure of the imaging apparatus, the processor causes the imaging apparatus to image the designated imaging range and the target category subject using a focus bracket method.

(Supplementary Note 9)

The imaging support device according to Supplementary Note 7 or 8, in which, in a case in which the target category subject is positioned within the designated imaging range, the processor causes the imaging apparatus to image the target category subject in a state in which the target category subject is in focus.

(Supplementary Note 10)

The imaging support device according to any one of Supplementary Notes 2 to 9, in which, in a case in which a degree of difference between brightness of a reference subject and brightness of the target category subject is equal to or larger than a predetermined degree of difference, the processor causes the imaging apparatus to image the reference subject and the target category subject using an exposure bracket method.

(Supplementary Note 11)

The imaging support device according to Supplementary Note 10, in which, in a case in which the degree of difference is smaller than the predetermined degree of difference, the processor causes the imaging apparatus to image the reference subject and the target category subject with an exposure determined with reference to the target category subject.

(Supplementary Note 12)

The imaging support device according to any one of Supplementary Notes 1 to 11, in which the image obtained by performing the imaging supported by performing the support processing is used in learning.

What is claimed is:

1. An imaging support device comprising:

a processor; and a memory connected to or built in the processor, wherein the processor is configured to:

acquire frequency information indicating a frequency of a feature of a subject specified from a captured image obtained by imaging with an imaging apparatus, the feature being classified into a category based on the feature, perform support processing of supporting the imaging with the imaging apparatus based on the frequency information, and generate an imaging support screen and display the imaging support screen on a live view image in a superimposed manner, wherein the category includes a plurality of large categories comprising a first large category and a second large category, the first large category includes a plurality of first small categories subordinate to the first large category, the plurality of first small categories are classified into a plurality of features that are subordinate to the feature of the first large category, the second large category includes a plurality of second small categories subordinate to the second large category, the plurality of second small categories are classified into a plurality of features that are subordinate to the feature of the second large category, at least one target category is selected from the first large category, the second large category, the plurality of first small categories, or the plurality of second small categories, the target category is a category determined based on the frequency information, and the support processing is processing including processing of supporting the imaging for a target category subject having the feature belonging to the target category, wherein the imaging support screen is configured to simultaneously display: information relating to a frequency of each of the plurality of first small categories respectively, and an information selection screen in which each of the plurality of large categories are displayed.

2. The imaging support device according to claim 1, wherein the support processing is processing including display processing of performing display for recommending to image the target category subject.

3. The imaging support device according to claim 2, wherein the display processing is processing of displaying an image for display obtained by the imaging with the imaging apparatus on a display and displaying a target category subject image indicating the target category subject in the image for display in an aspect that is distinguishable from other image regions.

4. The imaging support device according to claim 1, wherein the processor detects the target category subject based on an imaging result of the imaging apparatus, and acquires an image including an image corresponding to the target category subject on a condition that the target category subject is detected.

5. The imaging support device according to claim 1, wherein the processor displays an object indicating a designated imaging range determined in accordance with a given instruction from an outside and an object indicating the target category subject in different display aspects.

6. The imaging support device according to claim 1, wherein, in a case in which a degree of difference between a first imaging condition given from an outside and a second imaging condition given to the target category subject is equal to or larger than a predetermined degree of difference, the processor performs predetermined processing.

7. The imaging support device according to claim 1, wherein the target category is a low-frequency category having a relatively low frequency among the plurality of first small categories or the plurality of second small categories.

8. The imaging support device according to claim 1, wherein, in a case in which the target category subject is imaged by the imaging apparatus, the target category is a category into which the feature for the target category subject is classified, the category being determined in accordance with a state of the target category subject.

9. The imaging support device according to claim 1, wherein, in a case in which a plurality of objects are imaged by the imaging apparatus, the target category is an object target category in which each of the plurality of objects themselves is able to be specified.

10. The imaging support device according to claim 1, wherein the category is created for at least one unit.

11. The imaging support device according to claim 10, wherein one of the units is a period.

12. The imaging support device according to claim 10, wherein one of the units is a position.

13. The imaging support device according to claim 1, wherein the processor causes a classifier to classify the feature, and in a case in which a scene to be imaged by the imaging apparatus matches a specific scene, the classifier classifies the feature.

14. The imaging support device according to claim 13, wherein the specific scene is a scene imaged in the past.

15. The imaging support device according to claim 1, wherein the support processing is processing including processing of displaying the frequency information.

16. The imaging support device according to claim 15, wherein the support processing is processing including processing of, in a case in which the frequency information is designated by a reception device in a state in which the frequency information is displayed, supporting the imaging related to the category corresponding to the designated frequency information.

17. An imaging apparatus comprising:

the imaging support device according to claim 1; and an image sensor, wherein the processor supports the imaging with the image sensor by performing the support processing.

18. The imaging support device according to claim 1, wherein each of the plurality of first small categories is associated with the frequency information regarding the feature classified into the corresponding first small category, wherein each of the plurality of second small categories is associated with the frequency information regarding the feature classified into the corresponding second small category.

19. The imaging support device according to claim 18, wherein the first large category is associated with the frequency information regarding the feature classified into the first large category, wherein the second large category is associated with the frequency information regarding the feature classified into the second large category.

20. The imaging support device according to claim 19, wherein the frequency information associated with the first large category is a sum of the frequency information associated with each of the plurality of first small categories, wherein the frequency information associated with the second large category is a sum of the frequency information associated with each of the plurality of second small categories.

21. The imaging support device according to claim 1, wherein the information relating to a frequency of each of the plurality of first small categories respectively, includes a bubble chart indicating the frequency of each of the plurality of first small categories respectively, and the information selection screen is a category selection screen in which each of the plurality of large categories are displayed.

22. The imaging support device according to claim 1, wherein the information relating to the frequency of each of the plurality of first small categories respectively, is a number of images taken of each of the plurality of first small categories.

23. An imaging support device comprising:

a processor; and a memory connected to or built in the processor, wherein the processor is configured to:

acquire frequency information indicating a frequency of a captured image obtained by imaging with an imaging apparatus, the captured image being classified into a category based on a feature of a subject included in the captured image, perform support processing of supporting the imaging with the imaging apparatus based on the frequency information, and generate an imaging support screen and display the imaging support screen on a live view image in a superimposed manner, wherein the category includes a plurality of large categories comprising a first large category and a second large category, the first large category includes a plurality of first small categories subordinate to the first large category, the plurality of first small categories are classified into a plurality of features that are subordinate to the feature of the first large category, the second large category includes a plurality of second small categories subordinate to the second large category, the plurality of second small categories are classified into a plurality of features that are subordinate to the feature of the second large category, at least one target category is selected from the first large category, the second large category, the plurality of first small categories, or the plurality of second small categories, the target category is a category determined based on the frequency information, and the support processing is processing including processing of supporting the imaging for a target category subject having the feature belonging to the target category, wherein the imaging support screen is configured to simultaneously display: information relating to a frequency of each of the plurality of first small categories respectively, and an information selection screen in which each of the plurality of large categories are displayed.

24. An imaging support method comprising:

acquiring frequency information indicating a frequency of a feature of a subject specified from a captured image obtained by imaging with an imaging apparatus, the feature being classified into a category based on the feature;

performing support processing of supporting the imaging with the imaging apparatus based on the frequency information, and generating an imaging support screen and displaying the imaging support screen on a live view image in a superimposed manner, wherein the category includes a plurality of large categories comprising a first large category and a second large category, the first large category includes a plurality of first small categories subordinate to the first large category, the plurality of first small categories are classified into a plurality of features that are subordinate to the feature of the first large category, the second large category includes a plurality of second small categories subordinate to the second large category, the plurality of second small categories are classified into a plurality of features that are subordinate to the feature of the second large category, at least one target category is selected from the first large category, the second large category, the plurality of first small categories, or the plurality of second small categories, the target category is a category determined based on the frequency information, and the support processing is processing including processing of supporting the imaging for a target category subject having the feature belonging to the target category, wherein the imaging support screen is configured to simultaneously display: information relating to a frequency of each of the plurality of first small categories respectively, and an information selection screen in which each of the plurality of large categories are displayed.

25. An imaging support method comprising:

acquiring frequency information indicating a frequency of a captured image obtained by imaging with an imaging apparatus, the captured image being classified into a category based on a feature of a subject specified from the captured image;

performing support processing of supporting the imaging with the imaging apparatus based on the frequency information, and generating an imaging support screen and displaying the imaging support screen on a live view image in a superimposed manner, wherein the category includes a plurality of large categories comprising a first large category and a second large category, the first large category includes a plurality of first small categories subordinate to the first large category, the plurality of first small categories are classified into a plurality of features that are subordinate to the feature of the first large category, the second large category includes a plurality of second small categories subordinate to the second large category, the plurality of second small categories are classified into a plurality of features that are subordinate to the feature of the second large category, at least one target category is selected from the first large category, the second large category, the plurality of first small categories, or the plurality of second small categories, the target category is a category determined based on the frequency information, and the support processing is processing including processing of supporting the imaging for a target category subject having the feature belonging to the target category, wherein the imaging support screen is configured to simultaneously display: information relating to a frequency of each of the plurality of first small categories respectively, and an information selection screen in which each of the plurality of large categories are displayed.

26. A non-transitory computer-readable storage medium storing a program executable by a computer to perform a process comprising:

acquiring frequency information indicating a frequency of a feature of a subject specified from a captured image obtained by imaging with an imaging apparatus, the feature being classified into a category based on the feature;

performing support processing of supporting the imaging with the imaging apparatus based on the frequency information, and generating an imaging support screen and displaying the imaging support screen on a live view image in a superimposed manner, wherein the category includes a plurality of large categories comprising a first large category and a second large category, the first large category includes a plurality of first small categories subordinate to the first large category, the plurality of first small categories are classified into a plurality of features that are subordinate to the feature of the first large category, the second large category includes a plurality of second small categories subordinate to the second large category, the plurality of second small categories are classified into a plurality of features that are subordinate to the feature of the second large category, at least one target category is selected from the first large category, the second large category, the plurality of first small categories, or the plurality of second small categories, the target category is a category determined based on the frequency information, and the support processing is processing including processing of supporting the imaging for a target category subject having the feature belonging to the target category, wherein the imaging support screen is configured to simultaneously display: information relating to a frequency of each of the plurality of first small categories respectively, and an information selection screen in which each of the plurality of large categories are displayed.

27. A non-transitory computer-readable storage medium storing a program executable by a computer to perform a process comprising:

acquiring frequency information indicating a frequency of a captured image obtained by imaging with an imaging apparatus, the captured image being classified into a category based on a feature of a subject specified from the captured image;

performing support processing of supporting the imaging with the imaging apparatus based on the frequency information, and generating an imaging support screen and displaying the imaging support screen on a live view image in a superimposed manner, wherein the category includes a plurality of large categories comprising a first large category and a second large category, the first large category includes a plurality of first small categories subordinate to the first large category, the plurality of first small categories are classified into a plurality of features that are subordinate to the feature of the first large category, the second large category includes a plurality of second small categories subordinate to the second large category, the plurality of second small categories are classified into a plurality of features that are subordinate to the feature of the second large category, at least one target category is selected from the first large category, the second large category, the plurality of first small categories, or the plurality of second small categories, the target category is a category determined based on the frequency information, and the support processing is processing including processing of supporting the imaging for a target category subject having the feature belonging to the target category, wherein the imaging support screen is configured to simultaneously display: information relating to a frequency of each of the plurality of first small categories respectively, and an information selection screen in which each of the plurality of large categories are displayed.

* * * * *